(12) United States Patent
Ogita et al.

(10) Patent No.: US 9,085,259 B2
(45) Date of Patent: Jul. 21, 2015

(54) VEHICLE

(75) Inventors: Noriyuki Ogita, Nagoya (JP); Kazunari Sakurai, Nagoya (JP); Ryou Maeda, Nagoya (JP); Kazuki Kobayashi, Nagoya (JP); Koshu Yamashita, Nagoya (JP); Akihiko Go, Nagoya (JP); Toshihiko Nishio, Nagoya (JP); Yoshio Masuda, Nagoya (JP)

(73) Assignee: CENTRAL JAPAN RAILWAY COMPANY NIPPON SHARYO, LTD., Nagoya (JP)

( * ) Notice: Subject to any disclaimer, the term of this patent is extended or adjusted under 35 U.S.C. 154(b) by 296 days.

(21) Appl. No.: 13/566,496

(22) Filed: Aug. 3, 2012

(65) Prior Publication Data

US 2013/0034417 A1 Feb. 7, 2013

(30) Foreign Application Priority Data

Aug. 4, 2011 (JP) .................. 2011-171305

(51) Int. Cl.
*B60P 1/00* (2006.01)
*B60P 1/64* (2006.01)

(52) U.S. Cl.
CPC .................. *B60P 1/6472* (2013.01)

(58) Field of Classification Search
CPC ........ B66C 17/00; B66C 17/04; B66C 17/06; B66C 17/22; B66C 17/20; B66C 19/00; B66C 19/002; B66C 19/005; B66C 19/007; B66C 19/02; B66C 25/00; B66C 2700/0062; B60P 1/6472; B60P 1/486; B60P 1/5428

USPC .......... 414/546, 547, 555, 552, 460; 212/343–345, 312, 324, 271; 294/81.1
See application file for complete search history.

(56) References Cited

U.S. PATENT DOCUMENTS

| | | | | | |
|---|---|---|---|---|---|
| 3,448,874 | A | * | 6/1969 | Martinson | 414/542 |
| 3,513,997 | A | * | 5/1970 | Spitzer et al. | 414/541 |
| 3,780,877 | A | * | 12/1973 | Levitt | 212/304 |
| 3,945,673 | A | * | 3/1976 | Visser | 294/81.2 |
| 4,589,076 | A | * | 5/1986 | Fujioka | 700/303 |
| 6,565,307 | B1 | * | 5/2003 | Niemela | 414/546 |

FOREIGN PATENT DOCUMENTS

JP     A-8-116619     5/1996

* cited by examiner

*Primary Examiner* — Saul Rodriguez
*Assistant Examiner* — Mark Hageman
(74) *Attorney, Agent, or Firm* — Oliff PLC

(57) ABSTRACT

There is provided a vehicle which can stably load or unload a long heavy load and lower a height of a working space necessary for loading or unloading the weight body. The loading/unloading apparatus suspends and maintains a load in a working beam installed between a pair of booms and rotates the pair of booms toward the left or right direction of a vehicle body, such that the load is unloaded from the vehicle body in a construction field or loaded from the construction field onto the vehicle body. Thus, the height of the working space necessary when the load is loaded or unloaded can be reduced as compared with a crane structure for loading and unloading the load by the fluctuation of a boom.

7 Claims, 14 Drawing Sheets

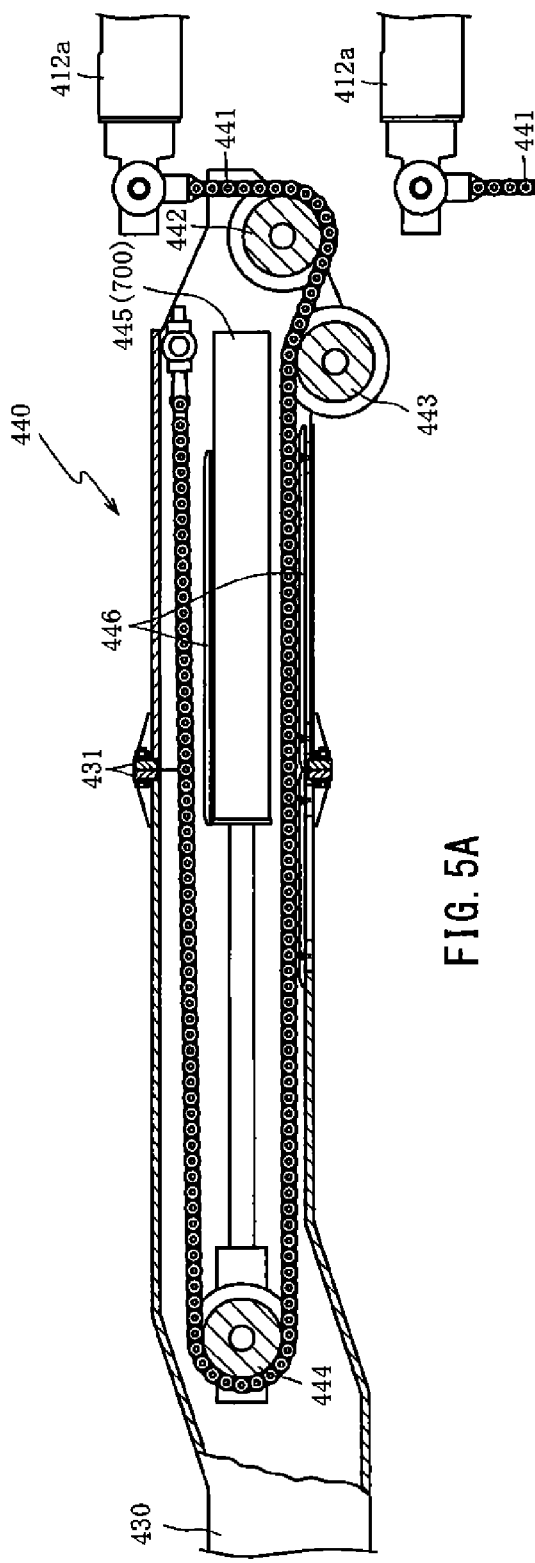
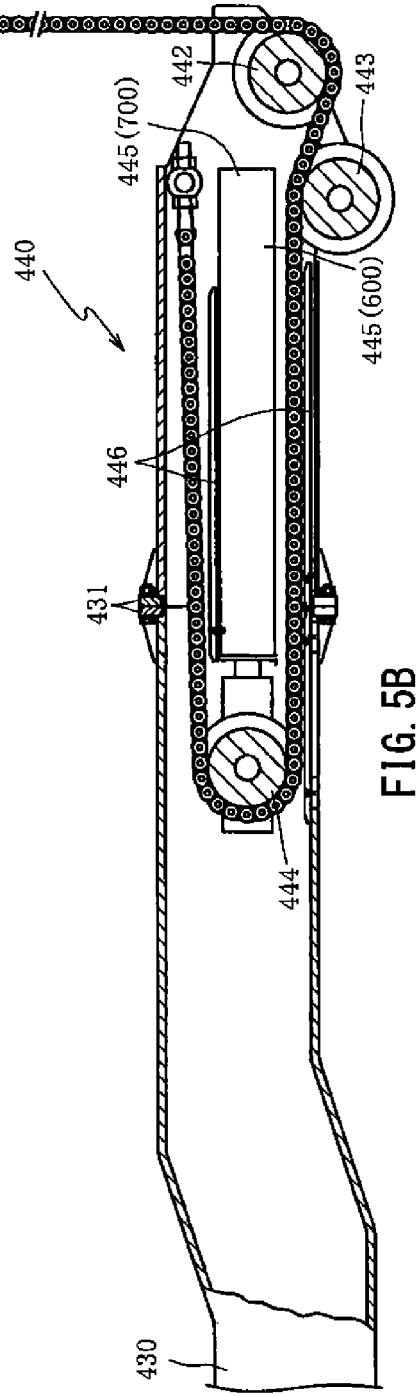
FIG. 5A
FIG. 5B

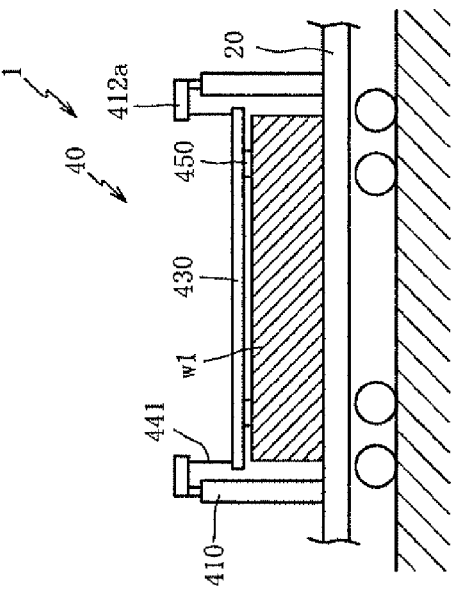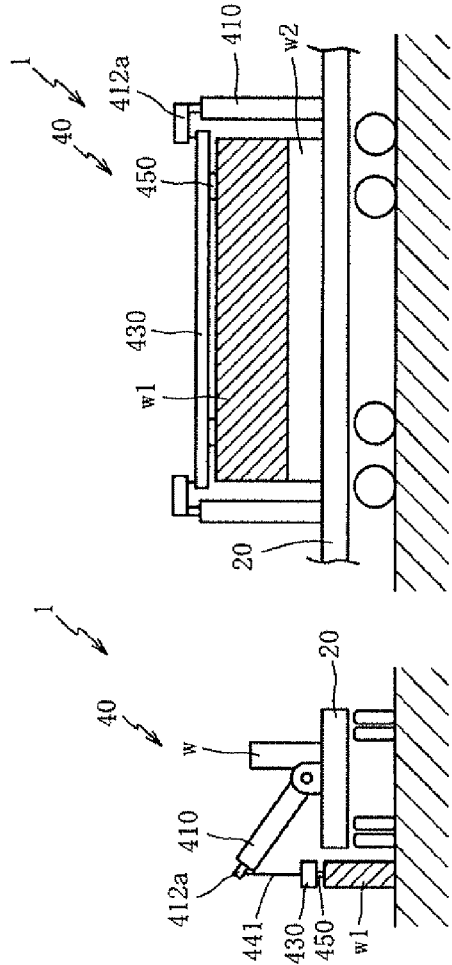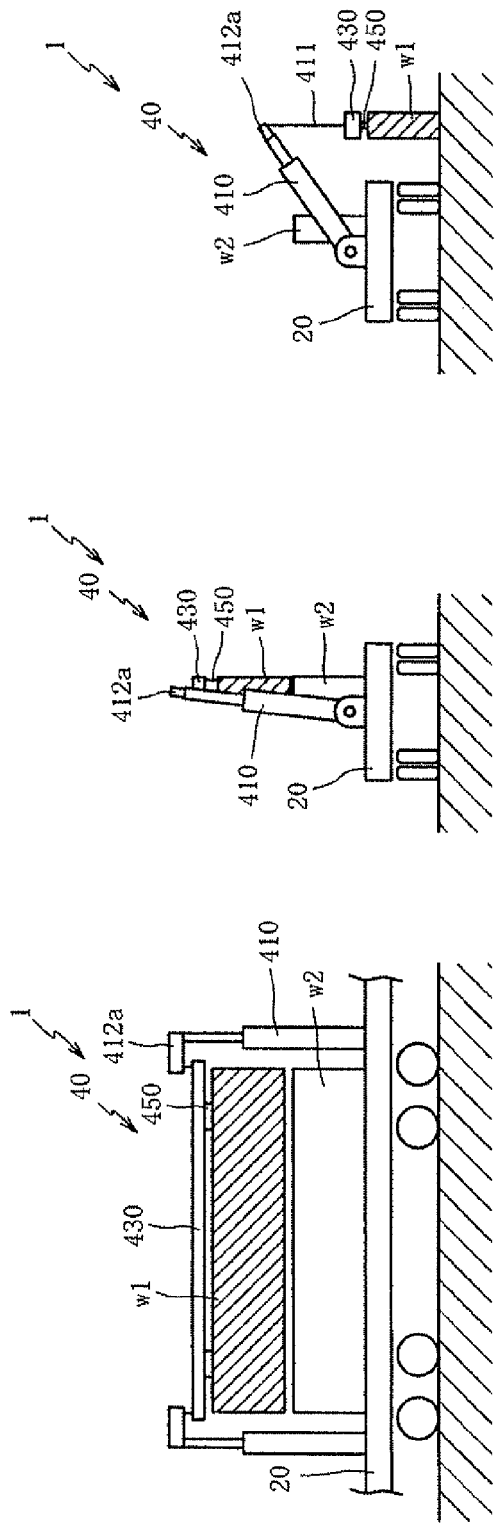

VEHICLE

FIELD OF THE INVENTION

The present invention relates to a vehicle, and more particularly, to a vehicle which can stably load or unload a long heavy load and lower a height of a working space necessary for loading or unloading the long heavy load.

BACKGROUND ART

For example, Japanese Patent Application Laid-Open Publication No. 1996-116619 (see FIGS. 1 and 2 and the like) discloses, as a vehicle for loading or unloading a load loaded on a vehicle body in a construction field, a vehicle including a self-propellant vehicle body, a loading/unloading platform installed on the vehicle body and on which a cover of a trough can be loaded, and a handling unit installed in the vehicle body to be extended or contracted, fluctuated, and pivoted.

According to the vehicle, the cover is installed in the trough by holding the cover of the trough on the loading/unloading platform with an absorption unit installed at a tip end of the handling unit, extending or contracting, fluctuating, and pivoting the handling unit, and unloading a load to any one of the left and right directions of the vehicle body.

SUMMARY OF THE INVENTION

However, in the above-described vehicle according to the related art, the handling unit is configured by a crane structure for supporting a rear side of a boom in the vehicle body, and suspending and maintaining the load on an elevatable hook installed at a tip end of the boom. Accordingly, when a load of a long heavy load is loaded or unloaded, vibrations may be easily generated in the load and the load is unstably loaded or unloaded, and a fluctuation height of the boom needs to be secured, and thus it is difficult to perform working in a space, such as a tunnel or an interior of a building, whose height is limited.

The present invention has been made in an effort to solve the above-described problems, and an object of the present invention is to provide a vehicle which can stably load or unload a long heavy load and lower a height of a working space necessary for loading or unloading the load.

In order to achieve the above-described object, a first aspect of the present invention provides a vehicle including: a vehicle body on which a load is loaded, and a loading/unloading apparatus for loading and unloading the load onto and from the vehicle body, wherein the loading/unloading apparatus includes: rotary shafts installed in the vehicle body such that axial directions thereof coincide with a forward and rearward direction of the vehicle body; a pair of booms supported by the vehicle body via the rotary shaft to be rotatable toward a left and right direction of the vehicle body and installed at front and rear sides of the vehicle body at a predetermined interval; a rotation driving unit configured to provide the pair of booms with driving forces to rotate the pair of booms toward the left and right direction of the vehicle body; a working beam installed between the pair of booms; working beam elevating units configured to elevate the working beam with respect to the booms; and a plurality of lifting jigs attached to the working beam along the forward and rearward direction of the vehicle body and configured to suspend and maintain the load.

According to the vehicle of the first aspect of the present invention, the load loaded on the vehicle body is unloaded in a construction field by the loading/unloading apparatus, and the load in the construction field is loaded on the vehicle body by the loading/unloading apparatus. That is, when the load loaded on the vehicle body is unloaded in the construction field, first, from a state where the working beam installed between the pair of booms is located above the load on the vehicle body, the lifting jigs attached to the working beam are connected to the load and the working beam is raised by the working beam elevating unit. Accordingly, the load is suspended and maintained on the lifting jigs and is suspended on the vehicle body. Next, the pair of booms is rotated toward the left or right direction (the direction of the construction field) of the vehicle body by the rotation driving unit. Accordingly, since the load is moved from the vehicle body onto the construction field together with the working beam while being accompanied by the rotation of the pair of booms, the working beam is lowered by the working beam elevating unit, and the load is positioned in the construction field, and then the connections of the lifting jigs are released. As a result, the load may be unloaded in the construction field.

That is, when the load positioned in the construction field is loaded on the vehicle body, from a state where the working beam is located above the load positioned in the construction field, the lifting jigs are connected to the load and the working beam is raised by the working beam elevating unit. Accordingly, the load is suspended and maintained on the lifting jigs and is suspended on the construction field. Next, the pair of booms is rotated toward the left or right direction (the vehicle body side) of the vehicle body by the rotation driving unit. Accordingly, since the load is moved from the construction field onto the vehicle body together with the working beam while being accompanied by the rotations of the pair of booms, the working beam is lowered by the working beam elevating unit, and the load is loaded on the vehicle body, and then the connections of the lifting jigs are released. As a result, the load may be loaded on the vehicle body.

In this case, in the loading/unloading apparatus, the pair of booms is installed at front and rear sides of the vehicle body at a predetermined interval, and a plurality of lifting jigs are installed along the forward and rearward direction of the vehicle body in the working beam installed between the pair of booms. Thus, even if the load is a long heavy load, a plurality of points along a lengthwise direction of the long heavy load may be suspended and maintained by the lifting jigs, and thus vibrations can be restrained from being generated in the long heavy load such that the load can be loaded and unloaded stably.

Further, in the loading/unloading apparatus, since the load is unloaded from the vehicle body to the construction field or loaded from the construction field onto the vehicle body by suspending and maintaining the load (long heavy load) in the working beam via the lifting jigs and rotating the pair of booms toward the left or right direction of the vehicle body, a height of a working space necessary for loading or unloading the load can be lowered as compared with the case of a crane structure where the load is loaded or unloaded by the fluctuation of the booms. As a result, the load can be easily loaded or unloaded even at a place, such as a tunnel or an interior of a building, whose height is limited.

Further, a structure for moving the load in the left or right direction of the vehicle body can be simply configured to load or unload the load by using a structure for installing the rotary shafts whose axial direction coincides with the forward and rearward direction of the vehicle body and rotatably supporting the pair of booms toward the left or right direction of the vehicle body via the rotary shafts.

In the vehicle of the first aspect of the present invention, it may be a second aspect of the present invention that each of the booms includes: a body a rear end side of which is rotatably supported by the vehicle body; and a protruding/retracting portion accommodated within the body, protruding and retracted from a tip end side of the body, and to which an end of the working beam is connected, wherein the boom is extended and contracted in an axial direction of the boom as the protruding/retracting portion protrudes and retracts from the tip end side of the body.

According to the vehicle of the second aspect of the present invention, since each of the booms includes: a body a rear end side of which is rotatably supported by the vehicle body; and a protruding/retracting portion accommodated within the body, protruding and retracted from a tip end side of the body, and to which an end of the working beam is connected, the boom can be extended and contracted in an axial direction of the boom as the protruding/retracting portion protrudes and retracts from the tip end side of the body.

Accordingly, when a first load loaded on the vehicle body is unloaded in the construction field or the first load positioned in the construction field is loaded on the vehicle body, the first load can be loaded while crossing a second load loaded on the vehicle body or above the second load positioned in the construction field by extending the booms in an axial direction of the booms. Thus, even if the second load is not moved in advance, the first load can be loaded, and thus working efficiency when the load is loaded can be enhanced.

Meanwhile, after the load is loaded, a height of the vehicle can be lowered by contracting the booms in the axial direction of the booms. Thus, a traveling path of the vehicle can be restrained from being limited by the height of the vehicle.

In the vehicle of the second aspect of the present invention, a third aspect of the present invention may be that rotation driving unit includes a pair of extendable/contractible rotation actuators installed on left and right sides of the vehicle body with respect to the boom and configured to connect the vehicle body and the body of the boom, and as one of the pair of rotation actuators is extended and the other one is contracted, the boom is rotated toward the left and right direction of the vehicle body.

According to the vehicle of the third aspect of the present invention, since the rotation driving unit includes a pair of expandable/contractible rotation actuators installed on left and right sides of the vehicle body with respect to the boom and configured to connect the vehicle body and the body of the boom, and as one of the pair of rotation actuators is extended and the other one is contracted, the boom can be rotated toward the left and right direction of the vehicle body. That is, since a structure for rotating the booms toward the left or right direction of the vehicle body is simply configured, product costs can be reduced and maintenance can be improved.

In the vehicle of the third aspect of the present invention, a fourth aspect of the present invention may be that the rotation actuator includes a hydraulic cylinder, and rotation driving unit includes a hydraulic pump configured to supply a hydraulic pressure to the rotation actuator, a switching valve installed between the hydraulic pump and the rotation actuator and configured to convert a supply direction of the hydraulic pressure to the rotation actuator, and a counterbalance valve installed between the switching valve and the rotation actuator and configured to apply a back pressure to a flow from the rotation actuator to the switching valve.

According to the vehicle of the fourth aspect of the present invention, since the rotation actuator includes a hydraulic cylinder, and the rotation driving unit includes a hydraulic pump configured to supply a hydraulic pressure to the rotation actuator, a switching valve installed between the hydraulic pump and the rotation actuator and configured to convert a supply direction of the hydraulic pressure to the rotation actuator, and a counterbalance valve installed between the switching valve and the rotation actuator and configured to apply a back pressure to a flow from the rotation actuator to the switching valve, the booms can be restrained from abruptly tumbled down from the erected state by the self-weights of the booms or the weight of the load by controlling a back pressure of the tumbled hydraulic cylinder with the counterbalance valve when the booms are rotated from one of the left and right directions of the vehicle body to the other of the left and right directions of the vehicle body via the erected state.

BRIEF DESCRIPTION OF THE DRAWINGS

FIG. 5A is a partially enlarged side view of a loading/unloading apparatus in a state where a chain of a working beam elevating unit is retracted, and FIG. 5B is a partially enlarged side view of the loading/unloading apparatus in a state where the chain of the working beam elevating unit is extracted;

FIG. 6A is a front schematic diagram of a vehicle, FIG. 6B is a lateral schematic diagram of a vehicle, FIG. 6C is a lateral schematic diagram of a Vehicle, FIG. 6D is a lateral schematic diagram of a vehicle, FIG. 6E is a front schematic diagram of a vehicle, and FIG. 6F is a front schematic diagram of a vehicle;

DETAILED DESCRIPTION OF THE EMBODIMENTS

Figures 1A, 1B:
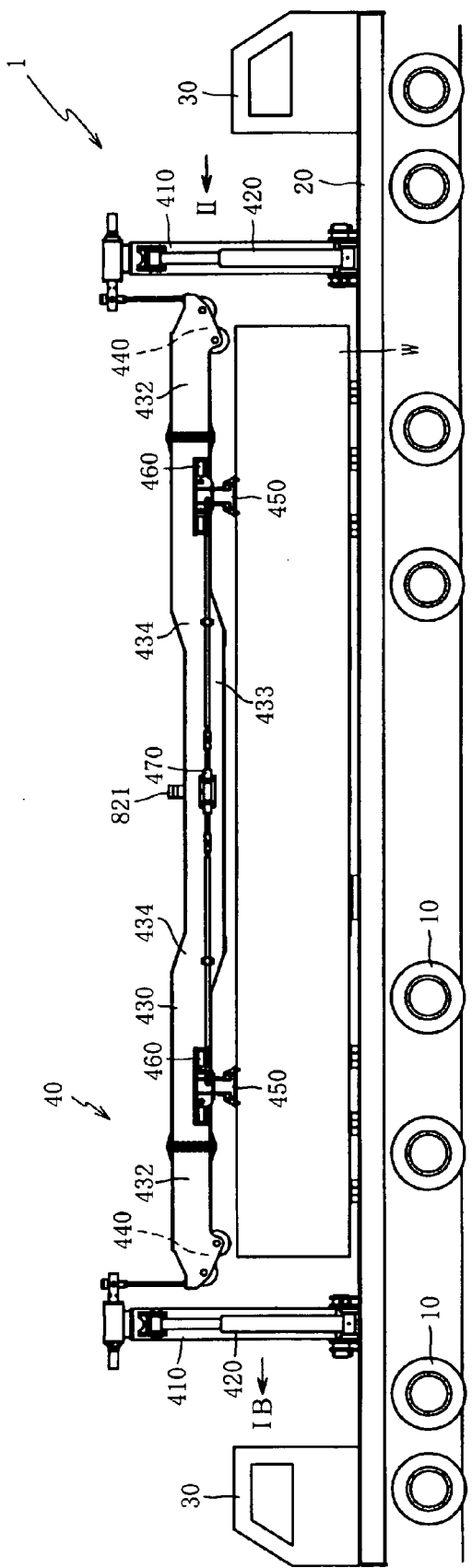
FIG. 1A is a side view of a vehicle according to an embodiment of the present invention.
FIG. 1B is a rear side view of an operator cab.

Hereinafter, embodiments of the present invention will be described with reference to the accompanying drawings. First, an entire configuration of a vehicle 1 will be described with reference to FIG. 1. FIG. 1A is a side view of the vehicle 1 according to an embodiment of the present invention. Further, in the present embodiment, a form where the vehicle 1 has operator cabs 30 at opposite lengthwise sides thereof will be described as an example. Further, for convenience's sake, a lengthwise side and an opposite lengthwise side (the right and left sides of FIG. 1A) of the vehicle 1 will be defined as front and rear sides, respectively, in the following description. Thus, in FIG. 1A, a front side of the paper is defined as a right side of the vehicle 1 (vehicle body 20), and an inner side of the paper is defined as a left side of the vehicle 1 (vehicle body 20).

As illustrated in FIG. 1A, the vehicle 1 mainly includes a plurality of wheels 10, a vehicle body 20 supported and self-propelled by the plurality of wheels 10, operator cabs 30 installed at front and rear sides (left and right sides of FIG. 1A) of the vehicle body 20, and a loading/unloading apparatus 40 located between back surfaces of the operator cabs 30 and installed on the vehicle body 20. The vehicle 1 is a working vehicle for loading and unloading a load W loaded on the vehicle body 20 in a construction field. The vehicle 1 can safely and efficiently load and unloads the load W even when the load W is a long heavy load.

The vehicle body 20 has a forward and rearward direction size (a left and right direction size of FIG. 1A) longer than a vehicle wide size (a left and right direction size, a size in a direction perpendicular to the paper of FIG. 1A). Further, an upper surface side (upper side surface of FIG. 1A) of the vehicle body 20 is formed in a flat surface shape, and a space between a pair of booms 410 of the loading/unloading apparatus 40 serves as a load receiving surface for loading the load W.

Driving units (not illustrated) for driving the vehicle 1 are installed in the operator cabs 30, respectively, and the vehicle 1 travels as the driving unit are manipulated by a driver. Here, a configuration on the back surface sides of the operator cabs 30 will be described with reference to FIG. 1B. Further, since the operator cabs 30 installed at front and rear sides of the vehicle body 20 have the same configuration, the operator cab 30 installed at the front side of the vehicle body 20 will be described, and a description of the operator cab 30 installed at the rear side of the vehicle body 20 will be omitted.

FIG. 1B is a rear side view of the operator cab 30. An opening window 31 is formed to be opened at a rear side of the operator cab 30 facing the loading/unloading apparatus 40. The opening window 31 is formed as a substantially rectangular opening when viewed directly when viewed from the front side, and a glass is put into the opening. The glass partitions an interior and an exterior of the operator cab 30 while allowing the interior of the operator cab 30 to be visible from the outside.

An LCD 811 is installed in the operator cab 30, in addition to the driving unit (not illustrated) manipulated when the vehicle 1 travels and seats 32 where a driver is seated. The LCD 811 is controlled by a load factor display unit 810 (see FIG. 8), and displays information (for example, a load factor, a working radius, and a suspension load) on an operation state of the loading/unloading apparatus 40.

Further, the LCD 811 is installed between the seats 32, retreats to a location (a location installed parallel to backs of the seats 32 in the present embodiment) close to the opening window 31, and is installed such that a display surface thereof faces the opening window 31. Accordingly, display contents of the LCD 811 may be viewed from the outside of the operator cab 30.

In addition, a first connection terminal 840 to which the manipulation remote control unit 50 is detachably connected is installed at a back surface side of the operator cab 30. Further, a second connection terminal 850 (see FIG. 8) is installed at a back surface side of the operator cab 30 installed at a rear side of the vehicle body 20, and if the manipulation remote control unit 50 connected to one of the first connection terminal 840 and the second connection terminal 850 is manipulated by an operator, an operation of the loading/unloading apparatus 40 is controlled based on a driving command thereof and the load W is loaded.

In this case, according to the vehicle 1, a display surface of the LCD 811 in the load factor display unit 810 may be viewed by the operator via the opening window 31 from the outside (for example, a space between the rear surface side of the operator cab 30 and the loading/unloading apparatus 40 on the vehicle body 20) of the operator cab 30. Thus, since the operator can perform the manipulation while acquiring information on an operation state of the loading/unloading apparatus 40 from the load factor display unit 810, safety can be secured when the long heavy load W is loaded.

Further, since the vehicle 1 is a load type vehicle where the load W is loaded on the vehicle body 20, the operator cab 30 is installed at one (the left or right side of FIG. 11) of the front or rear sides of the vehicle body 20, and the load is loaded and unloaded by the loading/unloading apparatus 40 installed on the vehicle body 20 on the back surface side of the operator cab 30, the visibility of the load W from the interior of the operator cab 30 is bad. For this reason, since a manipulation instruction can be received from the outside of the operator cab 30 by using the manipulation remote control unit 50 as in the present embodiment, visibility of the load W is secured, and working efficiency and safety are effectively improved when the load W (in particular, a long heavy load) is loaded and unloaded.

Referring back to FIG. 1A, the description will be continued. The loading/unloading apparatus 40 is an apparatus for loading and unloading the load W (unloading a load W loaded on the vehicle body 20 to a construction filed or loading a load W positioned in a construction field onto the vehicle body 20). The loading/unloading apparatus 40 mainly includes a pair of booms 410 installed at front and rear sides (left and right sides of FIG. 1A) of the vehicle body 20 at a predetermined interval, rotation actuators 420 configured to provide the pair of booms 410 with driving forces to rotate the pair of booms 410 in the left and right direction (a direction perpendicular to the paper of FIG. 1A) of the vehicle body 20, a working beam 430 installed between the pair of booms 410, a working beam elevating unit 440 configured to elevate the working beam 430 with respect to the booms 410, and lifting jigs 450 attached to the working beam 430 and configured to suspend and maintain the load W.

The pair of booms 410 is located on a center line (a center in the left and right direction of the vehicle body 20) of the vehicle body 20 and supported by the vehicle body 20 to be rotatable toward the left and right direction (a direction perpendicular to the paper of FIG. 1A) of the vehicle body 20, and an upper surface space of the vehicle body 20 formed between the pair of opposite booms 410 serves as a loading space for loading the load W. Further, predetermined intervals are provided between the booms 410 and the operator cabs 30, and predetermined spaces are formed on the upper surface of the vehicle body 20. As the operator uses such spaces, working is possible at a high point and thus an operation of the loading/unloading apparatus 40 or the visibility of the load W can be secured.

The working beam 430 is formed as a long body, and opposite lengthwise ends (in the left and right direction of FIG. 1A) thereof are suspended and installed at apexes of the booms 410 via the working beam elevating units 440. Accordingly, as the working beam 430 is installed along a lengthwise direction of the vehicle body 20, and the pair of booms 410 is rotated in the left or right direction of the vehicle body 20, the booms 20 are moved in the left or right direction of the vehicle body 20 while remaining parallel to the center line of the vehicle body 20.

The lifting jigs 450 are attached to a plurality of lengthwise points (two points in the present embodiment) of the working beam 430, and the load W is suspended and maintained at the working beam 430 via the lifting jigs 450. A guide rail 460 is interposed and installed between the working beam 430 and the lifting jigs 450, and as a movement direction of the lifting jigs 450 is guided by the guide rail 460, the lifting jigs 450 are moved along a lengthwise direction (that is, the forward and rearward direction of the vehicle body 20) of the working beam 430. Thus, since the locations (suspended locations of the load W) of the lifting jigs 450 may be adjusted in the forward and rearward direction of the vehicle body 20, even when the vehicle 1 is stopped while slightly deviating from a predetermined location of the construction field, the load W can be efficiently installed at the predetermined location of the construction field, and the load W installed at a predetermined location can be efficiently connected to the lifting jigs 450.

In the working beam 430, two rod cylinders 470 are installed along a lengthwise direction thereof, and the lifting jigs 450 are connected to both ends of both the two rod cylinders 470, respectively. Thus, by driving both the rod cylinders 470, both the lifting jigs 450 may be moved along the lengthwise direction (forward and rearward direction of the vehicle body 20) of the working beam 430. That is, since the pair of lifting jigs 450 may be moved with one type of driving source (the two rod cylinders 470), component costs can be reduced correspondingly. Further, since the pair of lifting jigs 450 may be integrally moved, synchronization precisions thereof can be secured easily and at a high level.

Figure 2A:
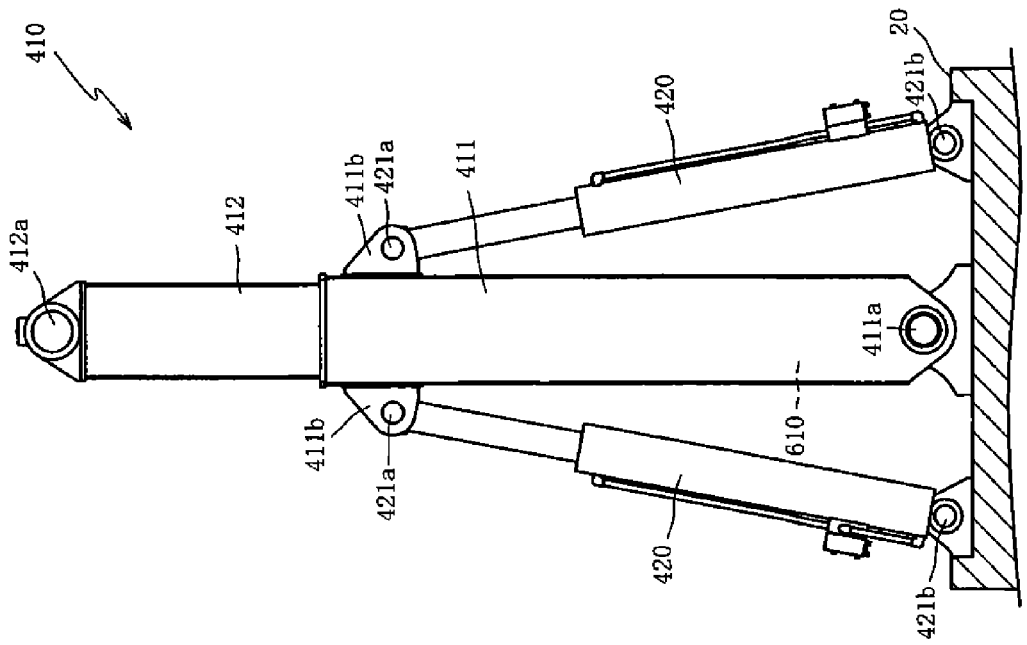
FIG. 2A is a front view of a boom in a contracted state.
Figure 2B:
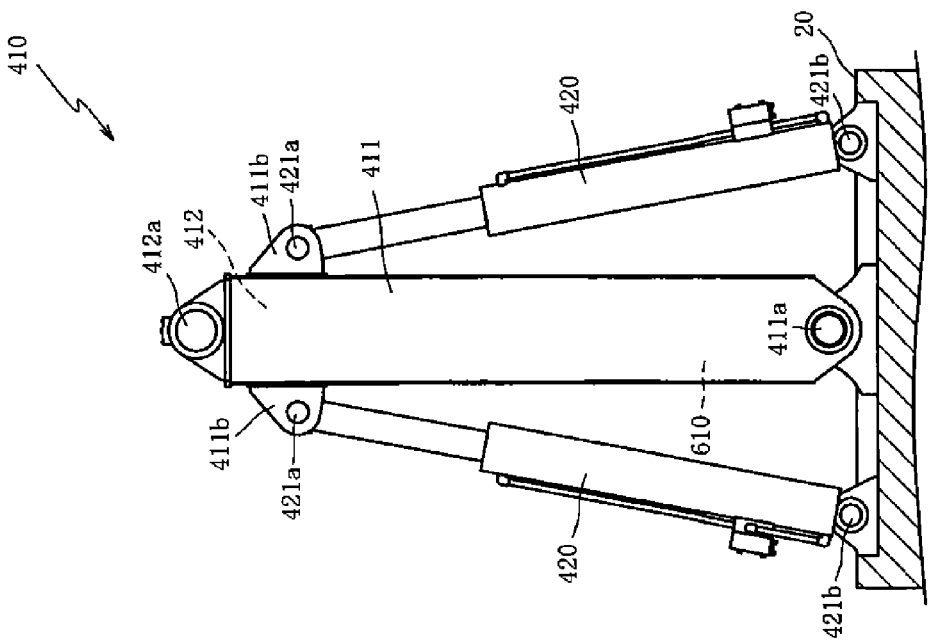
FIG. 2B is a front view of the boom in an extended state.

Here, a detailed configuration of the loading/unloading apparatus 40 will be described with reference to FIGS. 2 to 5. FIG. 2A is a front view of the boom 410 in a contracted state, and FIG. 2B is a front view of the boom 410 in an extended state. Further, since the pair of booms 410 installed at front and rear sides of the vehicle body 20 has the same configuration, the boom 410 installed at the front side of the vehicle body 20 will be described, and a description of the boom 410 installed at the rear side of the vehicle body 20 will be omitted. Further, in FIG. 2, a side (a side opposite to the load W, see FIG. 1) of the boom 410 facing the operator cab 30 is illustrated as a front side.

As illustrated in FIG. 2, each of the booms 410 includes a tube-shaped body 411 a tip end side (an upper side of FIG. 2) of which is opened, a column-shaped protruding/retracting portion 412 accommodated within the body 411 and formed to be moved along an axial direction (upward and downward direction of FIG. 2) of the body 411, and an extension/contraction actuator 610 accommodated within the body 411 and including an extendable/contractible hydraulic cylinder connecting a rear end side of the protruding/retracting portion 412 and the bottom of the body 411.

Thus, as the extension/contraction actuator 610 is extended, the protruding/retracting portion 412 of the boom 410 protrudes from an opening of the tip end side (upper side of FIG. 2) of the body 411 as illustrated in FIG. 2B, whereas as the extension/contraction actuator 610 is contracted, the protruding/retracting portion 412 retracts into the body 411 as illustrated in FIG. 2A. That is, as the protruding/retracting portion 412 protrudes and retracts from a tip end side of the body 411 through driving the extension and contraction of the extension/contraction actuator 610, an axial (upward and downward direction of FIG. 2) length of the boom 410 can be extended or contracted, and a height location of the tip end of the boom 410 can be changed with respect to an upper surface of the vehicle body 20.

The rear end side (lower side of FIG. 2) of the body 411 is rotatably supported by the vehicle body 20 via a rotation pin 411a. Since the rotation pin 411a is installed such that an axial direction (a direction perpendicular to the paper of FIG. 2) thereof coincides with a forward and rearward direction (left and right direction of FIG. 1A) of the vehicle body 20, the body 411 can be rotated in the left and right direction (left and right direction of FIG. 2) of the vehicle body 20. A connecting plate 411b to which the rotation actuators 420 are connected protrudes from a side surface of the body 411 toward the left and right direction of the vehicle body 20.

In this way, by using the structure for rotatably supporting the body 411 toward the left and right direction of the vehicle body 20 via the rotation pin 411a, it is possible to simply constitute a structure (FIGS. 6A-6F) for moving the load W in the left and right direction of the vehicle body 20 to load or unload the load W.

A connecting body 412a protruding toward the facing boom 410 side (inner side of the paper of FIG. 2) is installed at the tip end side (upper side of FIG. 2) of the protruding/retracting portion 412, and one end of a chain 441 of the working beam elevating unit 440 is connected to the connecting body 412a (see FIG. 5).

Each of the rotation actuators 420 includes an extendable hydraulic cylinder, and two rotation actuators 420 are installed for one boom 410 on left and right sides (left and right of FIG. 2) of the vehicle body 20, respectively. A tip end side (upper side of FIG. 2) of a piston rod of each of the rotation actuators 420 is rotatably supported by the connecting plate 411b of the body 411 via a rotation pin 421a, and a rear end side (lower side of FIG. 2) of the tube is rotatably supported by the vehicle body 20 via a rotation pin 421b.

An interval (left and right direction interval of FIG. 2) between the pair of rotation pins 421a is narrower than an interval between the pair of rotation pins 421b, and accordingly, the pair of rotation actuators 420 is installed to have an inverse V-shape when viewed from the front side. Further, each of the rotation pins 421a and 421b is installed such that an axial direction (a direction perpendicular to the paper of FIG. 2) thereof coincides with the forward and rearward direction (left and right direction of FIG. 1A) of the vehicle body 20. Thus, as one of the pair of rotation actuators 420 is extended and the other rotation actuator 420 is contracted, the boom 410 is rotated toward the left and right direction of the vehicle body 20.

In this way, by installing the pair of rotation actuators 420 on both left and right sides of the vehicle body 20 with respect to the boom 410 and connecting the vehicle body 20 and the boom 410 using the pair of rotation actuators 420, it is possible to simply constitute a structure where the boom 410 is rotated toward the left or right direction of the vehicle body 20. As a result, product costs of the entire vehicle 1 can be reduced, and maintenance property of the loading/unloading apparatus 40 can be enhanced.

Figure 3:
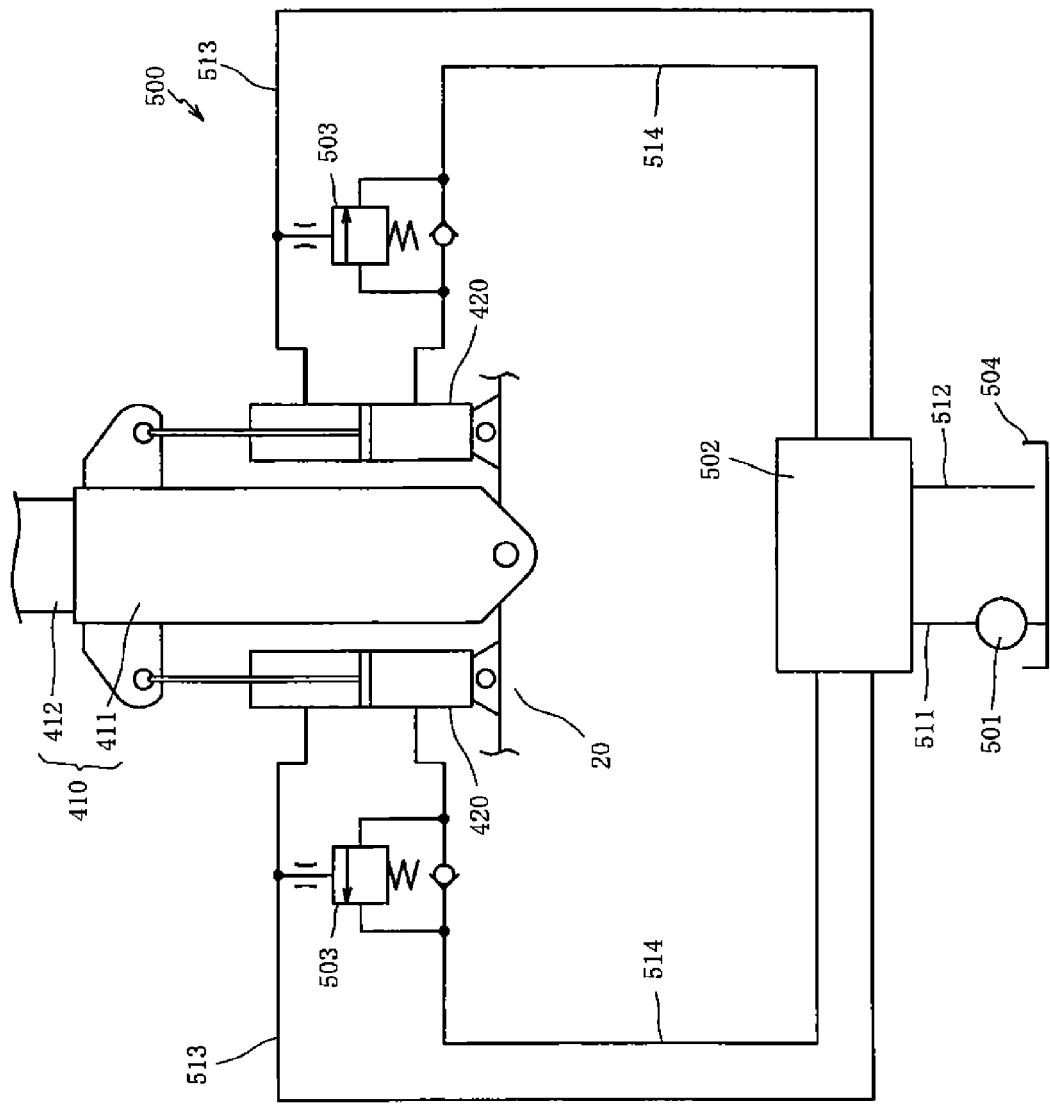
FIG. 3 is a schematic diagram schematically illustrating a hydraulic circuit of a rotation driving unit.

Next, the rotation driving unit 500 for driving the rotation actuator 420 will be described with reference to FIG. 3. FIG. 3 is a schematic view schematically illustrating a hydraulic circuit of the rotation driving unit 500.

As illustrated in FIG. 3, the rotation driving unit 500 includes the rotation actuator 420, a hydraulic pump 501 configured to supply a working fluid (hydraulic pressure) to the rotation actuator 420, a switching valve 502 installed between the hydraulic pump 501 and the rotation actuator 420 and configured to convert a supply direction of the hydraulic pressure to the rotation actuator 420, and a counterbalance valve 503 installed between the switching valve 502 and the rotation actuator 420 and apply a back pressure to a flow from the rotation actuator 420 to the switching valve 502.

A working fluid supply pipeline 511 communicated with the hydraulic pump 501, a back flow pipeline 512 communicated with a tank 504, a rod side pipeline 513 communicated with a rod side oil sac of the rotation actuator 420, and a tube side pipeline 514 communicated with a tube side oil sac of the rotation actuator 420 are connected to the switching valve 502.

Thus, as a supply direction of the working fluid supplied from the hydraulic pump 501 is switched by the switching valve 502, the working fluid is sent to the rod side oil sac or tube side oil sac of the rotation actuator 420 and the rotation actuator 420 is extended and contracted. In this case, the working fluid is supplied from the hydraulic pump 501 to the pair of rotation actuators 420 in opposite ways, and if one of the rotation actuators 420 is extended, the other rotation actuator 420 is contracted.

For example, if a switching state by the switching valve 502 is set to a first state, the working fluid is supplied to the rod side oil sac from the rod side pipeline 513 in the rotation actuator 420 on the left side of FIG. 3, whereas the working fluid is supplied to the tube side oil sac from the tube side pipeline 514 in the rotation actuator 420 on the left side of FIG. 3, so that the rotation actuator 420 on the left side of FIG. 3 is contracted and the rotation actuator 420 on the right side of FIG. 3 is extended. Accordingly, the boom 410 is rotated toward one (the left side of FIG. 3) of the left and right sides of the vehicle body 20.

To the contrary, if a switching state by the switching valve 502 is set to a second state, the working fluid is supplied to the tube side oil sac from the tube side pipeline 514 in the rotation actuator 420 on the left side of FIG. 3, whereas the working fluid is supplied to the rod side oil sac from the rod side pipeline 513 in the rotation actuator 420 on the right side of FIG. 3, so that the rotation actuator 420 on the left side of FIG. 3 is extended and the rotation actuator 420 on the right side of FIG. 3 is contracted. Accordingly, the boom 410 is rotated toward the other side (the right side of FIG. 3) of the left or right side of the vehicle body 20.

Further, in the above-described first and second states, the working fluid discharged from the rod side oil sac or the tube side oil sac returns to the tank 504 via the rod side pipeline 513 or the tube side pipeline 514 and the back flow pipeline 512.

In addition, the counterbalance valve 503 is installed in the tube side pipeline 514. When the rotation actuator 420 is extended, the working fluid is supplied to the tube side oil sac of the rotation actuator 420 via the counterbalance valve 503, whereas when the rotation actuator 420 is contracted, the working fluid is supplied from the rod side pipeline 513 to the rod side oil sac, and a pressure is generated in the rod side pipeline 513, so that the counterbalance valve 503 is opened and the working fluid in the tube side oil sac is discharged.

In this way, since the counterbalance valve 503 is installed between the switching valve 502 and the rotation actuator 420 and a back pressure is applied to the flow of the working fluid from the rotation actuator 420 to the switching valve 502, when the boom 410 is rotated from one (for example, the right side of FIG. 3) of the left and right sides of the vehicle body 20 to the other side (the left side of FIG. 3) via an erected state, the back pressure of the rotation actuator 420 on the fallen side (the left side of FIG. 3) is controlled by the counterbalance valve 503 so that the boom 410 may be restrained from being abruptly fallen down from the erected state by the self-weight of the boom 410 or the weight of the load W.

Figure 8:
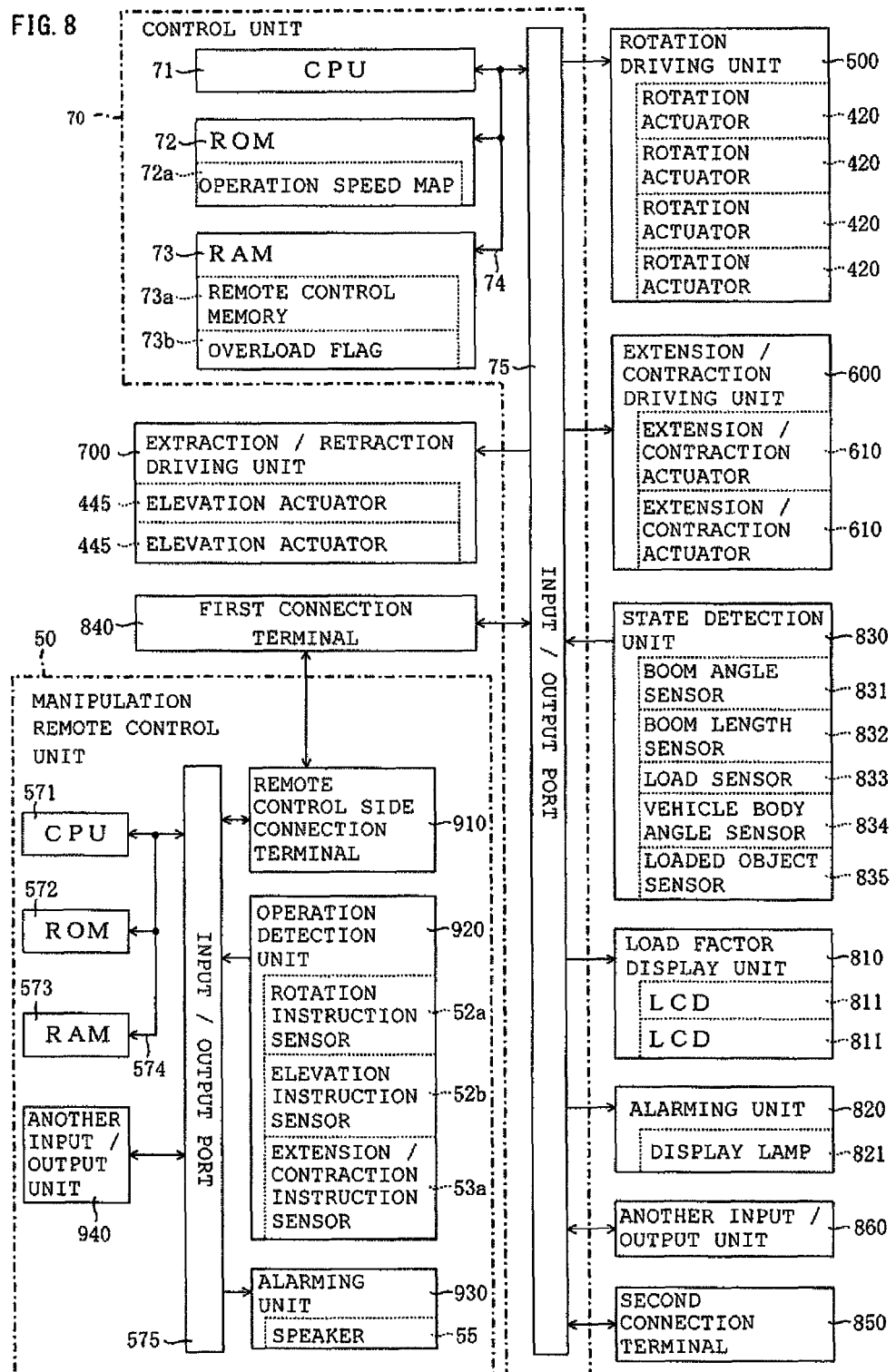
FIG. 8 is a block diagram illustrating an electrical configuration of a controller.

Further, the extension/contraction actuator 610 received in the body 411 of the boom 410 is driven by an extension/contraction driving unit 600 (see FIG. 8). The extension/contraction driving unit 600 includes, in addition to the extension/contraction actuator 610, a hydraulic pump for supplying the working fluid (hydraulic pressure) to the extension/contraction actuator 610, a switching valve installed between the hydraulic pump and the extension/contraction actuator 610 and configured to convert a supply direction of the hydraulic pressure to the extension/contraction actuator 610, and a counterbalance valve installed between the switching valve and the extension/contraction actuator 610 and configured to apply a back pressure to a flow from the extension/contraction actuator 610 to the switching valve. The configuration and operation of the extension/contraction driving unit 600 are the same as those of the rotation driving unit 500, and a description thereof will be omitted.

Figure 4:
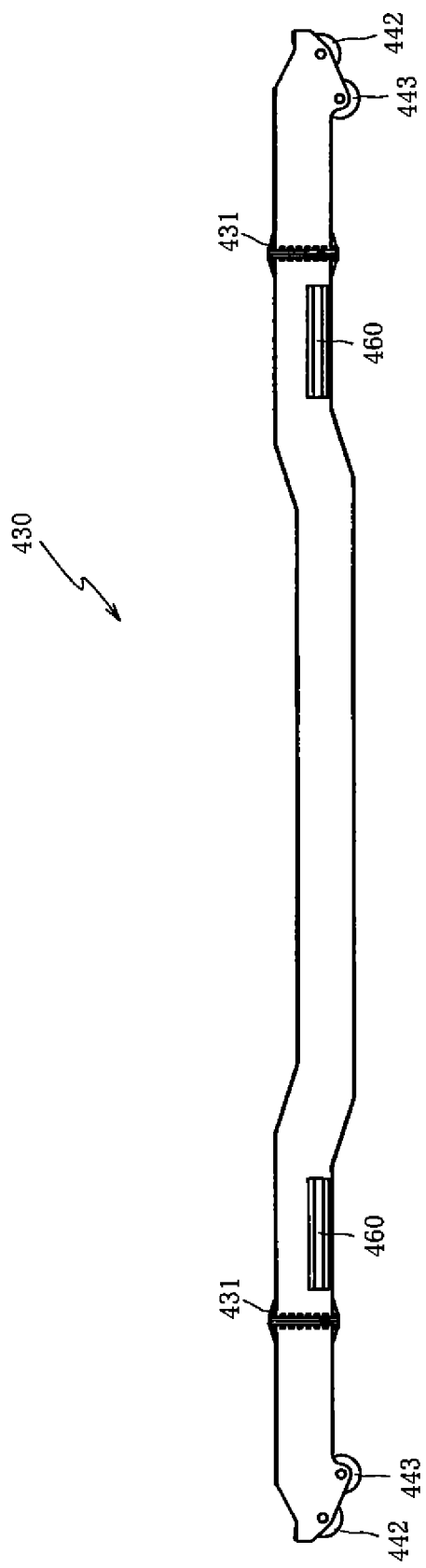
FIG. 4 is a side view of a working beam.

Next, the working beam 430 will be described with reference to FIG. 4. FIG. 4 is a side view of the working beam 430, and corresponds to the one viewed from a side of FIG. 1. Further, in FIG. 4, the working beam elevating units 440, the lifting jigs 450, the two rod cylinders 470 or the display lamp 821 are not illustrated.

As illustrated in FIG. 1A and FIG. 4, the working beam 430 is a long member installed between the pair of booms 410, and the load W is suspended and maintained via the lifting jigs 450 connected to the guide rail 460 (see FIG. 1). In this case, upper and lower surfaces of the working beam 430 at a central portion 433 thereof in the lengthwise direction (the left and right direction of FIG. 4) are formed at a location lower than upper and lower surfaces of the working beam 430 at locations 432 where the guide rail 460 (lifting jig 450, see FIG. 1) is installed by one step, and stepped portions 434 inclined downward toward the central portion 433 are formed between the central portion 433 and the opposite ends 432 of the working beam 430. Thus, since a bending strength of the working beam 430 can be efficiently secured when the load W is suspended and maintained, it is possible to stably load and unload the load W which is a long heavy load while achieving a small size and light weight of the working beam 430.

The working beam 430 is formed to have a rectangular cross-sectional hollow box shape, and a portion of the working beam elevating unit 440 is received in the interior space of the hollow box shape (see FIG. 5). Further, in this way, installing the working beam elevating unit 440 in the working beam 430 makes it unnecessary to secure a space for installing the working beam elevating unit 440 on the vehicle body 20. Thus, a space (that is, an area of a load receiving surface) on the vehicle body 20 for loading the load W can be enlarged accordingly, and a longer load can be loaded on the vehicle body 20 correspondingly.

Opposite lengthwise ends of the working beam 430 are configured to be of a dividable type where the working beam 430 can be divided lengthwise. That is, since flanges 431 are formed to protrude from the facing surfaces of the divided portions, respectively and the flanges 431 are coupled and fixed to each other by bolts, the working beam 430 may be divided into three parts lengthwise by separating the bolts. Accordingly, the working beam 430 can be easily mounted in an interior space of the working beam elevating unit 440, manufacturing costs of the loading/unloading apparatus 40 can be reduced, the working beam elevating unit 440 can be easily accessed, and a maintenance property thereof can be enhanced.

Further, cross-sections of the opposite lengthwise ends of the working beam 430 are opened (see FIG. 5), and the chain 441 of the working beam elevating unit 440 can be inserted through the opposite ends of the working beam 430. Further, in the vicinity of the cross-sections, fixing sheaves 442 and 443 are rotatably shaft-supported by the working beam 430.

Next, the working beam elevating unit 440 will be described with reference to FIG. 5. FIG. 5A is a partially enlarged side view of the loading/unloading apparatus 40 in a state where the chain 441 of the working beam elevating unit 440 is retracted, and FIG. 5B is a partially enlarged side view of the loading/unloading apparatus 40 in a state where the chain 441 of the working beam elevating unit 440 is extracted.

Further, in FIG. 5, a portion of the working beam 430 is partially sectioned. Further, the pair of working beam elevating units 440 installed at opposite lengthwise ends of the working beam 430 has the same configuration, one of the working beam elevating units 440 will be described and a description of the other working beam elevating unit 440 will be omitted.

As illustrated in FIG. 5, the working beam elevating unit 440 includes a chain 441 one end of which is fixed to the connecting body 412a of the boom 410, fixing sheaves 442 and 443 which intermediate portions of the chain 441 contact around the fixing sheaves 442 and 443 and rotatably shaft-supported by the working beam 430, a reversal sheave 444 which an intermediate portion of the chain 441 guided from the fixing sheaves 442 and 443 contacts around the reversal sheave 444, and configured to reverse an opposite side of the chain 441, and an extraction/retraction driving unit 700 configured to move the reversal sheave 444 to release and rewind the chain 441.

The chain 441 is a member for suspending the working beam 430 to be elevatable with respect to the boom 410, and is a roller chain where a plurality of plates are connected to each other by pins to be curved. The fixing sheaves 442 and 443 and the reversal sheave 444 are members for guiding the contacting chain 441, and flanges are installed at opposite sides of the outer circumferential surfaces of the sheaves 442, 443, and 444 which the chain 441 contacts around the sheaves 442, 443, and 444 so that the chain 441 does not deviate the outer circumferential surfaces of the sheaves 442, 443, and 444.

The fixing sheaves 442 and 443 are disposed at center between opposite sides of the opposite side walls (front and inner sides of the paper of FIG. 5) of the working beam 430, and the pass line of the chain 441 is set at a center in the widthwise direction (a direction perpendicular to the paper of FIG. 5) of the working beam 430. Further, the fixing sheaves 442 and 443 are installed at a location where a lower end of the outer circumferential surface of the fixing sheave 442 close to the connecting body 412a of the boom 410 is lower (an a lower side of FIG. 5) than an upper end of the outer circumferential surface of the fixing sheave 443 close to the reversal sheave 444, and the reversal sheave 444 is installed at a location where a lower end of the outer circumferential surface thereof is substantially the same as an upper end of the outer circumferential surface of the fixing sheave 443.

In this case, the chain 441 vertically extends downward from the connecting body 412a of the boom 410, and after contacting a lower end of the outer circumferential surface of the fixing sheave 442 around the fixing sheave 442, the chain 441 contacts an upper end of the outer circumferential surface of the fixing sheave 443 around the fixing sheave 443 and is guided to the reversal sheave 444. Thus, a load of the working beam 430 may be distributed to both the fixing sheaves 442 and 443, and thus the fixing sheaves 442 and 443 can achieve a small diameter and enhancement of durability.

The extraction/retraction driving unit 700 includes an elevation actuator 445 which is an extendable/contractible hydraulic cylinder. The elevation actuator 445 includes a tube attached to the working beam 430, and a piston rod protruding and retracting from the tube such that the reversal sheave 444 is rotatably shaft-supported by a tip end thereof.

The chain 441 passes between a bottom wall (lower side of FIG. 5) of the working beam 430 and the elevation actuator 445, and is guided from the fixing sheaves 442 and 443 to the reversal sheaves 444 to contact the reversal sheave 444 around the reversal sheave 444 to be reversed. The reversed chain 441 passes between an upper wall (upper side of FIG. 5) of the working beam 430 and the elevation actuator 445, and is guided to the fixing sheaves 442 and 443 such that an opposite end thereof is fixed to the working beam 430.

In this case, in the elevation actuator 445, the piston rod is located on an opposite side of the fixing sheaves 442 and 443 with respect to the tube. Thus, if the piston rod is extended, as illustrated in FIG. 5A, the reversal sheave 444 is moved in a direction (the left direction of FIG. 5) in which the reversal sheave 444 is spaced apart from the fixing sheaves 442 and 443 and an opposite end of the chain 441, whereas if the piston rod is contracted, as illustrated in FIG. 5B, the reversal sheave 444 is moved in a direction (the right direction of FIG. 5) in which the reversal sheave 444 becomes closer to the fixing sheaves 442 and 443 and the opposite end of the chain 441.

Accordingly, as the piston rod of the elevation actuator 445 is contracted, the chain 441 may be released as illustrated in FIG. 5B, and the working beam 430 may be spaced apart from the connecting body 412a of the boom 410 (that is, may be lowered) by the released amount. Accordingly, as the piston rod of the elevation actuator 445 is extended, the chain 441 may be rewound as illustrated in FIG. 5A, and the working beam 430 may approach the connecting body 412a of the boom 410 (that is, may be raised) by the rewound amount.

In this way, since the working beam elevating unit 440 releases and rewinds the chain 441 as an intermediate portion of the chain 441 contacts the reversal sheave 444 around the reversal sheave 444 and the reversal sheave 444 accompanied by the extension and contraction operation of the elevation actuator 445 is moved, the released amount and rewound amount of the chain 441 may be become twice as large when the elevation actuator 445 is extended or contracted by the same degree as compared with the case of directly fixing the opposite end of the chain 441 to the piston rod of the elevation actuator 445. Accordingly, an extended or contracted amount necessary for the elevation actuator 445 may be reduced. Thus, an axial (left and right direction of FIG. 5) length size of the elevation actuator 441 may be shortened while securing a necessary extended or contracted amount, and thus the working beam elevating unit 440 can be small-sized and light-weighted correspondingly.

Further, in this way, since the chain 441 is released or rewound as the reversal sheave 444 accompanied by the extension and contraction operation of the elevation actuator 445 is moved, a winding drum for winding the rewound chain 441 may not be necessary. In addition, as a member tying the working beam 430 in the connecting body 412a of the boom 410 is the chain 441, diameters of the fixing sheaves 442 and 443 or the reversal sheave 444 may be small by making an allowable bending radius small as compared with the case of using a wire. Thus, even in these aspects, the working beam elevating unit 440 can be small-sized and light-weighted.

Here, as the working beam elevating unit 440 is received in an interior space of the working beam 430 formed in a hollow box shape, the interior space of the working beam 430 which becomes a dead space can be effectively utilized, and the entire loading/unloading apparatus 40 can be small-sized correspondingly.

In this case, the interior space of the working beam 430 requires a space for extending and contracting the elevation actuator 445, and thus since the elevation actuator 445 is received in the interior space of the working beam 430 while the extension and contraction direction thereof follows a lengthwise direction of the working beam 430, an interior space long in the transverse direction of the working beam 430 can be utilized effectively. Accordingly, the entire loading/unloading apparatus 40 can be small-sized while securing a releasing and rewinding length of the chain 441.

Further, if an extended amount of the elevation actuator 445 is long, a linear portion to be secured in the interior space of the working beam 430 becomes longer by the amount, and thus the above-described stepped portion (see FIG. 4) cannot be installed in the working beam 430 and it is difficult to secure a bending strength of the working beam 430. In this regard, in the present embodiment, as described above, as the chain 441 is released or rewound by moving the reversal sheave 444 which an intermediate portion of the chain 441 contacts around the reversal sheave 444, an extended amount necessary for the elevation actuator 445 can be shorter, and a linear portion to be secured in the interior space of the working beam 430 can be short correspondingly. As a result, a stepped portion may be installed in the working beam 430, a degree of freedom at an installed location of the stepped portion may be increased, and a bending strength of the working beam 430 may be efficiently secured. Thus, the load W which is a long heavy load can be stably loaded or unloaded while achieving a small size and light weight of the working beam 430.

Further, as the working beam elevating unit 440 is received in the interior space of the working beam 430, a traveling path of the vehicle 1 can be restrained from being limited, and a height size of the load loadable on the vehicle body 20 can be larger (see FIG. 1).

That is, if the working beam elevating unit 440 is installed at an upper surface side (upper side of FIG. 5) of the working beam 430, the height of the vehicle 1 is increased and the traveling path of the vehicle 1 is limited by the amount by which the working beam elevating unit 440 protrudes upward, whereas if the working beam elevating unit 440 is installed at a lower surface side (lower side of FIG. 5) of the working beam 430, an interval between the working beam 430 and the vehicle body 20 becomes narrow and a height size of the load loadable on the vehicle body 20 is limited by the amount by which the working beam elevating unit 440 protrudes downward (see FIG. 1).

In this regard, as in the present embodiment, by receiving the working beam elevating unit 440 in the interior space of the working beam 430, the height of the vehicle 1 becomes lower and the interval between the working beam 430 and the vehicle body 20 can be widened while the traveling path of the vehicle 1 is restrained from being limited by the height of the vehicle 1, and the height size of the load loadable on the vehicle body 20 can become larger (see FIG. 1).

Further, if the working beam elevating unit 440 is installed at a side surface side of the working beam 430, a structure for offsetting the pass line of the chain is necessary to locate the chain 441 at a widthwise center of the working beam 430, and thus the structure becomes complex and product costs are increased. In this regard, as the working beam elevating unit 440 is received in the interior space of the working beam 430, the chain 441 can be disposed at the widthwise center (a direction perpendicular to the paper of FIG. 5) of the working beam 430. Thus, as a structure for offsetting a pass line of the chain 441 may be unnecessary, the structure can be simplified and product costs can be reduced correspondingly.

Further, as the working beam elevating unit 440 is received in the interior space of the working beam 430, the working beam elevating unit 440 can be protected and damage due to collision with another structure and deterioration due to rain and wind can be restrained.

The extraction/retraction driving unit 700 includes, in addition to the elevation actuator 445, a hydraulic pump configured to supply the working fluid (hydraulic pressure) to the elevation actuator 445, a switching valve installed between the hydraulic pump and the elevation actuator 445 and configured to switch a supply direction of the hydraulic pressure to the elevation actuator 445, and a counterbalance valve installed between the switching valve and the elevation actuator 445 and configured to apply a back pressure to a flow from the elevation actuator 445 to the switching valve. The configuration and operation of the extraction/retraction driving unit 700 are the same as those of the rotation driving unit 500 (see FIG. 3), and thus a description thereof will be omitted.

Here, a protective plate 446 made of a resin material is installed along a pass line of the chain 441 on an upper surface of the bottom wall of the working beam 430 and an upper surface of the tube of the elevation actuator 445. Accordingly, an absorbing operation can be shown during a collision due to vibrations of the chain 441, and the chain 441 or the elevation actuator 445 can be prevented from being worn out or damaged.

Next, a loading / unloading operation of the load W by the loading / unloading apparatus 40 will be described with reference to FIGS. 6A-6F.

FIGS. 6A-6F are schematic diagrams illustrating a state transition when the load W is loaded and unloaded by the loading / unloading apparatus 40. Further, in FIGS. 6A-6F, only a configuration necessary for a description of the loading / unloading operation is schematically illustrated for simplification of the drawings and easy understanding.

Further, in FIGS. 6A-6F, an object to be loaded or unloaded is referred to as a load W1 and is hatched, and a load loaded on the vehicle body 20 and which is not an object to be loaded or unloaded is referred to as a load W2, and its hatching is omitted.

First, an operation of loading a load W positioned in a construction field on the vehicle body 20 will be described with reference to FIGS. 6A to 6C. In this case, the pair of booms 410 is rotated in the left or right direction of the vehicle body 20, and as illustrated in FIG. 6A, after the working beam 430 is located above the load W1 positioned in the construction field, the lifting jig 450 is connected to the load W1. Next, the working beam 430 is raised by the working beam elevating unit 440 (see FIG. 5). Accordingly, the load W1 is suspended and maintained on the lifting jigs 450, and is suspended in the construction field. Thereafter, the pair of booms 410 is rotated toward the left or right direction (that is, the direction of the vehicle body 20, the right direction of FIG. 6A) of the vehicle body 20. Accordingly, as illustrated in FIG. 6B, as the load W1 is moved from the construction field onto the vehicle body 20 (a side of the load W2 in FIG. 6B) together with the working beam 430, the working beam 430 is lowered by the working beam elevating unit 440, and as illustrated in FIG. 6C, after the load W1 is loaded on the vehicle body 20, the connections of the lifting jigs 450 are released. As a result, the load W1 is loaded on the vehicle body 20.

Thereafter, an operation of unloading a load W1 loaded on the vehicle body 20 in a construction field will be described with reference to FIGS. 6A to 6C. In this case, the operation is a reverse operation of the above-described operation of loading a load. That is, the pair of booms 410 is rotated in the left or right direction of the vehicle body 20, and as illustrated in FIG. 6C, after the working beam 430 is located above the load W1 loaded on the vehicle body 20, the lifting jig 450 is connected to the load W1. Next, the working beam 430 is raised by the working beam elevating unit 440 (see FIG. 5). Accordingly, as illustrated in FIG. 6B, the load W1 is suspended and maintained on the lifting jigs 450, and is suspended on the vehicle body 20. Thereafter, the pair of booms 410 is rotated toward the left or right direction (that is, the direction of the construction field, the left direction of FIG. 6A) of the vehicle body 20. Accordingly, as the load W1 is moved from the vehicle body 20 onto the construction field together with the working beam 430, the working beam 430 is lowered by the working beam elevating unit 440, and as illustrated in FIG. 6A, after the load W1 is positioned in the construction field, the connections of the lifting jigs 450 are released. As a result, the load W1 is unloaded on the construction field.

Thereafter, an operation of unloading the load W1 loaded on the vehicle body 20 in a construction field while crossing the load W2 loaded on the vehicle body 20 will be described with reference to FIGS. 6C to 6F. In this case, the pair of booms 410 is rotated in the left or right direction of the vehicle body 20, and as illustrated in FIG. 6C, after the working beam 430 is located above the load W1 loaded on the vehicle body 20, the lifting jig 450 is connected to the load W1. Next, the working beam 430 is raised by the working beam elevating unit 440 (see FIG. 5), and the pair of booms 410 is extended (the protruding/retracting portion 412 protrudes from the body 411). (See FIG. 2B) Accordingly, as illustrated in FIG. 6D, the load W1 is suspended and maintained on the lifting jigs 450 and is suspended on the vehicle body 20, and the load W1 is located above (the upper side of FIG. 6D) the load W2. Thereafter, the pair of booms 410 is rotated toward the left or right direction (that is, the direction of the construction field, the right direction of FIG. 6E) of the vehicle body 20. Accordingly, as illustrated in FIG. 6E, as the load W1 is moved from the vehicle body 20 in the construction field together with the working beam 430 while crossing an upper side of the load W2, the working beam 430 is lowered by the working beam elevating unit 440, and as illustrated in FIG. 6F, after the load W1 is positioned in the construction field, the connections of the lifting jigs 450 is released. As a result, the load W1 is unloaded on the construction field while crossing the load W2.

Thereafter, an operation of loading the load W positioned in a construction field on the vehicle body 20 while crossing the load W2 loaded on the vehicle body 20 will be described with reference to FIGS. 6C to 6F. In this case, the pair of booms 410 is rotated in the left or right direction of the vehicle body 20, and as illustrated in FIG. 6F, after the working beam 430 is located above the load W1 positioned in the construction field, the lifting jigs 450 are connected to the load W1. Next, the working beam 430 is raised by the working beam elevating unit 440 (see FIG. 5). Accordingly, the load W1 is suspended and maintained on the lifting jigs 450, and is suspended in the construction field. At the same time, the pair of booms 410 is extended (the protruding/retracting portion 412 protrudes from the body 411) (See FIG. 2B). Thereafter, the pair of booms 410 is rotated toward the left or right direction (that is, the direction of the vehicle body 20, the left direction of FIG. 6E) of the vehicle body 20. Accordingly, as illustrated in FIG. 6E, as the load W1 is moved from the construction field onto the vehicle body 20 (which is a side of the load W2 in FIG. 6B) together with the working beam 430 as illustrated in FIG. 6D while crossing the load W2, the working beam 430 is lowered by the working beam elevating unit 440, and by contracting the pair of booms, and as illustrated in FIG. 6C, after the load W1 is loaded on the vehicle body 20, the connections of the lifting jigs 450 is released. As a result, the load W1 is loaded on the vehicle body 20 while crossing the load W2.

In this way, as the loading/unloading apparatus 40 may extend or contract the booms 410 axially, when the load W1 loaded on the vehicle body 20 is unloaded in a construction field or the load W1 positioned in the construction field is loaded on the vehicle body 20, the load w1 can be loaded by axially extending the boom 410 while crossing an upper side of the load W2 loaded on the vehicle body 20. Thus, even if the load W2 is not moved in advance, the load w1 may be loaded or unloaded, and thus working efficiency when the load W1 is loaded or unloaded can be enhanced. Further, even when the load W2 is positioned in the construction field, the load W1 can be loaded or unloaded by extending the booms 410 while crossing the load W2 (that is, even if the load W2 is not moved in advance), achieving enhancement of working efficiency.

Meanwhile, after the load W1 is loaded or unloaded, a height of the vehicle 1 may be lowered by contracting the booms 410 axially. Thus, a traveling path of the vehicle 1 can be restrained from being limited by the height of the vehicle 1.

Figure 7A:
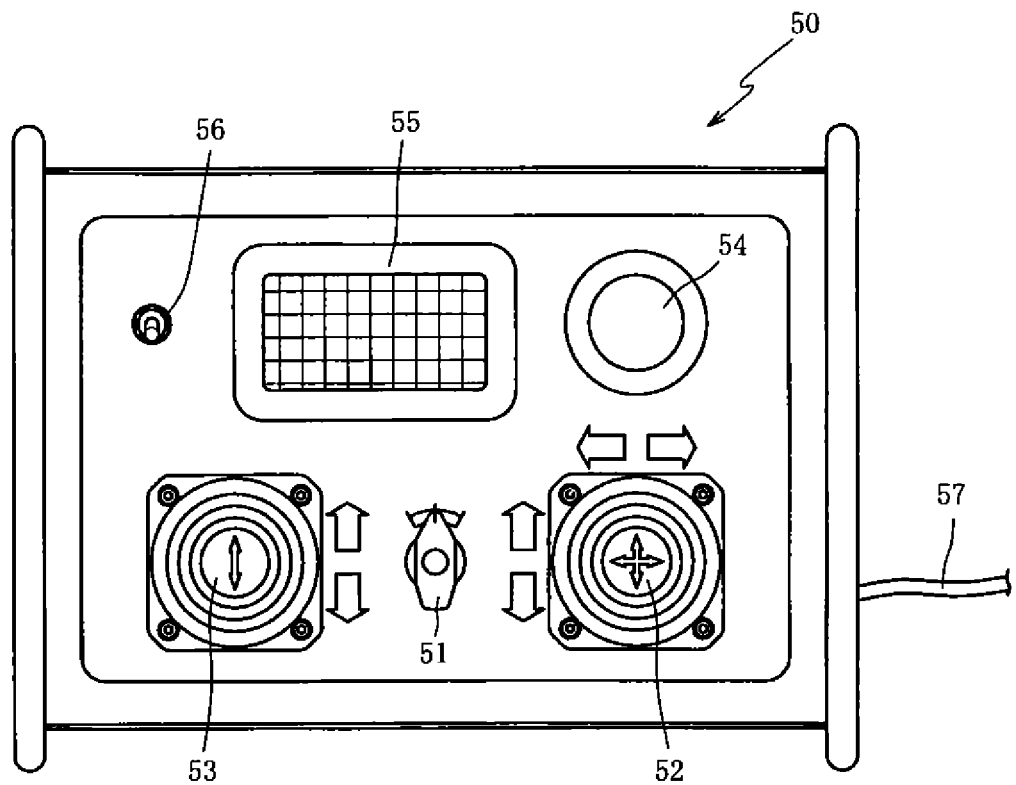
FIG. 7A is a plan view of a manipulation remote control unit.
Figure 7B:
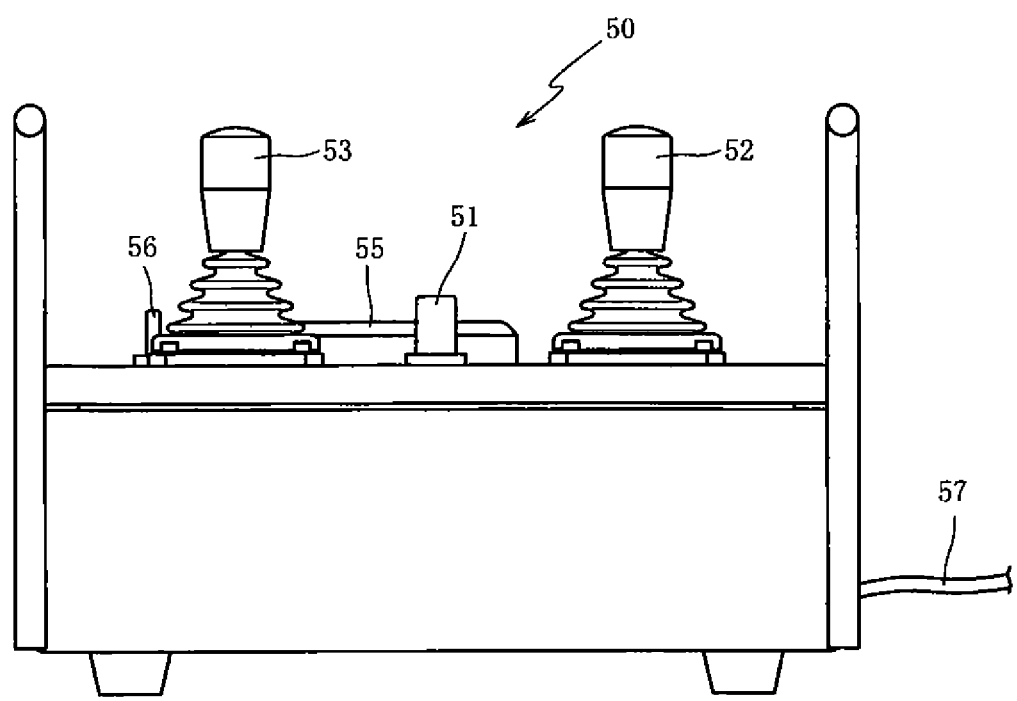
FIG. 7B is a front view of the manipulation remote control unit.

Next, the manipulation remote control unit 50 will be described with reference to FIG. 7. FIG. 7A is a plan view of the manipulation remote control unit 50, and FIG. 7B is a front view of the manipulation remote control unit 50.

As illustrated in FIG. 7, the manipulation remote control unit 50 mainly includes an acceleration switch 51 for setting an RPM of an engine, a first manipulation lever 52 and a second manipulation lever 53 installed on the left and right sides of the switch 51, an emergency stop switch 54 installed above the first manipulation lever 52, a speaker 55 installed on the left side of the emergency stop switch 54, and a power switch 56 installed on the left side of the speaker 55.

The acceleration switch 51 is a switch for setting an RPM of the engine according to the weight of the load W, and is configured to select three values of a low speed, a middle speed, and a high speed according to the manipulation location.

The first manipulation lever 52 is a manipulation lever for instructing a rotation of the booms 410 and an elevation of the working beam 430, and a rotation operation of the booms 410 is instructed by a left or right direction (left or right direction of FIG. 7) manipulation and an elevation operation of the working beam 430 is instructed by an upward or downward direction (upward or downward direction of FIG. 7) manipulation. That is, if the first manipulation lever 52 is manipulated in the left or right direction, the controller 70 (see FIG. 8) drives and controls the rotation actuator 420 according to a manipulation direction from a neutral position thereof, a direction depending on a manipulation amount from the neutral position, and an operation speed to rotate the booms 410 in the left or right direction of the vehicle body 20. Likewise, if the first manipulation lever 52 is manipulated in the upward or downward direction, the controller 70 (see FIG. 8) drives and controls the elevation actuator 445 according to a manipulation direction from a neutral position thereof, a direction depending on a manipulation amount from the neutral position, and an operation speed to elevate the working beam 430 upward and downward.

The second manipulation lever 53 is a manipulation lever for instructing an extension or contraction of the boom 410, and an extension or contraction operation of the boom 410 is instructed by an upward or downward direction (upward or downward direction of FIG. 7) manipulation. That is, if the second manipulation lever 53 is manipulated in the upward or downward direction, the controller 70 drives and controls the extension/contraction actuator 610 according to a manipulation direction from a neutral position thereof, a direction depending on a manipulation amount from the neutral position, and an operation speed to extend or contract the boom 410.

Further, if the first manipulation lever 52 and the second manipulation lever 53 are manipulated to a neutral position, the controller 70 adjusts operation speeds of the actuators 420, 445, and 610 to 0 and stops an operation of the loading/unloading apparatus 40.

The emergency stop switch 54 is a switch for instructing an emergency stop of the loading/unloading apparatus 40, and an emergency stop of the loading/unloading apparatus 40 is instructed by pressing the emergency stop switch 54. The controller 70 gives a priority to an instruction due to pressing of the emergency stop switch 54 over other instructions, and emergency-stops operations of the rotation actuators 420, the elevation actuators 445, and the like.

The speaker 55 is directed to inform an operator of an operation state of the loading/unloading apparatus 40 through a sound, and when a load factor of the loading/unloading apparatus 40 exceeds a predetermined reference value, a warning sound is emitted. The power switch 56 is a switch for turning on or off a power source of the manipulation remote control unit 50. When the power source is switched on by the power switch 56, the manipulations of the manipulation members 51 to 54 become valid (manipulation instructions are transmitted), and when the power source is switched off by the power switch 56, the manipulations of the manipulation members 51 to 54 become invalid (manipulation instructions are not transmitted).

Further, the manipulation remote control unit 50 includes a cable 57 extending from aside surface thereof, and a remote control side connection terminal 910 (see FIG. 8) installed at a tip end of the cable 57, and the remote control side connection terminal 910 is detachably connected to the first connection terminal 840 or the second connection terminal 850 (see FIG. 8 for both). That is, the manipulation remote control unit 50 is detachably wired and connected to the controller 70.

Next, a detailed configuration of the controller 70 will be described with reference to FIG. 8. FIG. 8 is a block diagram illustrating an electrical configuration of the controller 70. Further, in FIG. 8, only a main configuration will be described, and a description of other configurations as other input/output units 860 and 940 will be omitted. Further, a state where the manipulation remote control unit 50 is connected to the first connection terminal 840 is illustrated in FIG. 8.

As illustrated in FIG. 8, the controller 70 includes a CPU 71, a ROM 72, and a RAM 73, which are connected to the input/output port 75 via bus lines 74. Further, a unit such as the rotation driving unit 500 is connected to the input/output port 75.

The CPU 71 is a calculation unit for controlling the units connected through the bus line 74, and the ROM 72 is an unrewritable nonvolatile memory for storing control programs (for example, programs of the flowcharts illustrated in FIGS. 11 to 13) executed by the CPU 71 or fixed value data.

Further, an operation speed map 72a is installed in the ROM 72. The operation speed map 72a is a map storing relationships between the manipulation amounts of the manipulation levers 52 and 53 (see FIG. 7) and operation speeds of the actuators 420, 445, and 610 (see FIG. 9), and the CPU 71 determines operation speeds of the actuators 420, 445, and 610 based on the contents of the operation speed map 72a and controls an operation of the loading/unloading apparatus 40 (see FIG. 1A). Here, the operation speed map 72a will be described with reference to FIG. 9.

Figure 9:
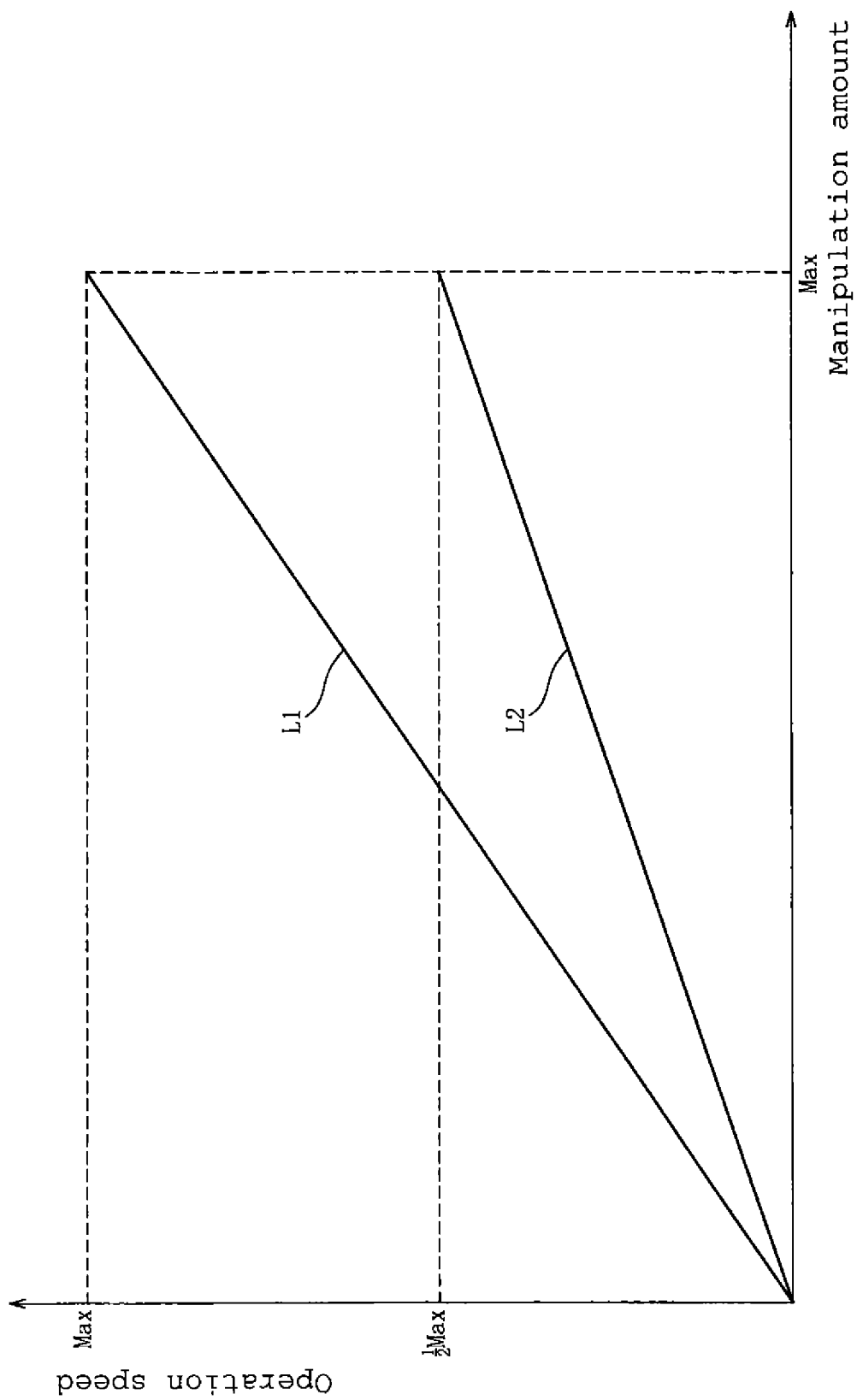
FIG. 9 is a schematic diagram schematically illustrating contents of an operation speed map.

FIG. 9 is a schematic diagram schematically illustrating the contents of the operation speed map 72a. Further, the operation speed map 72a stores three types of relationships, that is, a first relationship between a manipulation amount from a neutral position of the first manipulation lever 52 to the left or right direction (that is, a direction instructing rotation operations of the pair of booms 410) and an operation speed of the rotation actuator 420, a second relationship between a manipulation amount from the neutral position of the first manipulation lever 52 to an upward or downward direction (that is, a direction instructing an elevation of the working beam 430) and an operation speed of the rotation actuator 445, and a third relationship between a manipulation amount from a neutral position of the second manipulation lever 53 to an upward or downward direction (a direction instructing an extension/contraction of the pair of booms 410) and the extension/contraction actuator 610 (see FIGS. 1 and 7). However, here, the first relationship will be described as a representative example, and the second and third relationships are the same as the first relationship, and thus a detailed description thereof will be omitted.

As illustrated in FIG. 9, the operation speed map 72a stores a first operation speed line diagram L1 and a second operation speed line diagram L2 representing a relationship between a manipulation amount to the left or right direction of the first manipulation lever 52 and an operation speed of the rotation actuator 420. In the present embodiment, the first operation speed line diagram L1 and the second operation speed line diagram L2 are defined such that when a manipulation amount of the first manipulation lever 52 to the left or right direction is '0' (that is, in a neutral position), an operation speed becomes '0' (that is, stop), and an operation speed of the rotation actuator 420 is defined to become higher in proportion to the manipulation amount of the first manipulation lever 52 to the left or right direction from the neutral position. Further, in the embodiment, a maximum operation speed in the second operation speed line diagram L2 is defined to be approximately a half of a maximum operation speed in the first operation speed line diagram L1.

Here, the second operation speed line diagram L2 is referenced when an overload flag 73b (see FIG. 8) is on (that is, as described below, when a load factor of the loading/unloading apparatus 40 reaches a predetermined reference value, or when although a load factor of the loading/unloading apparatus 40 reaches a predetermined reference value and then is below the predetermined reference value, the manipulation positions of both the manipulation levers 52 and 53 do not return to a neutral position yet (a manipulation amount is '0'), and the first operation speed line diagram L1 is referenced when the overload flag 73b is off (that is, when a load factor of the loading/unloading apparatus 40 does not reach a predetermined reference value yet, or when a load factor of the loading/unloading apparatus 40 reaches the predetermined reference value and then is below the predetermined reference value, and both the manipulation levers 52 and 53 return to a neutral position (a manipulation amount is '0').

That is, if the CPU 71 acquires a manipulation amount of the first manipulation lever 52 to the left or right direction, the CPU 71 reads out an operation speed corresponding to the manipulation amount from the second speed line diagram L2 when the overload flag 73b is on, and reads out the operation speed from the first speed line diagram L1 when the overload flag 73b is off, to drive the rotation actuators 420 at the read-out operation speed. Thus, when the overload flag 73b is on, an operation speed of the rotation actuator 420 becomes a low speed even if the manipulation amount of the first manipulation lever 52 to the left or right direction is the same as compared with the case where the overload flag 73b is off. Further, the driving directions (extension/contraction directions) of the rotation actuators 420 are determined according to the manipulation direction from the neutral position of the first manipulation lever 52.

In this way, as an operation speed of the loading/unloading apparatus 40 is adjusted according to a manipulation amount from a neutral position of the first manipulation lever 52, the loading/unloading apparatus 40 can be operated at a proper operation speed depending on a situation such as a load state and working efficiency can be enhanced. In particular, after the overload flag 73b is on and an operation speed of the loading/unloading apparatus 40 is reduced, a load factor of the loading/unloading apparatus 40 reaches 90% (a second reference value) and a cautious manipulation is required, and therefore as an operation speed of the loading/unloading apparatus 40 may be adjusted according to a manipulation amount from the neutral position of the first manipulation lever 52 even in this case, the manipulation can be finely adjusted and a rise in the load factor due to a careless manipulation of the operator can be restrained. Thus, a safety can be secured when a long heavy load is loaded or unloaded.

Further, since a change rate of operation speed is proportional to a manipulation amount of the first manipulation lever 52 in the first operation speed line diagram L1 and the second operation speed line diagram L2, a manipulation feeling acquired when the an operation speed of the loading/unloading apparatus 40 is changed by manipulating the first manipulation lever 52 in the case where the operation speed is reduced (based on the second operation speed line diagram L2) and a manipulation feeling acquired when an operation speed of the loading/unloading apparatus 40 is changed by manipulating the first manipulation lever 52 in the case of a normal speed (based on the first operation speed line diagram L1) may be approximated. Thus, since a change in manipulation performance of the manipulation remote control unit 50 may be restrained before and after an operation speed of the loading/unloading apparatus 40 is reduced, a safety can be secured when a long heavy load is loaded or unloaded.

Referring back to FIG. 8, the description will be continued. The RAM 73 is a memory for storing various data in a rewritable way when a control program is executed, and as illustrated in FIG. 8, the remote control memory 73a and the overload flag 73b are installed in the RAM 73.

The remote control memory 73a is a memory illustrating a connection state of the manipulation remote control unit 50 to the first connection terminal 840 and the second connection terminal 850, and an integer value of 0 to three is stored when remote control recognizing processing (see FIG. 12) to be described below is executed. That is, the remote control memory 73a stores '0' when the manipulation remote control unit 50 is connected to neither the first connection terminal 840 nor the second connection terminal 850, stores '1' when the manipulation remote control unit 50 is connected only to the first connection terminal 840, stores '2' when the manipulation remote control unit 50 is connected only to the second connection terminal 850, and stores '3' when the manipulation remote control unit 50 is connected to both the first connection terminal 840 and the second connection terminal 850. As the CPU 71 refers to a value stored in the remote control memory 73a, the CPU 71 may recognize a connection state of the manipulation remote control unit 50 to the first connection terminal 840 and the second connection terminal 850.

The overload flag 73b is a flag representing whether an operation state of the loading /unloading apparatus 40 is a state where an operation speed of the loading / unloading apparatus 40 is to be set to a speed reduction mode, and is switched to on or off when operation control processing (see FIG. 13A and FIG. 13B) to be described below is executed. When the overload flag 73b is on, the CPU 71 determines that the operation state of the loading / unloading apparatus 40 is in a state where the operation speed thereof is to be set to a speed reduction state (that is, a state where operation speeds of the actuators 420, 445, and 610 for the manipulation amounts of the manipulation levers 52 and 53 are determined based on the second operation speed line diagram L2). Here, a method of setting the overload flag 73b will be described with reference to FIG. 10.

Figure 10:
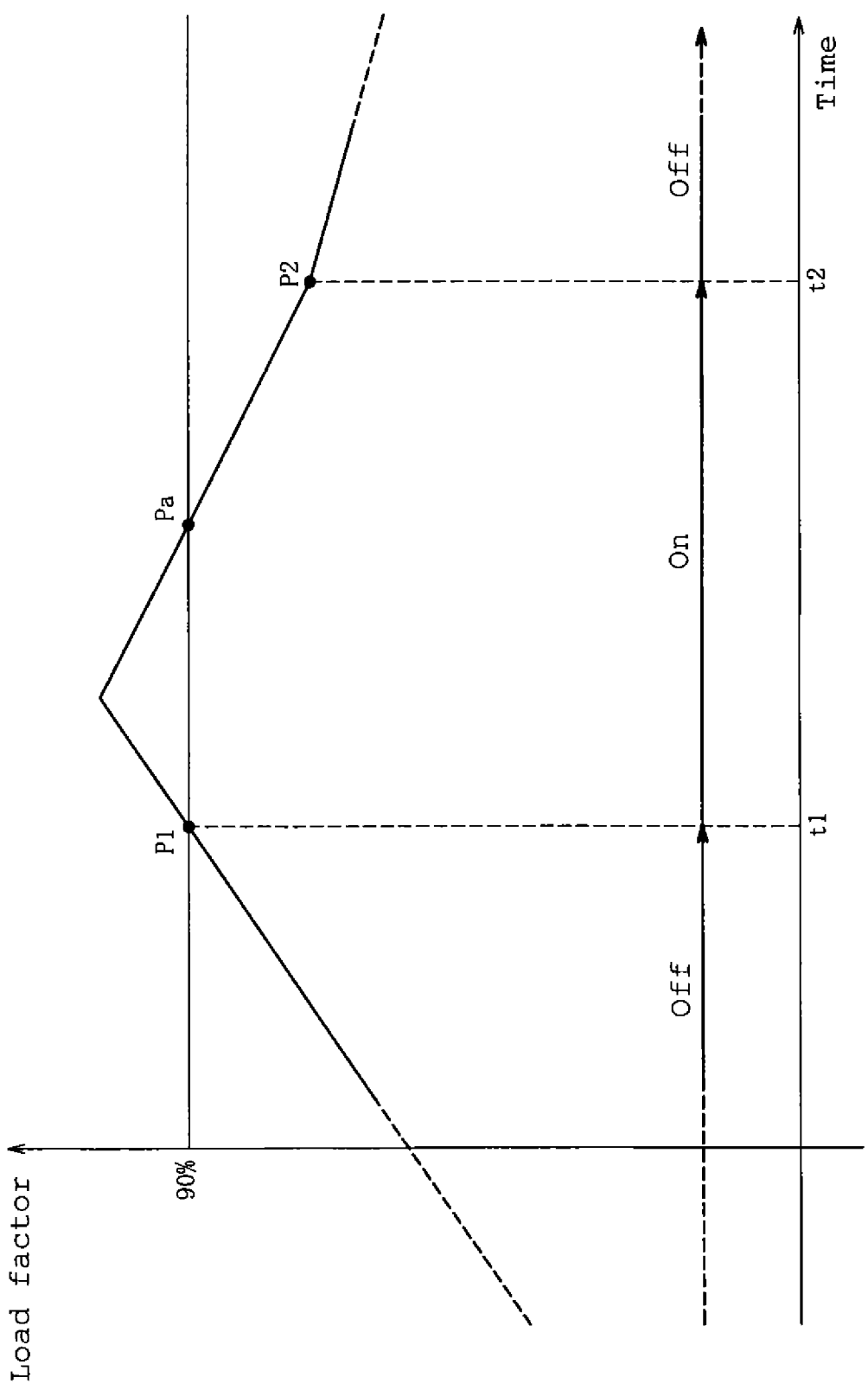
FIG. 10 is a schematic diagram schematically illustrating a time change in a load factor of the loading/unloading apparatus.

FIG. 10 is a schematic diagram schematically illustrating a time change of a load factor of the loading/unloading apparatus 40. Further, in FIG. 10, a state of the load factor flag 73b is described as on or off in correspondence to a time change of the load factor. Further, in FIG. 10, it is assumed that a load factor of the loading/unloading apparatus 40 does not reach 90% (that is, 0% to 90%) in a time period till a time t1.

The overload flag 73b is set to off when a load factor of the loading/unloading apparatus 40 does not yet reach a predetermined reference value (90% in the present embodiment), and then is set to on if a load factor of the loading/unloading apparatus 40 reaches the predetermined reference value (90% in the present embodiment), whereas after the overload flag 73b is on as a load factor of the loading/unloading apparatus 40 reaches a predetermined reference value, the load factor of the loading/unloading apparatus 40 is below the predetermined reference value and the overload flag 73b is set to off when both the manipulation levers 52 and 53 return to a neutral position (the manipulation amount is '0').

That is, as illustrated in FIG. 10, the load factor increases from a state where the overload flag 73b is set to off, while being accompanied by the operation of the loading/unloading apparatus 40, and if the load factor reaches 90% at the time t1 (a position P1), the overload flag 73b is switched from off to on. Further, accordingly, since an operation speed of the loading/unloading apparatus 40 is determined based on the second operation speed line diagram L2 (see FIG. 9), the loading/unloading apparatus 40 is operated in a speed reduction state after the time t1. Further, as will be described below, if the load factor reaches 100% (a first reference value), an operation of the loading/unloading apparatus 40 is stopped (see S15 of FIG. 11).

In this case, if the load factor of the loading/unloading apparatus 40 reaches the second reference value (90%) (a position P1) which is a load factor lower than the first reference value, an operation speed of the loading/unloading apparatus 40 becomes a speed reduction state after the time t1, and thus vibrations of a load can be restrained from being generated even when the load W of a long heavy load is loaded or unloaded. Further, in this way, since the manipulation is finely adjusted easily as the operation speed of the loading/unloading apparatus 40 becomes a speed reduction state, the load factor may be restrained from reaching 100% (the first reference value) by a careless manipulation of the operator. Further, even when the load factor reaches 100% (the first reference value), an operation speed of the loading/unloading apparatus 40 is reduced, and thus vibrations of a load can be restrained from being generated when the loading/unloading apparatus 40 is stopped.

Thereafter, if the load factor passes through a position Pa and becomes below 90% while being accompanied by an operation of the loading/unloading apparatus 40 and then the manipulation positions of both the manipulation levers 52 and 53 return to the neutral position (the manipulation amount is '0') at the time t2 (position P2), the overload flag 73b is switched from on to off. Further, accordingly, since an operation speed of the loading/unloading apparatus 40 is determined based on the first operation speed line diagram L1 (see FIG. 9), the loading/unloading apparatus 40 is operated at a normal speed after the time t2.

In this way, in the present embodiment, in a period from the time t1 to the time t2, when a load factor of the loading/unloading apparatus 40 is below 90% (the position Pa), the overload flag 73b is not directly switched from on to off, but even when the load factor is below 90%, at least one of the manipulation levers 52 and 53 is manipulated, and while the loading/unloading apparatus 40 is operated (while the load factor is present in a region from the position Pa of FIG. 10 to the position P2), the overload flag 73b remains on and an operation speed of the loading/unloading apparatus 40 is reduced.

The switching of the overload flag 73b from on to off is set in this way, and thus the following effects are shown. That is, when the load factor of the loading/unloading apparatus 40 reaches 90% (the second reference value) (the position P1), and then the load factor is below 90% (the position Pa) while being accompanied by the operation of the loading/unloading apparatus 40, if an operation speed of the loading/unloading apparatus 40 is abruptly recovered from a speed reduction state to a normal speed, manipulation performance is changed, making it easy to generate vibrations in the load W. In this regard, as described above, even when the load factor is below 90%, the operation speed of the loading/unloading apparatus 40 is not directly recovered to a normal speed, but is maintained in a speed reduction state, and thus the load W can be smoothly moved even when the load factor is converted (when the load factor passes through the position Pa) and vibrations of the load W can be restrained.

Further, in this case, a condition for recovery to the normal speed (the position P2) is that both the first manipulation lever 52 and the second manipulation lever 53 of the manipulation remote control unit 50 are manipulated to a neutral position. That is, in a condition where an operation of the loading/unloading apparatus 40 is stopped, since the operation speed of the loading/unloading apparatus 40 returns from a speed reduction state to a normal speed, vibrations of the load W can be restrained from being generated by avoiding abruptly the operation speed recovering a normal speed from a speed reduction state during the operation of the loading/unloading apparatus 40. As a result, a safety can be secured when the long heavy load is loaded or unloaded.

Referring back to FIG. 8, the description will be continued. As described above, the rotation driving unit 500 is a unit for rotating the booms 410 toward the left or right direction of the vehicle body 20 (see FIGS. 6A-6F), and mainly includes the four rotation actuators 420, the hydraulic pump 501 and the switching valve 502 (see FIG. 3), and a drive control circuit (not illustrated) for driving and controlling the hydraulic pump 501 and the switching valve 502 based on an instruction from the CPU 71 to extend or contract the rotation actuators 420. Further, the four rotation actuators 420 correspond to the two rotation actuators 420 for rotating the boom 410 located at the front side of the vehicle body 20, and the two rotation actuators 420 for rotating the boom 410 located at the rear side of the vehicle body 20 (see FIGS. 1 and 2).

As described above, the extension/contraction driving unit 600 is a unit for extending or contracting the booms 410 (see FIG. 2), and mainly includes two extension/contraction actuators 610, a hydraulic pump and a switching valve, and a drive control unit (not illustrated) for driving and controlling the hydraulic pump and the switching valve based on an instruction from the CPU 71 to extend or contract the extension/contraction actuators 610. Further, the two extension/contraction actuators 610 correspond to an extension/contraction actuator 610 for extending or contracting the boom 410 located at the front side of the vehicle body 20, and an extension/contraction actuator 610 for rotating the boom 410 located at the rear side of the vehicle body 20 (see FIGS. 1 and 2).

As described above, the extraction/retraction driving unit 700 is a unit for releasing or rewinding the chain 441 (see FIG. 5), and mainly includes two elevation actuators 445, a hydraulic pump and a switching valve, and a drive control unit (not illustrated) for driving and controlling the hydraulic pump and the switching valve based on an instruction from the CPU 71 to extend or contract the elevation actuators 445. Further, the two elevation actuators 445 correspond to an elevation actuator 445 received in one lengthwise side (the front side of the vehicle body 20) of the working beam 430, and an elevation actuator 445 received in an opposite lengthwise side of the working beam 430 (the rear side of the vehicle body 20) (see FIGS. 1 and 5).

The load factor display unit 810 is a unit for displaying information on an operation state of the loading/unloading apparatus 40 (see FIG. 1), and mainly includes two LCDs 811 which are liquid crystal display devices, and a liquid crystal control circuit (not illustrated) for controlling the display contents of the LCDs 811 based on an instruction from the CPU 71, respectively. If acquiring various detection values from the state detecting units 830 to be described below, the CPU 71 processes the acquired various detection values, and then displays the processed result (for example, a load factor, a working radius, a suspension load, and the like) on the LCD 811 as information on the operation state of the loading/unloading apparatus 40. The operator may recognize information on the operation state of the loading/unloading apparatus 40 based on the display. Further, the two LCDs 811 correspond to an LCD 811 installed in the operator cab 30 located at the front side of the vehicle body 20, and an LCD 811 installed in the operator cab 30 located at the rear side of the vehicle body 20 (see FIG. 1).

A warning unit 820 is a unit for notifying the operator that a load factor of the loading/unloading apparatus 40 (see FIG. 1) exceeds a predetermined reference value, and mainly includes a display lamp 821 installed in the working beam 430 (see FIG. 1), and a display control circuit (not illustrated) for controlling display modes of the display lamp 821 based on an instruction from the CPU 71. The CPU 71 calculates a load factor of the loading/unloading apparatus 40 based on various detection values acquired from the state detection unit 830 to be described below, and changes the display mode of the display lamp 821 according to a value of the calculated load factor. Further, in the present embodiment, in the display lamp 821, three flashing lights light emitting colors of which are blue, yellow, and red are stacked in a height direction, and when a load factor of the loading/unloading apparatus 40 is equal to or less than 90%, the blue flashing light is turned on, when the load factor reaches 90%, the yellow flashing light is turned on, and when the load factor reaches 100%, the red flashing light is turned on.

The state detection unit 830 is a unit for detecting a state of the loading/unloading apparatus 40 and outputting the detection result to the CPU 71, and mainly includes a boom angle sensor 831, a boom length sensor 832, a load sensor 833, a vehicle body angle sensor 834, a loaded object sensor 835, and an output circuit (not illustrated) for processing the detection results of the sensors 831 to 835 and outputting the detection results to the CPU 71.

The boom angle sensor 831 is an angle sensor for detecting a rotation angle of the boom 410, and an inclination angle of the boom 410 with respect to the vehicle body 20 is calculated by the CPU 71 based on the detection value. Further, in the present embodiment, the boom angle sensors 831 are installed in the pair of booms 410 located at the front and rear sides of the vehicle body 20, respectively, and rotation operations of the pair of booms 410 are controlled based on a difference in the detection values of both the boom angle sensors 831 and the rotation angles are synchronized.

The boom length sensor 832 is a stroke sensor for detecting an extension/contraction degree of the boom 410 (a protruding degree of the protruding/retracting portion 412 from the body 411), and a length of the boom 410 is calculated by the CPU 71 based on the detection value. Further, in the present embodiment, the boom length sensors 832 are installed in the pair of booms 410 located at the front and rear sides of the vehicle body 20, respectively, and extension/contraction operations of the pair of booms 410 are controlled based on a difference in the detection values of both the boom length sensors 832 and the extension/contraction degrees are synchronized.

The load sensor 833 is a load sensor for detecting a suspension load applied to the connecting body 412a of the boom 410 using the chain 441 interposed between the working beam 430 and the load sensor 833, and a weight of the load W is calculated by the CPU 71 based on the detection value. Further, in the present embodiment, the load sensors 833 are installed in the pair of booms 410, respectively, and an unbalance of the suspension state of the load W may be detected from a difference in the detection values of both the load sensors 833.

The vehicle body angle sensor 834 is an inclination sensor for detecting an inclination angle of the vehicle body 20 with respect to the horizontal surface, and an inclination state (pitch angles and roll angles) in the forward and rearward direction and the left and right direction of the vehicle body 20 is calculated by the CPU 71 based on the detection value. The loaded object sensor 835 is a limit switch sensor for detecting existence of the load W on a loading surface of the vehicle body 20, and a loading state of the load W on the loading surface of the vehicle body 20 is determined by the CPU 71 based on the detection value.

The CPU 71 calculates a load factor, a working radius, and a suspension load of the loading/unloading apparatus 40 based on the detection results of the sensors 831 to 835 and displays the calculated load factor, working radius, and suspension load, on the load factor display unit 810, and when the load factor reaches a predetermined reference value, the operator is notified by the display lamp 821 of the warning unit 820 and the speaker 55 of the warning unit 930.

The first connection terminal 840 and the second connection terminal 850 are terminals detachably connected to the manipulation remote control unit 50, and the rotation driving unit 500 is driven and controlled by the CPU 71 based on a manipulation instruction from the manipulation remote control unit 50 input via the first connection terminal 840 or the second connection terminal 850.

In this case, the first connection terminal 840 is installed at a rear surface side of the operator cab 30 located at the front side of the vehicle body 20, and the second connection terminal 850 is installed at a rear surface side of the operator cab 30 located at the rear side of the vehicle body 20 (see FIG. 1). Thus, the operator may properly select a connection point of the manipulation remote control unit 50 to manipulate the manipulation remote control unit 50 at the front and rear sides of the vehicle body 20 according to a working environment such as a wind direction of the field or the amount of sunlight.

Here, the CPU 71 changes a control method performed when the first manipulation lever 52 (see FIG. 7) is manipulated and the pair of booms 410 is instructed to be rotated as described below according to which connection terminal of the first connection terminal 840 and the second connection terminal 850 the manipulation remote control unit 50 is connected. Further, when the manipulation remote control unit 50 is connected to both the first connection terminal 840 and the second connection terminal 850, a manipulation instruction of at least one of the manipulation remote control units 50 becomes invalid as described below.

Further, since an on signal is output from the manipulation remote control unit 50 only while the power switch 56 (see FIG. 7) is on, the CPU 71 may determine whether the manipulation remote control unit 50 is connected to one or both of the first connection terminal 840 and the second connection terminal 850 based on the existence of the on signal.

The manipulation remote control unit 50 is a unit detachably wired and connected to the controller 70 via the first connection terminal 840 or the second connection terminal 850, and includes a CPU 571, a ROM 572, and a RAM 573, which are connected to an input/output port 575 via a bus line 574. Further, a unit such as a manipulation detecting unit 920 is connected to the input/output port 575.

The CPU 571 is a calculation unit for controlling the units connected through the bus line 574, and the ROM 572 is an unrewritable nonvolatile memory for storing control programs executed by the CPU 571 and fixed value data. The RAM 573 is a memory for rewritably storing various data when a control program is executed.

The remote control side connection terminal 910 is a terminal detachably connected to the first connection terminal 840 and the second connection terminal 850, and is connected to the input/output port 575 via a cable 57 (see FIG. 7). A manipulation instruction from the manipulation remote control unit 50 is input to the controller 70 via the remote control side connection terminal 910 and the first connection terminal 840 or the second connection terminal 850.

The manipulation detection unit 920 is a unit for detecting manipulation states (manipulation directions and manipulation angles) of the first manipulation lever 52 and the second manipulation lever 53 and outputting the detection results to the CPU 571, and mainly includes a rotation instruction sensor 52a, an elevation instruction sensor 52b, an extension/contraction instruction sensor 53a, and an output circuit (not illustrated) for processing the detection results of the instruction sensors 52a, 52b, and 53a and outputting the processed results to the CPU 571.

The rotation instruction sensor 52a is a sensor for detecting a manipulation state (that is, a manipulation instruction for rotating the pair of booms 410 in the left or right direction of the vehicle body 20, see FIGS. 6A-6F) of the first manipulation lever 52 (see FIG. 7) in the left or right direction, the elevation instruction sensor 52b is a sensor for detecting a manipulation state (that is, a manipulation instruction for elevating the working beam 430 with the working beam elevating apparatus 440, see FIG. 5) of the first manipulation lever 52 in the upward or downward direction, and the extension/contraction instruction sensor 53a is a sensor for detecting a manipulation state (that is, a manipulation instruction for extending or contracting the pair of booms 410, see FIG. 2) of the second manipulation lever 53 (see FIG. 7) in the upward or downward direction.

The warning unit 930 is a unit for notifying the operator that a load factor of the loading/unloading apparatus 40 (see FIG. 1) exceeds a predetermined reference value, and mainly includes a speaker 55 (see FIG. 7), and a voice control circuit (not illustrated) for controlling a sound emitted by the speaker 55 based on an instruction from the CPU 571. If calculating a load factor of the loading/unloading apparatus 40 based on the various detection values acquired from the state detection unit 830, the controller 70 outputs the calculation results to the manipulation remote control unit 50. The CPU 571 of the manipulation remote control unit 50 emits various warning sounds from the speaker 55 according to the input load factor value. Further, in the present embodiment, if a load factor of the loading/unloading apparatus 40 is equal to or less than 90%, no sound is emitted, whereas if the load factor reaches 90%, a first warning sound is emitted, and if the load factor reaches 100%, a second warning sound is emitted.

Figure 11:
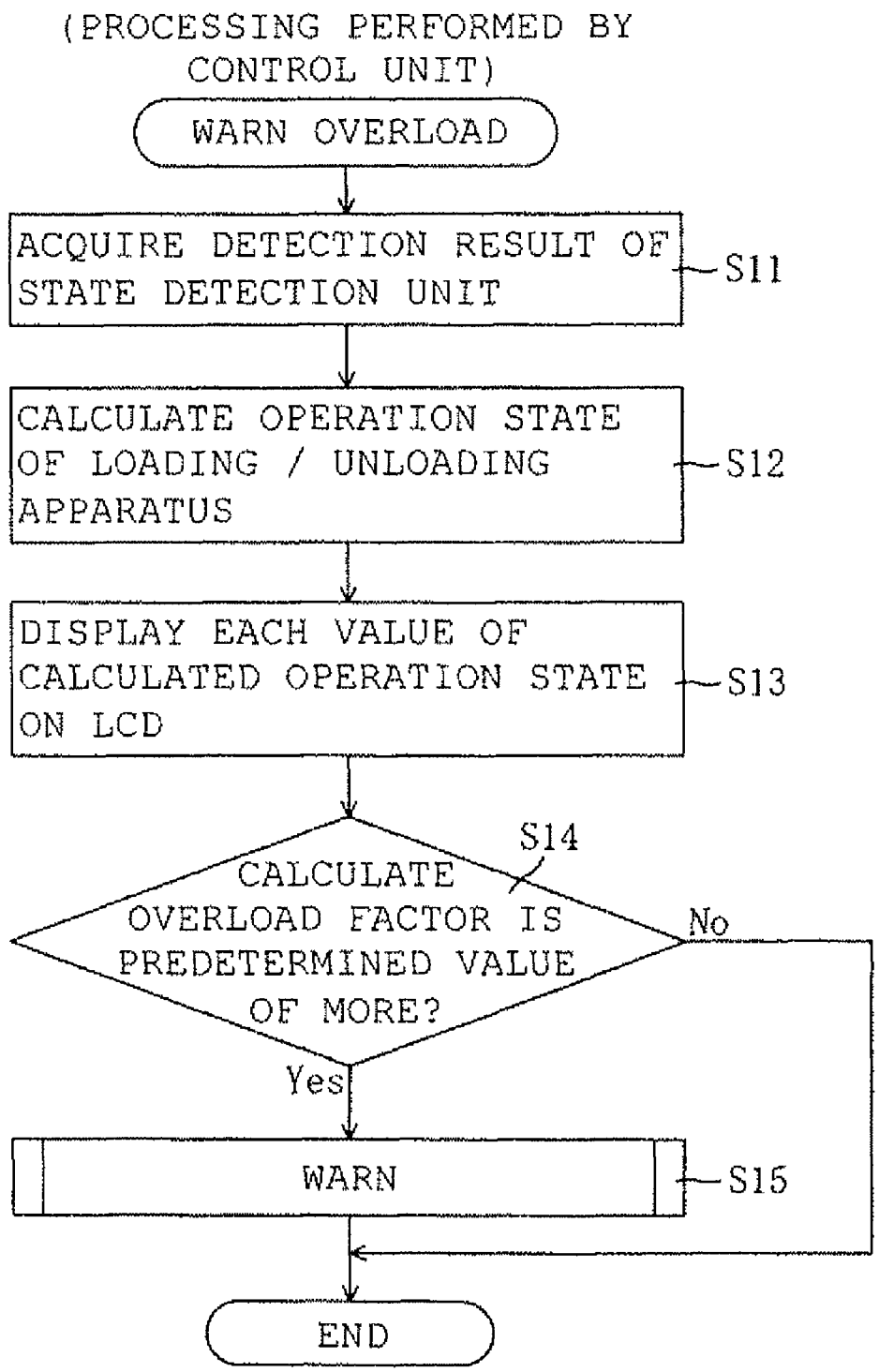
FIG. 11 is a flowchart illustrating overload warning processing.

Next, overload warning processing will be described with reference to FIG. 11. FIG. 11 is a flowchart illustrating the overload warning processing. The processing is processing repeatedly (for example, at an interval of 0.2 seconds) performed by the CPU 71 while a power source of the controller 70 is applied and processing of notifying the operator of an operation state of the loading/unloading apparatus 40.

In regard to the overload warning processing, the CPU 71 first acquires detection results by the sensors 831 to 835 of the state detection unit 830 (S11), calculates an operation state of the loading/unloading apparatus 40 based on the detection results (S12), and displays information on the calculated operation state of the loading/unloading apparatus 40 to the LCD 811. Further, as contents displayed on the LCD 811, for example, a working radius, a suspension load, a rotation angle of the boom 410, or a load factor is exemplified.

As described above, the opening window 31 is formed to be opened at a rear surface side of the operator cab 30, and the operator may view the display contents of the LCD 811 from the outside of the operator cab 30. In particular, in the present embodiment, since the operator cabs 30 are installed at the front and rear sides of the vehicle 1 and the LCDs 811 are installed to be viewable from the outside from any one of the front and rear operator cabs 30, even when the operator performs a manipulation at the front side of the vehicle body 20 or at the rear side of the vehicle body 20, the operator may manipulate the manipulation remote control unit 50 while acquiring information on the operation state of the loading/unloading apparatus 40 from the display of the LCD 811, securing a loading/unloading safety.

After the information on the operation state of the loading/unloading apparatus 40 is displayed on the LCD 811 (S13), it is determined whether a load factor of the loading/unloading apparatus 40 is equal to or more than a predetermined value (S14), and when the load factor of the loading/unloading apparatus 40 is equal to or more than the predetermined value (S14: Yes), after the warning processing (S15) is performed, the overload warning processing is ended, whereas when the load factor of the loading/unloading apparatus 40 does not reach the predetermined value (S14: No), the performance of the warning processing (S15) is skipped and the overload warning processing is ended.

Further, a first reference value, a second reference value, and a third reference value are defined as predetermined values for the load factor, and in the present embodiment, the first reference value is set to 100% and the second reference value and the third reference value are set to 90%, respectively. However, the second reference value and the third reference value may be set to different values.

Here, in the overload warning processing, when it is determined in the processing of S14 that the load factor of the loading/unloading apparatus 40 reaches the first reference value (100%) (S14: Yes), the operation of the loading/unloading apparatus 40 is stopped regardless of the manipulation state of the manipulation remote control unit 50 in the warning processing (S15). Accordingly, the vehicle 1 may be restrained from being tumbled down or the loading/unloading apparatus 40 may be restrained from being damaged as the load factor is increased by a careless manipulation of the operator.

Here, when it is determined in the processing of S14 that the load factor of the loading/unloading apparatus 40 reaches the second reference value (90%) (S14: Yes), a warning sound is emitted from the speaker 55 of the manipulation remote control unit 50 in the warning processing (S15). Accordingly, before the load factor of the loading/unloading apparatus 40 reaches the first reference value (100%) and the loading/unloading apparatus 40 is stopped, the operator may be notified by the emission of a warning sound that the load factor of the loading/unloading apparatus 40 reaches the second reference value (90%). Thus, the loading/unloading apparatus 40 may be restrained from being abruptly stopped while vibrations of the load being restrained from being generated.

Further, as the operator is notified by emitting a warning sound from the speaker 55 of the manipulation remote control unit 50, the operator manipulating the manipulation remote control unit 50 can recognize information due to the notification without averting his/her eyes from the load W. Thus, a safety can be secured when the load W is loaded or unloaded by manipulating the manipulation remote control unit 50.

Here, when it is determined in the processing of S14 that the load factor of the loading/unloading apparatus 40 reaches the third reference value (90%) (S14: Yes), the display mode of the display lamp 821 is changed in the warning processing (S15). That is, as described above, as the blue flashing light of the display lamp 821 is turned on when the load factor is equal to or less than 90%, the load factor reaches 90% the turned-on mode is changed to the turned-on mode of the yellow flashing light.

Accordingly, before the load factor of the loading/unloading apparatus 40 reaches the first reference value (100%) and the loading/unloading apparatus 40 is stopped, the operator may be notified by the emission (the turning on of the yellow flashing light) of light that the load factor of the loading/unloading apparatus 40 reaches the third reference value (90%). Thus, the loading/unloading apparatus 40 may be restrained from being abruptly stopped while vibrations of the load being restrained from being generated.

Further, since the display lamp 821 is installed on an upper surface of the working beam 430 suspending and maintaining the load W, the operator manipulating the manipulation remote control unit 50 can recognize information (in other words, the turning-on of the yellow flashing light) notified by the display lamp 821 without averting his or her eyes from the load W to a large degree. Thus, a safety can be secured when the load W is loaded or unloaded by manipulating the manipulation remote control unit 50.

In this case, since the display lamp 821 is installed to protrude upward from an upper surface side of the working beam 430 (see FIG. 1A), the display lamp 821 may be located at an uppermost portion of the loading/unloading apparatus 40. Accordingly, the display lamp 821 can be easily viewed by the operator regardless of a location where the operator stands with respect to the working beam 430. Thus, a safety can be secured more certainly when the load W is loaded or unloaded by manipulating the manipulation remote control unit 50.

Further, since the location where the display lamp 821 is installed to protrude upward from the upper surface of the working beam 430 is a lengthwise center of the working beam 430, even when the manipulation is performed at the front side of the load W (that is, the operator faces the load W from the front side of the vehicle body 20) or the manipulation is performed at the rear side of the load W (that is, the operator faces the load W from the rear side of the vehicle body 20), the display lamp 821 can be easily viewed by the operator. Thus, even in this aspect, a safety can be secured more certainly when the load W is loaded or unloaded by manipulating the manipulation remote control unit 50.

Here, when it is determined in the processing of S14 that the load factor of the loading/unloading apparatus 40 reaches the first reference value (100%) (S14: Yes), a warning sound is emitted from the speaker 55 and light is emitted from the display lamp 821 in the warning processing (S15), as well as the operation of the loading/unloading apparatus 40 is stopped. In this case, the mode of the warning sound emitted from the speaker 55 is different from the mode of the case where the second reference value is reached. Further, the display lamp 821 becomes a mode for turning on the red flashing light.

Figure 12:
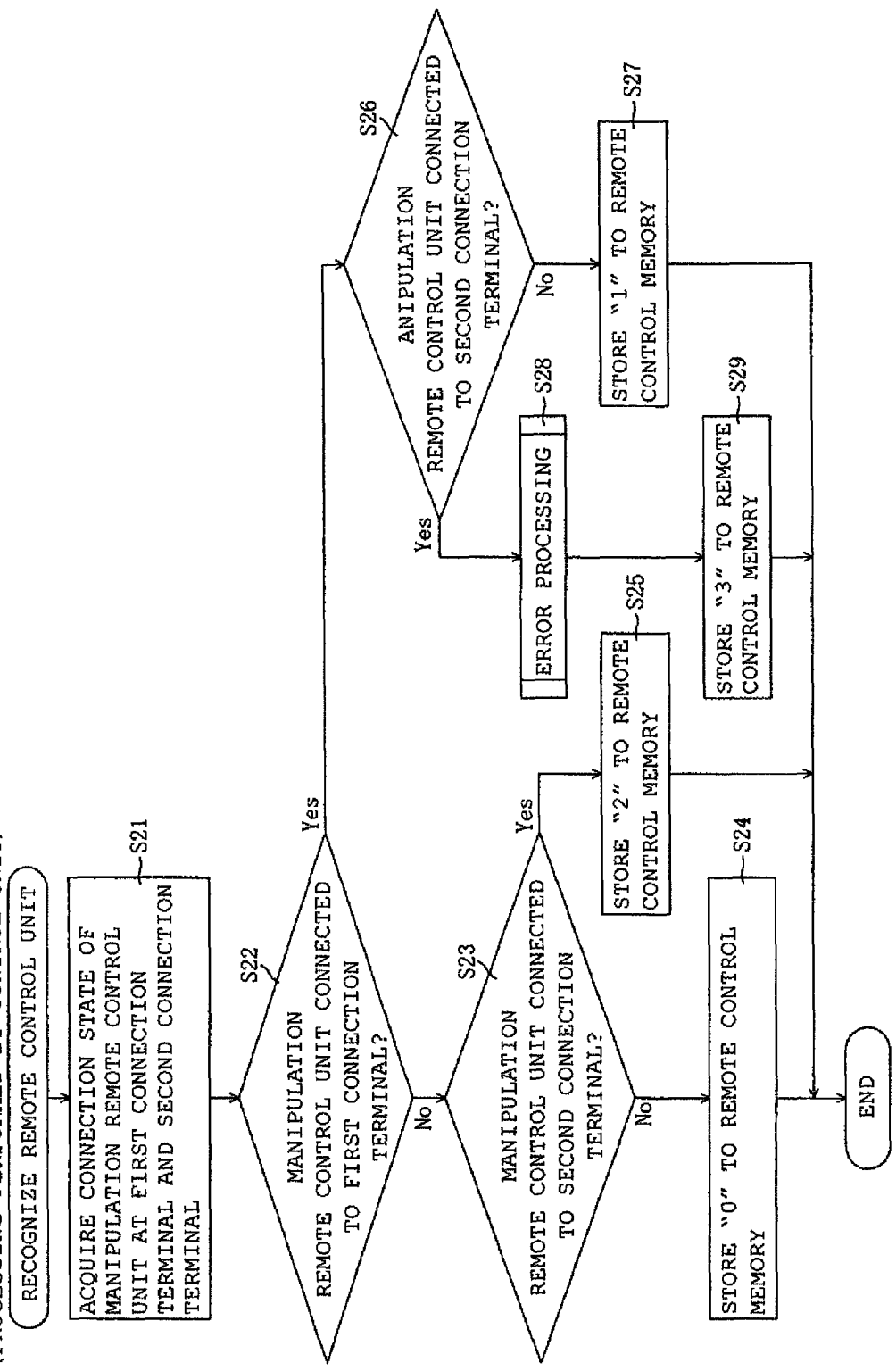
FIG. 12 is a flowchart illustrating remote control recognizing processing.

Next, remote control recognizing processing will be described with reference to FIG. 12. FIG. 12 is a flowchart illustrating the remote control recognizing processing. The processing is processing repeatedly (for example, at an interval of 0.2 seconds) performed by the CPU 71 while a power source of the controller 70 is applied and processing of changing a value stored in the remote control memory 73*a* according to the connection state of the manipulation remote control unit 50 to the first connection terminal 840 and the second connection terminal 850.

In regard to the remote control recognizing processing, the CPU 71 first acquires a connection state of the manipulation remote control unit 50 to the first connection terminal 840 and the second connection terminal 850 (S21), and determines whether the manipulation remote control unit 50 is connected to the first connection terminal 840 (S22). Further, as described above, it is determined whether the manipulation remote control unit 50 is connected to the first connection terminal 840 and the second connection terminal 850 based on existence of an on signal output from the manipulation remote control unit 50.

When it is determined from the result of the processing of S22 that the manipulation remote control unit 50 is not connected to the first connection terminal 840 (S22: No), it is determined whether the manipulation remote control unit 50 is connected to the second connection terminal 850 (S23). As a result, when it is determined that the manipulation remote control unit 50 is not connected to the second connection terminal 850 either (S23: No), the manipulation remote control unit 50 is connected to neither the first connection terminal 840 nor the second connection terminal 850, and thus the remote control memory 73*a* stores '0' (S24) and the remote control recognizing processing is ended.

Meanwhile, when it is determined from the result of the processing of S23 that the manipulation remote control unit 50 is connected to the second connection terminal 850 (S23: Yes), the manipulation remote control unit 50 is connected only to the second connection terminal 850, and thus the remote control memory 73*a* stores '2' (S25) and the remote control recognizing processing is ended.

When it is determined from the result of the processing of S22 that the manipulation remote control unit 50 is connected to the first connection terminal 840 (S22: Yes), it is determined whether the manipulation remote control unit 50 is connected to the second connection terminal 850 (S26). As a result, when it is determined that the manipulation remote control unit 50 is not connected to the second connection terminal 850 (S26: No), the manipulation remote control unit 50 is connected only to the first connection terminal 840, and thus the remote control memory 73*a* stores '1' (S27) and the remote control recognizing processing is ended.

Meanwhile, when it is determined from the result of the processing of S26 that the manipulation remote control unit 50 is connected to the second connection terminal 850, too (S26: Yes), the manipulation remote control unit 50 is connected to both the first connection terminal 840 and the second connection terminal 850, and thus the error processing S28 is performed, the remote control memory 73*a* stores '3' (S29) and the remote control recognizing processing is ended.

Here, in the error processing S28, the CPU 71 prevents an operation of the loading/unloading apparatus 40 based on a manipulation instruction input from the manipulation remote control unit 50 connected to the first connection terminal 840 and a manipulation instruction input from the manipulation remote control unit 50 connected to the second connection terminal 850. In detail, the emergency stop by the error processing S28 is performed prior to other processing, and the operation of the loading/unloading apparatus 40 by the rotation actuators 420, the elevation actuators 445, and the extension/contraction actuators 610 is emergency-stopped.

Accordingly, since the loading/unloading apparatus 40 is emergency-stopped even if, when the operator manipulates the manipulation remote control unit 50 connected to one of the first connection terminal 840 and the second connection terminal 850 to load or unload the load W, the manipulation remote control unit 50 is connected to the other of the first connection terminal 840 and the second connection terminal 850 by another operator, the two manipulation remote control units 50 connected to the first connection terminal 840 and the second connection terminal 850 can be certainly restrained from being operated simultaneously to damage safety.

Further, since the loading/unloading apparatus 40 is installed such that the pair of booms 410 are spaced apart from each other in the forward and rearward direction of the vehicle body 20 so that a long heavy load may be loaded or unloaded, the first connection terminal 840 and the second connection terminal 850 are also spaced apart (for example, in the present embodiment, not less than 20 m) from each other in the forward and rearward direction of the vehicle body 20. Accordingly, even if the manipulation remote control unit 50 is already connected to one of the first connection terminal 840 and the second connection terminal 850, the operator may connect the manipulation remote control unit 50 to the other of the first connection terminal 840 and the second connection terminal 850 without confirming the connection. Thus, as in the present embodiment, when the two manipulation remote control units 50 are connected simultaneously, it becomes valid to prevent an operation of the loading/unloading apparatus 40 based on manipulation instructions of both the manipulation remote control units 50.

Further, in the error processing S28, the loading/unloading apparatus 40 is emergency-stopped, a warning sound is emitted from the speaker 55, and light is emitted from the display lamp 821 as well. In this case, the emission modes of sound and light by the speaker 55 and the display lamp 821 are different from those of in the above-described warning processing (S15, see FIG. 11). For example, in the present embodiment, the display lamp 821 is in a mode for turning on all the flashing lights (blue, yellow, and red lights). Further, an instruction that the two manipulation remote control units 50 are connected is displayed on the LCD 811. The emergency stop and emission of warning sound in the error processing are released by separating at least one of the two manipulation remote control units 50.

Figure 13A:
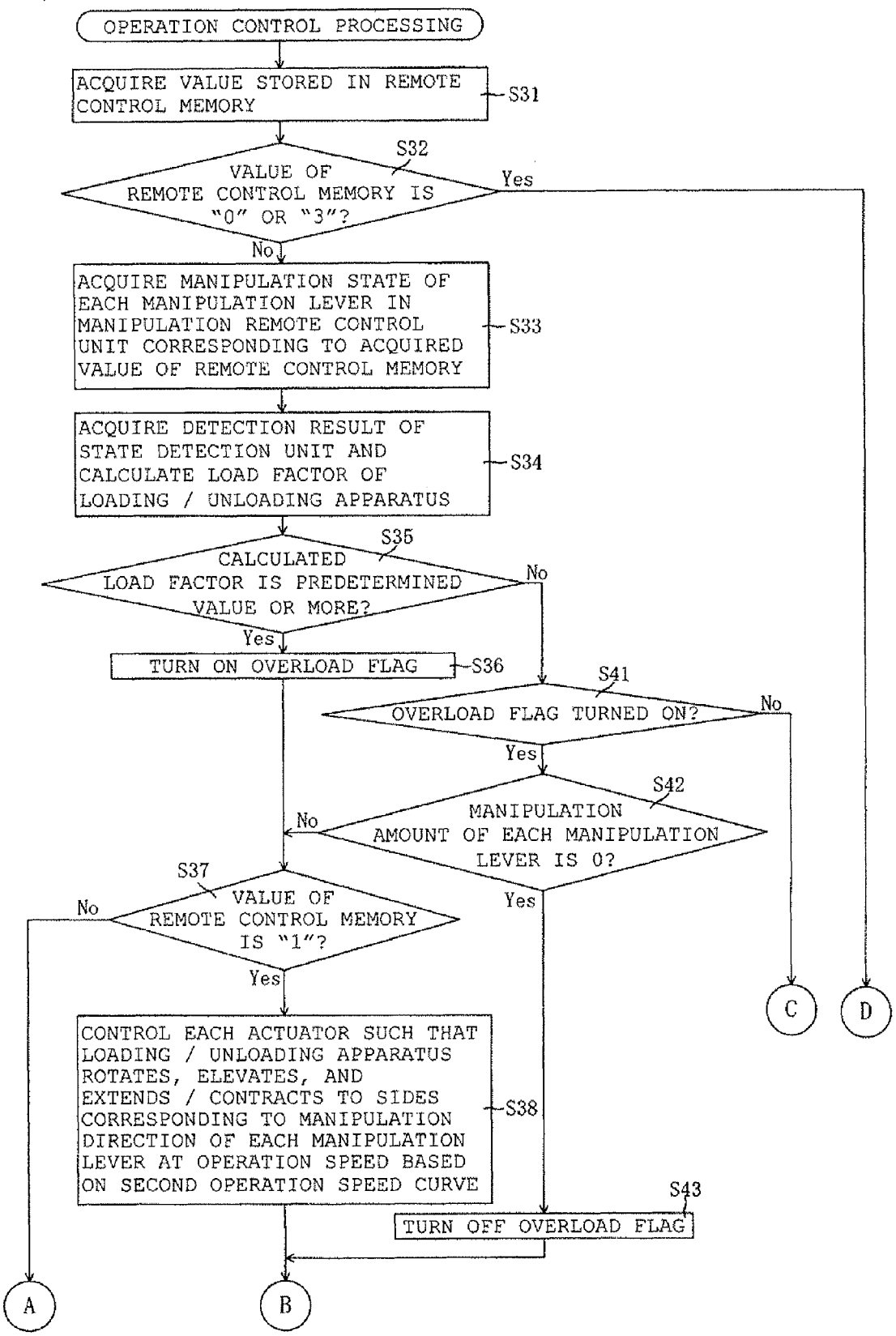
FIG. 13A is part of a flowchart illustrating operation control processing.
Figure 13B:
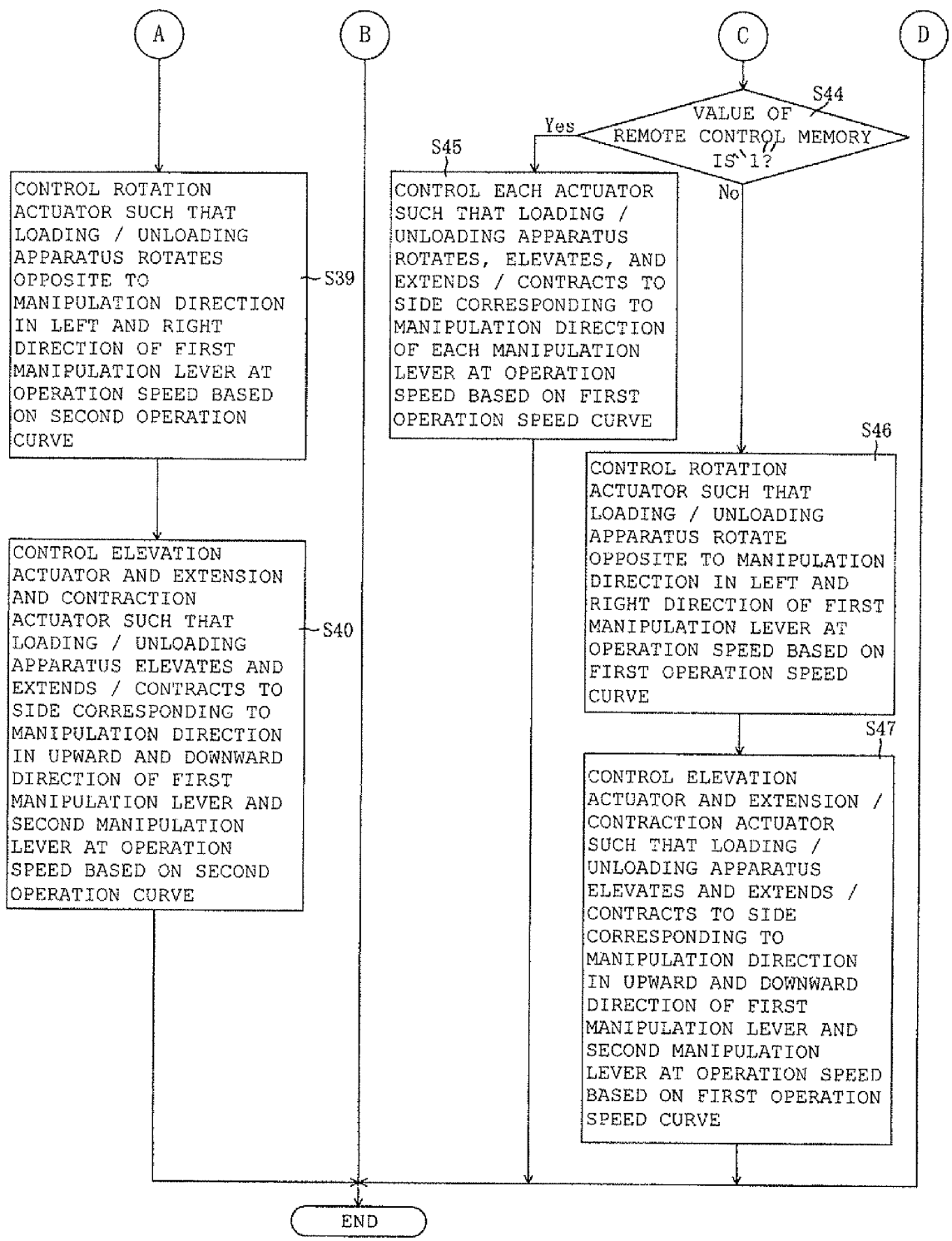
FIG. 13B is the remaining part of the flowchart illustrating operation control processing.

Next, operation control processing will be described with reference to FIG. 13A and FIG. 13B. FIG. 13A and FIG. 13B is a flowchart illustrating the operation control processing. The processing is processing repeatedly (for example, at an interval of 0.2 seconds) performed by the CPU 71 while a power source of the controller 70 is applied and a processing of controlling an operation of the loading / unloading apparatus 40 according to a manipulation instruction from the manipulation remote control unit 50 connected to the first connection terminal 840 or the second connection terminal 850.

In regard to the operation control processing, the CPU 71 first acquires a value stored in the remote control memory 73a (S31), and determines whether the acquired value of the remote control memory 73a is '0' or '3' (S32). As a result, when it is determined that the value of the remote control memory 73a is '0' or '3' (S32: Yes), the manipulation remote control unit 50 is connected to neither the first connection terminal 840 nor the second connection terminal 850 and the manipulation instruction from the manipulation remote control unit 50 is not input (in the case of '0'), or the manipulation remote control unit 50 is connected to both the first connection terminal 840 and the second connection terminal 850 and the manipulation instructions from all the manipulation remote control units 50 need to be invalid (in the case of '3'), and thus the processing after S33 is skipped and the operation control processing is ended. Accordingly, even if the manipulation remote control unit 50 is connected to both the first connection terminal 840 and the second connection terminal 850, the two manipulation remote control units 50 may be prevented from being manipulated simultaneously to damage safety.

Meanwhile, in the processing of S32, when it is determined that the value of the remote control memory 73a is neither '0' nor '3', that is, either '1' or '2' (S32: No), the manipulation remote control unit 50 is connected to any one of the first connection terminal 840 and the second connection terminal 850, and thus the processing after S33 is performed to control an operation of the loading/unloading apparatus 40 based on a manipulation instruction from the manipulation remote control unit 50 connected thereto.

That is, first, manipulation states of the manipulation levers 52 and 53 in the manipulation remote control unit 50 (for example, the manipulation remote control unit 50 connected to the first connection terminal 840 in the case of '1') corresponding to the acquired value of the remote control memory 73a are acquired (S33), detection results by the sensors 831 to 835 of the state detection unit 830 are acquired, and after calculating a load factor of the loading/unloading apparatus 40 based on the detection results (S34), it is determined whether the calculated load factor is equal to or more than a predetermined value (S35). Further, in the present embodiment, the predetermined value which is a reference in the processing of S35 is 90% (a second reference value) (see FIG. 10).

When it is determined from the result of the processing of S35 that the calculated load factor is equal to or more than a predetermined value (S35: Yes), the load factor of the loading/unloading apparatus 40 reaches 90% (reaches the position P1 of FIG. 10) in this step or maintains not less than 90% (is present between the position P1 and the position Pa of FIG. 10) from the previous step, and thus the process is shifted to a processing of S37 after the overload flag 73b is turned on (S36) to operate the loading/unloading apparatus 40 at an operation speed in a speed reduction state based on the second operation speed line diagram L2 (see FIG. 9).

Meanwhile, when it is determined from the result of the processing of S35 that the calculated load factor does not reach the predetermined value (90%) (S35: No), it is determined whether the overload flag 73b is on (S41). As a result, when it is determined that the overload flag 73b is on (S41: Yes), the load factor is present between the position Pa and the position P2 of FIG. 10 (that is, the load factor is below 90% but the overload flag 73b is on). Thus, in this case (S41: Yes), subsequently, it is determined whether all the manipulation levers 52 and 53 return to the neutral position (that is, the manipulation amount is '0') (S42).

When it is determined from the result of the processing of S42 that none of the manipulation levers 52 and 53 returns to the neutral position (that is, the manipulation amount is not '0') (S42: No), at least one of the manipulation levers 52 and 53 has a predetermined manipulation amount and the loading/unloading apparatus 40 is not stopped, and thus the process is shifted to the processing of S37 to operate the loading/unloading apparatus 40 at an operation speed in a speed reduction state based on the second operation speed line diagram L2 (see FIG. 9).

Meanwhile, when it is determined from the result of the processing of S42 that all the manipulation levers 52 and 53 return to the neutral position (that is, the manipulation amount is '0') (S42: Yes), it means that the load factor has reached the position P2 of FIG. 10, and thus after turning off the overload flag 73b (S43), the operation control processing is ended. Accordingly, thereafter, when an operation of the loading/unloading apparatus 40 is resumed by manipulating the manipulating levers 52 and 53 to the neutral position, the operation speed is determined based on the first operation speed line diagram L1 (see FIG. 9), and thus the loading/unloading apparatus 40 is operated at a normal speed.

When it is determined from the result of the processing of S41 that the overload flag 73b is not on, that is, off (S41: No), the load factor is also below 90% as determined in the processing of S35 (S35: No) and is in a state before the time t1 or after the time t2 in FIG. 10, and thus the process is shifted to the processing of S44 to operate the loading/unloading apparatus 40 at a normal speed based on the first operation speed line diagram L1 (see FIG. 9).

In the processing of S37, it is determined to which of the first connection terminal 840 and the second connection terminal 850 the manipulation remote control unit 50 is connected. That is, it is determined whether the value stored in the remote control memory 73a is '1' (S37), and when it is determined that the value stored in the remote control memory 73a is '1' (S37: Yes), it means that the manipulation remote control unit 50 is connected to the first connection terminal 840, and thus the process is shifted to the processing of S38 to control an operation of the loading/unloading apparatus 40 based on a manipulation instruction from the manipulation remote control unit 50 connected to the first connection terminal 840.

Meanwhile, in the processing of S37, when it is determined that the value stored in the remote control memory 73a is not '1', that is, '2' (S37: No), it means that the manipulation remote control unit 50 is connected to the second connection terminal 850, and thus the process is shifted to the processing of S39 and S40 to control an operation of the loading/unloading apparatus 40 based on a manipulation instruction from the manipulation remote control unit 50 connected to the second connection terminal 850.

Here, as described above, since the processing of S37 is processing conducted when the overload flag 73b is on, in the following processing of S38, S39, and S40, the loading/unloading apparatus 40 is operated at an operation speed in a speed reduction state based on the second operation speed line diagram L2 (see FIG. 9).

In the processing of S38, the actuators 420, 445, and 610 are driven and controlled such that the loading/unloading apparatus 40 may be rotated, elevated, and extended or contracted at sides corresponding to the manipulation directions of the manipulation levers 52 and 53 at an operation speed based on the second operation speed line diagram L2 (S38).

In detail, if the first manipulation lever 52 is manipulated to the left direction (the left direction of FIG. 7), the rotation actuator 420 is driven and controlled at an operation speed according to the manipulation amount and the boom 410 is rotated toward the right direction (the front side of the paper of FIG. 1A) of the vehicle body 20. Meanwhile, if the first manipulation lever 52 is manipulated to the right direction (the right direction of FIG. 7), the rotation actuator 420 is driven and controlled at an operation speed according to the manipulation amount and the boom 410 is rotated toward the left direction (the inner side of the paper of FIG. 1A) of the vehicle body 20.

In this case (S38), since the connection location of the manipulation remote control unit 50 is the first connection terminal 840, the operator manipulating the manipulation remote control unit 50 faces the load W from the front side (the right side of FIG. 1A) of the vehicle body 20. Thus, the manipulation direction of the first manipulation lever 52 may coincide with the rotation direction of the loading/unloading apparatus 40 (the boom 410), and as a result, manipulation performance can be enhanced and an erroneous manipulation can be restrained when an operation of the loading/unloading apparatus 40 is controlled by the manipulation remote control unit 50.

Meanwhile, if the first manipulation lever 52 is manipulated to the upward or downward direction (the upward or downward direction of FIG. 7), the elevation actuator 445 is driven and controlled at an operation speed according to the manipulation amount and the working beam 430 is elevated toward the upward or downward direction (the upward or downward direction of FIG. 1A) of the vehicle body 20. Further, if the second manipulation lever 53 is manipulated to the upward or downward direction (the upward or downward direction of FIG. 7), the extension/contraction actuator 610 is driven and controlled at an operation speed according to the manipulation amount and the boom 410 is extended or contracted toward the upward or downward direction (the upward or downward direction of FIG. 1A) of the vehicle body 20. Thus, like the above-described case, since the manipulation direction of the manipulation levers 52 and 53 coincides with the elevation direction and the extension or contraction direction of the loading/unloading apparatus 40 (the working beam 430 and the booms 410), manipulation performance can be enhanced and an erroneous manipulation can be restrained.

Meanwhile, in the processing of S39, the rotation actuators 420 are driven and controlled such that the loading/unloading apparatus 40 may be rotated in a direction opposite to the manipulation direction of the first manipulation lever 52 to the left or right direction at an operation speed based on the second operation speed line diagram L2 (S39).

That is, in this case (S39), the connection location of the manipulation remote control unit 50 is the second connection terminal 850, and the operator manipulating the manipulation remote control unit 50 faces the load W from the rear side (the left side of FIG. 1A) of the vehicle body 20.

Thus, in the processing of S39, contrary to the case of S38, if the first manipulation lever 52 is manipulated to the left direction (the left direction of FIG. 7), the rotation actuator 420 is driven and controlled at an operation speed according to the manipulation amount and the boom 410 is rotated toward the left direction (the inner side of the paper of FIG. 1A) of the vehicle body 20. Meanwhile, if the first manipulation lever 52 is manipulated to the right direction (the right direction of FIG. 7), the rotation actuator 420 is driven and controlled at an operation speed according to the manipulation amount and the boom 410 is rotated toward the right direction (the front side of the paper of FIG. 1A) of the vehicle body 20.

Accordingly, since the manipulation direction of the first manipulation lever 52 may coincide with the rotation direction of the loading/unloading apparatus 40 (the boom 410), manipulation performance can be enhanced and an erroneous manipulation can be restrained when an operation of the loading/unloading apparatus 40 is controlled by the manipulation remote control unit 50.

In this way, even when the same manipulation is applied to the manipulation remote control unit 50, the rotation direction of the loading/unloading apparatus 40 (the boom 410) may be set to the opposite direction in the case (S38) based on the manipulation instruction from the manipulation remote control unit 50 connected to the first connection terminal 840 and in the case (S39) based on the manipulation instruction from the manipulation remote control unit 50 connected to the second connection terminal 850. Thus, the operator manipulating the manipulation remote control unit 50 at the front or rear side of the load W while standing with his/her back toward the operator cab 30 and facing the load W does not need to change the manipulation of the manipulation remote control unit 50 (for example, by installing a reversal mode switch and determining whether the operation direction is to be reversed through the switch) according to the manipulation location (that is, the connection location of the manipulation remote control unit 50) even when the left and right direction of the vehicle body 20 are reversed, and thus an erroneous manipulation of the manipulation remote control unit 50 by the operator can be restrained.

After the processing of S39, processing of S40 is performed. Further, in the processing of S40, like in the case of S38, if the first manipulation lever 52 is manipulated to the upward or downward direction (the upward or downward direction of FIG. 7), the elevation actuator 445 is driven and controlled at an operation speed (an operation speed based on the second operation speed line diagram L2) according to the manipulation amount and the working beam 430 is elevated toward the upward or downward direction (the upward or downward direction of FIG. 1A) of the vehicle body 20. Further, if the second manipulation lever 53 is manipulated to the upward or downward direction (the upward or downward direction of FIG. 7), the extension/contraction actuator 610 is driven and controlled at an operation speed (an operation speed based on the second operation speed line diagram L2) according to the manipulation amount and the boom 410 is extended or contracted toward the upward or downward direction (the upward or downward direction of FIG. 1A) of the vehicle body 20. Thus, like the above-described case, since the manipulation directions of the manipulation levers 52 and 53 coincide with the elevation direction and the extension or contraction direction of the loading/unloading apparatus 40 (the working beam 430 and the booms 410), manipulation performance can be enhanced and an erroneous manipulation can be restrained.

In the processing of S44, like in the case of S37, it is determined whether the value stored in the remote control memory 73a is '1' (S44), and when it is determined that the value stored in the remote control memory 73a is '1', that is, the manipulation remote control unit 50 is connected to the first connection terminal 840 (S44: Yes), the process is shifted to the processing of S45 to control an operation of the loading/unloading apparatus 40 based on a manipulation instruction from the manipulation remote control unit 50 connected to the first connection terminal 840.

Meanwhile, in the processing of S44, when it is determined that the value stored in the remote control memory 73a is not '1' but '2', that is, the manipulation remote control unit 50 is connected to the second connection terminal 850 (S44: No), the process is shifted to the processing of S46 and S47 to control an operation of the loading/unloading apparatus 40 based on a manipulation instruction from the manipulation remote control unit 50 connected to the second connection terminal 850.

Here, as described above, since the processing of S44 is processing conducted when the overload flag 73b is off, in the following processing of S45, S46, and S47, the loading/unloading apparatus 40 is operated at a normal speed based on the first operation speed line diagram L1 (see FIG. 9).

Further, since the processing of S45 is the same contents as the processing of S38 except that the loading/unloading apparatus 40 is operated at a normal speed based on the first operation speed line diagram L1 (see FIG. 9) and the processing of S46 and S47 is the same contents as the processing of S39 and S40 except that the loading/unloading apparatus 40 is operated at a normal speed based on the first operation speed line diagram L1 (see FIG. 9), a description thereof will be omitted. Further, after the processing of S38, S40, S45 and S47 is performed, the operation control processing is ended.

Here, since the above-described remote control recognizing processing (see FIG. 12) is processing repeatedly performed by the CPU 71 at a predetermined interval, if one of the two manipulation remote control units 50 is separated from a state where the manipulation remote control units 50 are connected to both the first connection terminal 840 and the second connection terminal 850, the value of the remote control memory 73a is rewritten from '3' to '1' or '2' (that is, the connection location of the manipulation remote control unit 50 without separation (a value corresponding to the first connection terminal 840 or the second connection terminal 850)). Thus, in the operation control processing illustrated in FIG. 13A and FIG. 13B, since the determination in the processing of S32 is 'No' and may be performed in the processing after S33, the loading/unloading apparatus 40 may be operated by manipulating the manipulation remote control unit 50 which is not separated but left.

That is, if the manipulation remote control units 50 are connected to both the first connection terminal 840 and the second connection terminal 850, the value of the remote control memory 73a becomes '3', and an operation of the loading/unloading apparatus 40 based on the manipulation instruction from the manipulation remote control unit 50 may be prevented by branching the processing of S32 to 'Yes' (that is, by skipping the processing after S33), whereas the value of the remote control memory 73a becomes '1' or '2' by separating one manipulation remote control unit 50, and the prevention of an operation of the loading/unloading apparatus 40 may be released by branching the processing of S32 to 'No' (that is, by performing the processing after S33).

Thus, when the manipulation remote control units 50 are connected to both the first connection terminal 840 and the second connection terminal 850, a manipulation of one manipulation remote control unit 50 may be allowed only by separating the other manipulation remote control unit 50 while preventing an operation of the loading/unloading apparatus 40 and securing safety, and thus an operation of releasing a prevention state can be simplified and working efficiency can be enhanced.

Although the present has been described based on the embodiments until now, the present invention is not limited to the embodiments at all, but it can be easily understood that various improvements and modifications may be made within the scope without departing from the spirit of the present invention.

The values suggested in the embodiments are examples, and it is apparent that other values may be employed. For example, although it has been described in the embodiments that as the predetermined values for load factors, the first reference value is set to 100%, the second and third reference values are set to 90%, the values are examples and it is apparent that other values may be employed.

Although it has been described in the embodiments that the vehicle 1 includes the operator cabs 30 at front and rear sides of the vehicle body 20, respectively, the present invention is not necessarily limited thereto, but an operator cab 30 may be installed only at one lengthwise side of the vehicle body 20. Further, a travel path of the vehicle 1 is not limited, but the vehicle 1 may be a railway vehicle traveling on an installed rail or may be a working vehicle traveling on a road surface where a rail is not installed.

Although it has been described in the embodiments that two loads W1 and W2 are loaded on the vehicle body 20 (see FIGS. 6A-6F)the present invention is not necessarily limited thereto, but the number of the loaded loads W may be one or not less than three. That is, the number of loads W may be properly determined according to the size of the loads W per size of a load receiving surface of the vehicle body 20.

It has been described in the embodiments that the pair of booms 410 may be rotated toward the left or right direction of the vehicle body 20 (that is, the working beam 430 may be moved to a side outer than a left widthwise end or a right widthwise end of the vehicle body 20). Accordingly, the load W loaded on the vehicle body 20 may be unloaded on any one of the left and right directions of the vehicle body 20, and may be loaded on the vehicle body 20 from the field in any one of the left and right sides of the vehicle body 20. However, the present invention is not necessarily limited thereto, but it is apparent that the load W may be loaded or unloaded from one of the left and right sides of the vehicle body 20.

Although it has been described in the embodiments that two loads W1 and W2 are loaded on the vehicle body 20 (see FIG. 6), the present invention is not necessarily limited thereto, but the number of the loaded loads W may be one or not less than three. That is, the number of loads W may be properly determined according to the size of the loads W per size of a load receiving surface of the vehicle body 20.

It has been described in the embodiments that the lifting jigs 450 may be moved in the forward and rearward direction (that is, the lengthwise direction of the working beam 430) of the vehicle body 20 by driving both the rod cylinders 470 via the guide rails 460 (see FIG. 1). A manipulation lever for instructing movement in the forward and rearward direction may be formed in the manipulation remote control unit 50.

In this case, like in the case where the booms 410 are rotated to the left or right of the vehicle body 20 by the manipulation of the first manipulation lever 52 in the left or right direction, even when the same manipulation is applied to the manipulation lever instructing movements of the lifting jigs 450 in the forward or rearward direction, the movement directions of the lifting jigs 450 may be opposite to each other in the case based on the manipulation instruction from the manipulation remote control unit 50 connected to the first connection terminal 840 and the case based on the manipulation instruction from the manipulation remote control unit 50 connected to the second connection terminal 850. Accordingly, an erroneous manipulation can be restrained when the manipulation remote control units 50 are manipulated at the front and rear sides of the load W.

Although it has been described in the embodiments that the speaker 55 for emitting a warning sound is installed in the manipulation remote control unit 50, the present invention is not necessarily limited thereto, but it is apparent that a speaker for emitting a warning sound may be installed even in the vehicle body 20 additionally. Meanwhile, although it has been described in the embodiments that the display lamp 821 is installed in the working beam 430, a display lamp 821 may be formed even in the manipulation remote control unit 50 additionally.

Although it has been described in the embodiments that rotation, elevation, and extension or contraction of the loading/unloading apparatus 40 are instructed by using the first and second manipulation levers 52 and 53 fluctuating in the left or right direction or in the upward or downward direction from the neutral position, the present invention is not necessarily limited thereto, but it is apparent that another mode of manipulator may be used. Examples of another mode of manipulator include a slidable slider or an on/off type switch.

It has been described in the embodiments that it is necessary to manipulate both the first manipulation lever 52 and the second manipulation lever 53 to a neutral position as a condition for switching the overload flag 73b from on to off (see FIG. 10), the present invention is not necessarily limited thereto, but the condition that at least one of the first manipulation lever 52 and the second manipulation lever 53 is manipulated to a neutral position may be set. Otherwise, the overload flag 73b may be switched from on to off immediately at a time point (the position Pa) when the load factor is below the predetermined value (90%) (See FIG. 10).

Although it has been described in the embodiments that an operation of the loading/unloading apparatus 40 is stopped (that is, an operation of the loading/unloading apparatus 40 based on manipulation instructions from both the manipulation remote control units 50 is prevented), if from a state where the manipulation remote control unit 50 is connected to one of the first connection terminal 840 and the second connection terminal 850, the manipulation remote control unit 50 is connected to the other of the first connection terminal 840 and the second connection terminal 850, the present invention is not necessarily limited thereto, but an operation of the loading/unloading apparatus 40 based on a manipulation instruction from the manipulation remote control unit 50 connected first may be allowed and an operation of the loading/unloading apparatus 40 based on the manipulation instruction from the manipulation remote control unit 50 connected later may be prevented.

Accordingly, when the load W is loaded or unloaded by the manipulation of the manipulation remote control unit 50 connected first, even if the other manipulation remote control unit 50 is connected carelessly, the manipulation of the other manipulation remote control unit 50 (that is, connected later) may become invalid. Thus, the two manipulation remote control units 50 may be manipulated simultaneously, and thus safety can be restrained from being damaged. Further, in this case, since an operation of the loading/unloading apparatus 40 by the manipulation of the manipulation remote control unit 50 connected first may be continued, even if the other manipulation remote control unit 50 is connected carelessly, vibrations can be restrained from being generated in the load W by avoiding abruptly stopping an operation of the loading/unloading apparatus 40.

Further, in order to show the effects, a memory (for example, EEPROM) which can hold contents even after the power source is switched off is installed in the controller 70, and a connection time of the manipulation remote control unit 50 to the first connection terminal 840 and the second connection terminal 850 and an exception time are stored in the memory, and the priority of the connection may be determined. Further, based on the determination of the priority, any one of '1' or '2' as a value corresponding to the first or second connection terminal 840 or 850 connected first to the manipulation remote control unit 50 or '0' as a value corresponding to a state of not being connected is stored in the remote control memory 73a. The above-described effect can be acquired by performing the above-described operation control processing (FIG. 13A and FIG. 13B) through the configuration.

Hereinafter, in addition to the vehicle of the present invention, various inventive concepts included in the embodiments will be represented. A vehicle A1 including: a vehicle body on which a load is loaded, and a loading/unloading apparatus for loading and unloading the load on and from the vehicle body, wherein the loading/unloading apparatus includes: rotary shafts installed in the vehicle body such that axial directions thereof coincide with a forward and rearward direction of the vehicle body; a pair of booms supported by the vehicle body via the rotary shaft to be rotatable toward a left and right direction of the vehicle body and installed at front and rear sides of the vehicle body at a predetermined interval; rotation driving units configured to provide the pair of booms with driving forces to rotate the pair of booms toward the left and right direction of the vehicle body; a working beam installed between the pair of booms; working beam elevating units configured to elevate the working beam with respect to the booms; and a plurality of lifting jigs attached to the working beam along the forward and rearward direction of the vehicle body and configured to suspend and maintain the load.

According to the vehicle A1, the load loaded on the vehicle body is unloaded in a construction field by the loading/unloading apparatus, and the load in the construction field is loaded on the vehicle body by the loading/unloading apparatus. That is, when the load loaded on the vehicle body is unloaded in the construction field, first, from a state where the working beam installed between the pair of booms is located above the load loaded on the vehicle body, the lifting jigs attached to the working beam are connected to the load and the working beam is raised by the working beam elevating unit. Accordingly, the load is suspended and maintained on the lifting jigs and is suspended on the vehicle body. Next, the pair of booms is rotated toward the left or right direction (the direction of the construction field) of the vehicle body by the rotation driving units. Accordingly, since the load is moved from the vehicle body onto the construction field together with the working beam while being accompanied by the rotation of the pair of booms, the working beam is lowered by the working beam elevating unit, and the load is positioned in the construction field, and then the connections of the lifting jigs are released. As a result, the load may be unloaded in the construction field.

That is, when the load positioned in the construction field is loaded on the vehicle body, from a state where the working beam is located above the load positioned in the construction field, the lifting jigs are connected to the load and the working beam is raised by the working beam elevating unit. Accordingly, the load is suspended and maintained on the lifting jigs and is suspended on the construction field. Next, the pair of booms is rotated toward the left or right direction (the vehicle body side) of the vehicle body by the rotation driving units. Accordingly, since the load is moved from the construction field onto the vehicle body together with the working beam according to the rotations of the pair of booms, the working beam is lowered by the working beam elevating unit, and the load is loaded on the vehicle body, and then the connections of the lifting jigs are released. As a result, the load may be loaded on the vehicle body.

In this case, in the loading/unloading apparatus, the pair of booms is installed to be spaced apart from each other at front and rear sides of the vehicle body at a predetermined interval, and a plurality of lifting jigs are installed along the forward and rearward direction of the vehicle body in the working beam installed between the pair of booms. Thus, even if the load is a long heavy load, a plurality of points along a lengthwise direction of the long heavy load may be suspended and maintained by the lifting jigs, and thus vibrations can be restrained from being generated in the long heavy load such that the load can be loaded and unloaded stably.

Further, since the load is unloaded from the vehicle body to the construction field or loaded from the construction field onto the vehicle body by suspending and maintaining the load (long heavy load) in the working beam via the lifting jigs and rotating the pair of booms toward the left or right direction of the vehicle body, a height of a working space necessary for loading or unloading the load can be lowered as compared with the case of a crane structure where the load is loaded or unloaded by the fluctuation of the booms. As a result, the load can be easily loaded even at a place, such as a tunnel or an interior of a building, whose height is limited.

Further, a structure for moving the load in the left or right direction of the vehicle body can be simply configured to load or unload the load by using a structure for installing the rotary shafts whose axial direction coincides with the forward and rearward direction of the vehicle body and rotatably supporting the pair of booms toward the left or right direction of the vehicle body via the rotary shafts.

In the vehicle A1, a vehicle A2 wherein each of the booms includes: a body a rear end side of which is rotatably supported by the vehicle body; and a protruding/retracting portion accommodated within the body, protruding and retracted from a tip end side of the body, and to which an end of the working beam is connected, wherein the boom is extended and contracted in an axial direction of the boom as the protruding/retracting portion protrudes and retracts from the tip end side of the body.

In addition to the effects of the vehicle A1, according to the vehicle A2, since each of the booms includes: a body a rear end side of which is rotatably supported by the vehicle body; and a protruding/retracting portion accommodated within the body, protruding and retracted from a tip end side of the body, and to which an end of the working beam is connected, the boom can be extended and contracted in an axial direction of the boom as the protruding/retracting portion protrudes and retracts from the tip end side of the body.

Accordingly, when a first load loaded on the vehicle body is unloaded in the construction field or the first load positioned in the construction field is loaded on the vehicle body, the first load can be loaded or unloaded while crossing a second load loaded on the vehicle body or the second load positioned in the construction field above the second load by extending the booms in an axial direction of the booms. Thus, even if the second load is not moved in advance, the first load can be loaded or unloaded, and thus working efficiency when the first load is loaded or unloaded can be enhanced.

Meanwhile, after the load is loaded or unloaded, a height of the vehicle can be lowered by contracting the booms in the axial direction of the booms. Thus, a traveling path of the vehicle can be restrained from being limited by the height of the vehicle.

In the vehicle A2, a vehicle A3 wherein the rotation driving unit includes a pair of expandable/contractible rotation actuators installed on left and right sides of the vehicle body with respect to the boom and configured to connect the vehicle body and the body of the boom, and as one of the pair of rotation actuators is extended and the other one is contracted, the boom is rotated toward the left and right direction of the vehicle body.

According to the vehicle A3, in addition to the effects of the vehicle A2, since the rotation driving unit includes a pair of expandable/contractible rotation actuators installed on left and right sides of the vehicle body with respect to the boom and configured to connect the vehicle body and the body of the boom, as one of the pair of rotation actuators is extended and the other one is contracted, the boom can be rotated toward the left and right direction of the vehicle body. That is, since a structure for rotating the booms toward the left or right direction of the vehicle body is simply configured, product costs can be reduced and maintenance can be improved.

In the vehicle A3, a vehicle A4 wherein the rotation actuator includes a hydraulic cylinder, and the rotation driving unit includes a hydraulic pump configured to supply a hydraulic pressure to the rotation actuator, a switching valve installed between the hydraulic pump and the rotation actuator and configured to convert a supply direction of the hydraulic pressure to the rotation actuator, and a counterbalance valve installed between the switching valve and the rotation actuator and configured to apply a back pressure to a flow from the rotation actuator to the switching valve.

According to the vehicle A4, in addition to the effects of the vehicle A3, since the rotation actuator includes a hydraulic cylinder, and the rotation driving unit includes a hydraulic pump configured to supply a hydraulic pressure to the rotation actuator, a switching valve installed between the hydraulic pump and the rotation actuator and configured to convert a supply direction of the hydraulic pressure to the rotation actuator, and a counterbalance valve installed between the switching valve and the rotation actuator and configured to apply a back pressure to a flow from the rotation actuator to the switching valve, the booms can be restrained from abruptly tumbled down from the erected state by the self-weights of the booms or the weight of the load by controlling a back pressure of the tumbled hydraulic cylinder with the counterbalance valve when the booms are rotated from one of the left and right directions of the vehicle body to the other of the left and right directions of the vehicle body via the erected state.

A vehicle B1 including: a vehicle body on which a load is loaded, and a loading/unloading apparatus for loading and unloading the load on and from the vehicle body, wherein the loading/unloading apparatus includes: rotary shafts installed in the vehicle body such that axial directions thereof coincide with a forward and rearward direction of the vehicle body; a pair of booms supported by the vehicle body via the rotary shaft to be rotatable toward a left and right direction of the vehicle body and installed at front and rear sides of the vehicle body at a predetermined interval; a rotation driving unit for providing the pair of booms with driving forces to rotate the pair of booms toward the left and right direction of the vehicle body; a working beam installed between the pair of booms and configured to suspend and maintain the load; and working beam elevating units configured to elevate the working beam with respect to the booms, wherein the working beam elevating unit includes an elevation line one end of which is fixed to the booms, a fixing sheave which an intermediate portion of the elevation line contact around the fixing sheave and rotatably shaft-supported by the working beam, and an extraction/retraction driving unit configured to release and rewind an opposite side of the elevation line contacting the fixing sheave and installed in the working beam.

According to the vehicle B1, the load loaded on the vehicle body is unloaded in a construction field by the loading/unloading apparatus, and the load in the construction field is loaded on the vehicle body by the loading/unloading apparatus. That is, when the load loaded on the vehicle body is unloaded in the construction field, first, from a state where the working beam installed between the pair of booms is located above the load loaded on the vehicle body, the load is connected to the working beam and then the working beam is raised by the working beam elevating unit. Accordingly, the load is suspended and maintained on the working beam and is suspended on the vehicle body. Next, the pair of booms is rotated toward the left or right direction (the direction of the construction field) of the vehicle body by the rotation driving units. Accordingly, since the load is moved from the vehicle body onto the construction field together with the working beam while being accompanied by the rotation of the pair of booms, the working beam is lowered by the working beam elevating unit, and the load is positioned in the construction field, and then the connection of the working beam and the load is released. As a result, the load may be unloaded in the construction field.

That is, when the load positioned in the construction field is loaded on the vehicle body, from a state where the working beam is located above the load positioned in the construction field, the load is connected and then the working beam is raised by the working beam elevating unit. Accordingly, the load is suspended and maintained on the working beam and is suspended on the construction field. Next, the pair of booms is rotated toward the left or right direction (the vehicle body side) of the vehicle body by the rotation driving units. Accordingly, since the load is moved from the construction field onto the vehicle body together with the working beam while being accompanied by the rotations of the pair of booms, the working beam is lowered by the working beam elevating unit, and the load is loaded on the vehicle body, and then the connection of the working beam and the load is released. As a result, the load may be loaded on the vehicle body.

In the working beam elevating unit, since one end of the elevation line is fixed to the booms, an intermediate portion of the elevation line contacts the fixing sheave around the fixing sheave, the fixing sheave being rotatably shaft-supported by the working beam, and the working beam is suspended and installed on the booms via the elevation line, the working beam can be lowered with respect to the booms by releasing the elevation line with the extraction/retraction driving unit installed in the working beam, whereas the working beam can be raised with respect to the booms by rewinding the elevation line with the extraction/retraction driving unit, by the rewinding degree.

In this case, in the working beam elevating unit, since one end side of the elevation line is fixed to the boom and the extraction/retraction driving unit for releasing and rewinding the opposite side of the elevation line is installed in the working beam, a space for installing the extraction/retraction driving unit does not need to be secured on the vehicle body. Thus, a space for loading the load on the vehicle body can be enlarged correspondingly. As a result, a longer load may be loaded on the vehicle body.

In the vehicle B1, a vehicle B2 wherein the working beam has a long hollow box shape, and at least a portion of the working beam elevating unit is received in an interior space of the working beam.

According to the vehicle B2, in addition to the effects of the vehicle B1, since the working beam has a long hollow box shape, and at least a portion of the working beam elevating unit is received in an interior space of the working beam, an interior space of the working beam which is a dead space can be effectively utilized, and the entire loading/unloading apparatus can be small-sized correspondingly. As a result, a traveling path of the vehicle can be restrained from being limited, and a height size of the load loadable on the vehicle body can be enlarged.

That is, if the working beam elevating unit is installed on an upper surface side of the working beam, a height of the vehicle increases and a traveling path of the vehicle is limited by a degree by which the working beam elevating unit protrudes upward. Meanwhile, if the working beam elevating unit is installed on a lower surface side of the working beam, an interval between the working beam and the vehicle body is narrowed and a height size of the load loadable on the vehicle body is limited by a degree by which the working beam elevating unit protrudes downward. In this regard, by receiving at least a portion of the working beam elevating unit in an interior space of the working beam, a height of the vehicle can be lowered, a traveling path of the vehicle can be restrained from being limited by the height of the vehicle, an interval between the working beam and the vehicle body can be widened, and a height size of the load loadable on the vehicle body can be enlarged.

Further, if the working beam elevating unit is installed on a side surface side of the working beam, a structure for offsetting the pass location of the elevation line is necessary to locate the elevation line at a widthwise center of the working beam, and thus the structure becomes complex, increasing the product costs. In this regard, as the working beam elevating unit is received in an interior space of the working beam, the elevation line can be disposed at a widthwise center of the working beam. Thus, as a structure for offsetting a pass line of the elevation line may be unnecessary, a structure can be simplified and product costs can be reduced correspondingly.

Further, as at least a portion of the working beam elevating unit is received in the interior space of the working beam, the received portion of the working beam elevating unit can be protected such that a damage due to collision with another structure and deterioration due to rain and wind can be restrained.

In the vehicle B2, a vehicle B3 wherein the extraction/retraction driving unit includes an extendable/contractible elevation actuator configured to release or rewind the elevation line as the elevation line is moved axially while being accompanied by the extension/contraction operation, and the elevation actuator is received in the interior space of the working beam in a state where the extension/contraction direction follows a lengthwise direction of the working beam.

According to the vehicle B3, in addition to the effects of the vehicle B2, since the extraction/retraction driving unit includes an extendable elevation actuator configured to release or rewind the elevation line as the elevation line is moved axially, a winding drum for winding the rewound elevation line is unnecessary, and the entire working beam elevating unit can be small-sized correspondingly. Meanwhile, in this case, since a space for extending or contracting the elevation actuator is necessary, the elevation actuator is received in an interior space of the working beam in a state where the extension or contraction direction thereof follows the lengthwise direction of the working beam, and thus the interior space of the working beam can be effectively utilized. That is, the entire loading/unloading apparatus can be small-sized while securing a length by which the elevation line is released or rewound.

In the vehicle B3, a vehicle B4 wherein the working beam elevating unit includes a reversal sheave where the other end portion of the elevation line from the fixing sheaves at the middle of the elevation line and which guides and reverses the other end of the elevation line to the opposite side of the fixing sheave, the other end of the elevation line is fixed to the working beam, and the elevation actuator includes a tube attached to the working beam and a piston rod protruding and retracted from the tube and configured to rotatably support the reversal sheave at the tip end.

According to the vehicle B4, in addition to the effects of B3, the reversal sheave is rotatably shaft-supported by the piston rod of the elevation actuator, a portion of the opposite end of the elevation line from the fixing sheaves contacts the reversal sheave around the reversal sheave to guide and reverse the opposite end of the elevation line to the opposite side of the fixing sheave, the opposite end of the elevation line is fixed to the working beam, and thus the elevation line can be released or rewound by the movement of the reversal sheave accompanied by the extension and contraction operation of the elevation actuator and the released and rewound amount of the elevation line can become twice as large even if the extended and contracted amount of the elevation actuator as compared with the case where the opposite end of the elevation line is directly fixed to the piston rod of the elevation actuator. Accordingly, since an extended or contracted degree necessary for the elevation actuator may be shorter, the working beam elevating unit can be small-sized and light-weighted.

In any one of the vehicles B1 to B4, a vehicle B5 wherein the elevation line is a chain configured to connect a plurality of plates with pins curvedly.

According to the vehicle B5, in addition to the effects of any one of the vehicles B1 to B4, since the elevation line is a chain configured to connect a plurality of plates with pins curvedly, an allowable bending radius can be small as compared with the case of using a wire. Thus, a diameter of the sheave can be small (for example, in the case of a wire, a diameter of the sheave needs to be set to approximately 10 to 20 times a diameter of a wire, and thus in the case of a chain, a diameter of the sheave can be set in correspondence to a minimum bending radius of the plates connected by pins), and accordingly, the working beam elevating unit can be small-sized. In particular, the sheave can have a small diameter effectively particularly when the extraction/retraction driving unit is received in an interior space of the working beam.

A vehicle C1 including: a vehicle body on which a load is loaded, a loading/unloading apparatus for loading and unloading the load onto and from the vehicle body, and a controller for controlling the operation of the loading/unloading apparatus based on a manipulation instruction from a manipulation remote control unit, wherein the loading/unloading apparatus includes: rotary shafts installed in the vehicle body such that axial directions thereof coincide with a forward and rearward direction of the vehicle body; a pair of booms supported by the vehicle body via the rotary shafts to be rotatable toward a left and right direction of the vehicle body and installed at front and rear sides of the vehicle body at a predetermined interval; and a working beam installed between the pair of booms and suspending and maintaining the load such that as the pair of booms are rotated in the left and right direction of the vehicle body, the load is loaded/unloaded, and the controller includes: a first connection section where the manipulation remote control unit is detachably connected and that is positioned closer to the front of the vehicle body than the loading/unloading apparatus; a second connection section where the manipulation remote control unit is detachably connected and that is positioned closer to the rear of the vehicle body than the loading/unloading apparatus; and an operation direction reverse section for making the operation direction when the pair of booms of the loading/unloading apparatus are rotated toward the left and right direction of the vehicle body based on a manipulation instruction from the manipulation remote control unit connected to the first connection section and the operation direction when the pair of booms of the loading/unloading apparatus is rotated toward the left and right direction of the vehicle body based on a manipulation instruction from the manipulation remote control unit connected to the second connection section, be opposite to each other.

According to the vehicle C1, if the manipulation remote control unit is manipulated by the operator, an operation of the loading/unloading apparatus is controlled by the controller based on a manipulation instruction from the manipulation remote control unit, the load loaded on the vehicle body is unloaded in the construction field by the loading/unloading apparatus, and the load of the construction field is unloaded on the vehicle body by the loading/unloading apparatus.

That is, when the load loaded on the vehicle body is unloaded in the construction field, the load is suspended and maintained by the working beam installed between the pair of booms, and the pair of booms is rotated toward the left or right direction (the direction of the construction field) of the vehicle body based on the manipulation instruction as the manipulation remote control unit is manipulated by the operator. Accordingly, the load is moved from the vehicle body onto the construction field, and is unloaded in the construction field. Meanwhile, when the load positioned in the construction field is loaded on the vehicle body, the load is suspended and maintained by the working beam, and the pair of booms is rotated toward the left or right direction (the vehicle body side) of the vehicle body based on the manipulation instruction as the manipulation remote control unit is manipulated by the operator. Accordingly, the load is moved from the construction field onto the vehicle body and is loaded on the vehicle body.

In this case, since the controller includes a first connection section where the manipulation remote control unit is detachably connected and that is positioned closer to the front of the vehicle body than the loading/unloading apparatus; a second connection section where the manipulation remote control unit is detachably connected and that is positioned closer to the rear of the vehicle body than the loading/unloading apparatus, the manipulation remote control unit can be manipulated either on the front side or rear side of the load by changing the connection location of the manipulation remote control unit between the first connection section and the second connection section. Thus, even when a long heavy load influenced by the situation of the construction field such as a wind direction of the construction field, the amount of sunlight, and a progress direction of the vehicle is loaded or unloaded, the manipulation remote control unit may be manipulated from a location (that is, the front or rear side of the load) suitable for the situation of the construction field, and thus working efficiency can be enhanced when the long heavy load is loaded by the manipulation of the manipulation remote control unit.

Further, since the controller includes an operation direction reverse section for making the operation direction when the pair of booms of the loading/unloading apparatus are rotated toward the left or right direction of the vehicle body based on a manipulation instruction from the manipulation remote control unit connected to the first connection section and the operation direction when the pair of booms of the loading/unloading apparatus is rotated toward the left or right direction of the vehicle body based on a manipulation instruction from the manipulation remote control unit connected to the second connection section, be opposite to each other, an erroneous manipulation of the manipulation remote control unit by the operator can be restrained.

That is, even when the same manipulation is applied to the manipulation remote control unit, the operation directions of the pair of booms of the loading/unloading apparatus can be opposite to each other in the case based on a manipulation instruction from the manipulation remote control unit connected to the first connection section and in the case based on a manipulation instruction from the manipulation remote control unit connected to the second connection section. Thus, even when the left and right directions of the vehicle body are reversed by the operator through the manipulation of the manipulation remote control unit at the front side and the rear side of the load, the manipulation of the remote control unit need not be changed according to the manipulation location (that is, the connection location of the manipulation remote control unit), and thus an erroneous operation of the manipulation remote control unit by the operator can be restrained.

In the vehicle C1, a vehicle C2 wherein the controller includes: a connecting state determining section for determining whether the manipulation remote control units are connected to both of the first connection section and the second connection section; and an operation preventing section for preventing the operation of the loading/unloading apparatus, based on a manipulation instruction from at least one of the manipulation remote control unit connected to the first connection section or the manipulation remote control unit connected to the second connection section, when the connecting state determining section determines that the manipulation remote control units are connected to both of the first connection section and the second connection section.

According to the vehicle C2, in addition to the effects of the vehicle C1, since the operation preventing section prevents the operation of the loading/unloading apparatus, based on a manipulation instruction from at least one of the manipulation remote control unit connected to the first connection section or the manipulation remote control unit connected to the second connection section, when the connecting state determining section determines that the manipulation remote control units are connected to both of the first connection section and the second connection section, safety can be restrained from being damaged by simultaneously manipulating the two manipulation remote control units connected to the first connection section and the second connection section when the load is unloaded or unloaded by the loading/unloading apparatus.

In particular, in the loading/unloading apparatus, the pair of booms where the working beam is installed is installed at the front and rear sides of the vehicle body at a predetermined interval, and the first connection section and the second connection section are located closer to the front and rear sides of the vehicle body than the loading/unloading apparatus and are distant from each other. Accordingly, even when the manipulation remote control unit is already connected to one of the first connection section and the second connection section, there is a possibility that the operator connects the manipulation remote control unit to the other connection section without confirming the connection. Thus, when two manipulation remote control units are simultaneously connected, an operation of the loading/unloading apparatus based on a manipulation instruction of at least one of the manipulation remote control unit can be prevented effectively.

In the vehicle C2, a vehicle C3 further including a connection order determining section for determining the connection order of the connection of the manipulation remote control unit to the first connection section and the connection of the manipulation remote control unit to the second connection section, when the connecting state determining section determines that the manipulation remote control units are connected to both of the first connection section and the second connection section, wherein the operation preventing section allows the operation of the loading/unloading apparatus based on a manipulation instruction from the manipulation remote control unit that is determined as being connected first by the connection order determining section, and prevents the operation of the loading/unloading apparatus based on a manipulation instruction from the manipulation remote control unit that is determined as being connected later by the connection order determining section.

According to the vehicle C3, in addition to the effects of C2, since the vehicle includes a connection order determining section for determining the connection order of the connection of the manipulation remote control unit to the first connection section and the connection of the manipulation remote control unit to the second connection section, when the connecting state determining section determines that the manipulation remote control units are connected to both of the first connection section and the second connection section, wherein the operation preventing section allows the operation of the loading/unloading apparatus based on a manipulation instruction from the manipulation remote control unit that is determined as being connected first by the connection order determining section, and prevents the operation of the loading/unloading apparatus based on a manipulation instruction from the manipulation remote control unit that is determined as being connected later by the connection order determining section, when the load is loaded or unloaded by the manipulation of the manipulation remote control unit connected to one of the first connection section and the second connection section, the manipulation of the manipulation remote control unit connected to the other connection section can be invalid even when the manipulation remote control unit is carelessly connected to the other of the first connection section and the second connection section. Thus, the two manipulation remote control units may be manipulated simultaneously, and thus safety can be restrained from being damaged.

Further, in this case, since an operation of the loading/unloading apparatus by a manipulation instruction of the manipulation remote control unit (that is, the manipulation remote control unit which connection order is prior) connected to one of the first connection section and the second connection section may be continued, when the load is loaded or unloaded by the manipulation remote control unit connected to one connection section, if the manipulation remote control unit is carelessly connected to the other connection section, an abrupt stop of the operation of the loading/unloading apparatus can be avoided and vibrations can be restrained from being generated in the load.

Further, when the two manipulation remote control units are connected, if the operations of the loading/unloading apparatus based on the manipulation instructions from both the manipulation remote control units are prevented, respectively, the loading/unloading operations of the load cannot be resumed unless an operation of releasing the prevention state is performed, and according to the vehicle C3, since an operation of the loading/unloading apparatus by the manipulation instruction of the manipulation remote control unit whose connection order is prior may be continued, the operation of releasing the prevention state may be unnecessary. Accordingly, in loading and unloading the load, working efficiency can be enhanced while securing safety.

In the vehicle C2, a vehicle C4 wherein the operation preventing section prevents the operations of the loading/unloading apparatus based on both of the manipulation instruction from the manipulation remote control unit connected to the first connection section and the manipulation instruction from the manipulation remote control unit connected to the second connection section, when the connecting state determining section determines that the manipulation remote control units are connected to both of the first connection section and the second connection section.

According to the vehicle C4, in addition to the effects of the vehicle C2, since the operation preventing section prevents the operation of the loading/unloading apparatus, based on both the manipulation instruction from the manipulation remote control unit connected to the first connection section and the manipulation instruction from the manipulation remote control unit connected to the second connection section, when the connecting state determining section determines that the manipulation remote control units are connected to both of the first connection section and the second connection section, safety can be certainly restrained from being damaged by simultaneously manipulating the two manipulation remote control units connected to the first connection section and the second connection section when the load is unloaded or unloaded by the loading/unloading apparatus.

In any one of the vehicles C2 to C4, a vehicle C5 wherein the controller includes: a separation determining section for determining whether the manipulation remote control units are separated from one of the first connection section and the second connection section after the manipulation remote control units are connected to both of the first connection section and the second connection section; and a removing section for removing the prevention by the operation preventing section, when the separation determining section determines that the manipulation remote control units are separated from one of the first connection section and the second connection section and the operation of the loading/unloading apparatus based on the manipulation instruction from the manipulation remote control unit connected to the other of the first connection section and the second connection section is prevented by the operation preventing section.

According to the vehicle C5, in addition to the effects of any one of the vehicles C2 to C4, since the controller removes, by the removing section, the prevention by the operation preventing section when a separation determining section determines whether the manipulation remote control units are separated from one of the first connection section and the second connection section after the manipulation remote control units are connected to both of the first connection section and the second connection section and when the operation of the loading/unloading apparatus based on the manipulation instruction from the manipulation remote control unit connected to the other of the first connection section and the second connection section is prevented by the operation preventing section, working efficiency can be enhanced while securing safety in loading or unloading the load.

That is, when the manipulation remote control unit is connected to both the first connection section and the second connection section, a manipulation of one of the manipulation remote control units may be allowed (that is, prevention by the operation preventing section may be released) only by separating the other manipulation remote control unit while preventing an operation of the loading/unloading apparatus with the operation preventing section and securing safety, and thus an operation of releasing a prevention state can be simplified and working efficiency can be enhanced.

A vehicle D1 including: a vehicle body where a load is loaded, an operator cab installed at one side in the forward and rearward direction of the vehicle body; a loading/unloading apparatus installed on the vehicle body that is the rear side of the operator cab and loading/unloading the load; a display unit displaying the operation state of the loading/unloading apparatus and installed in the operator cab; and a controller controlling the operation of the loading/unloading apparatus, wherein the controller includes a connection section installed at one side in the forward and rearward direction of the vehicle body further than the loading/unloading apparatus and connected with a manipulation remote control unit and controls the operation of the loading/unloading apparatus on the basis of a manipulation instruction from the manipulation remote control unit connected to the connection section, the loading/unloading apparatus includes: rotary shafts installed in the vehicle body such that axial directions thereof coincide with a forward and rearward direction of the vehicle body; a pair of booms supported by the vehicle body via the rotary shaft to be rotatable toward a left and right direction of the vehicle body and installed at front and rear sides of the vehicle body at a predetermined interval; and a working beam installed between the pair of booms and suspending and maintaining the load such that as the pair of booms are rotated in the left and right direction of the vehicle body, the load is loaded/unloaded, the operator cab has an opening window formed to be open at the rear side opposite the loading/unloading apparatus, and the display unit has a display surface facing the opening window.

According to the vehicle D1, if the manipulation remote control unit is manipulated by the operator, an operation of the loading/unloading apparatus is controlled by the controller based on a manipulation instruction from the manipulation remote control unit, the load loaded on the vehicle body is unloaded in the construction field by the loading/unloading apparatus, and the load of the construction field is loaded on the vehicle body by the loading/unloading apparatus.

That is, when the load loaded on the vehicle body is unloaded in the construction field, the load is suspended and maintained by the working beam installed between the pair of booms, and as the manipulation remote control unit is manipulated by the operator, the pair of booms is rotated toward the left or right direction (the direction of the construction field) of the vehicle body based on the manipulation instruction. Accordingly, the load is moved from the vehicle body onto the construction field, and is unloaded in the construction field. Meanwhile, when the load positioned in the construction field is loaded on the vehicle body, the load is suspended and maintained by the working beam, and the pair of booms is rotated toward the left or right direction (the vehicle body side) of the vehicle body based on the manipulation instruction as the manipulation remote control unit is manipulated by the operator. Accordingly, the load is moved from the construction field onto the vehicle body and is loaded on the vehicle body.

In this way, since the connection section to which the manipulation remote control unit is connected is included, and a manipulation instruction may be transmitted from the outside of the operator cab by using the connected manipulation remote control unit connected to the connection section, the operator can perform a manipulation while adjusting a standing location with respect to the load. Thus, even when a long heavy load influenced by the situation of the construction field such as a wind direction of the construction field, the amount of sunlight, and a progress direction of the vehicle is loaded or unloaded, the manipulation remote control unit may be manipulated from a location suitable for the situation of the construction field, and thus working efficiency can be enhanced when the long heavy load is loaded by the manipulation of the manipulation remote control unit.

In this case, since the operator cab has an opening window formed to be open at the rear side opposite to the loading/unloading apparatus, and the display unit displaying an operation state of the loading/unloading apparatus has a display surface facing the opening window in the operator cab, even when a manipulation instruction is transmitted from the outside of the operator cab by using the manipulation remote control unit, the display surface of the display unit can be confirmed from the outside of the operator cab via the opening window. Thus, the operator can perform a manipulation while acquiring information on an operation state of the loading/unloading apparatus from the display unit, and thus safety can be secured when a long heavy load is loaded by the manipulation of the manipulation remote control unit.

Further, in the vehicle D1, since the display unit is installed in the operator cab, the display unit can be protected as compared with the case where the display unit is installed outside the operator cab, and even when a manipulation is performed in the operator cab, the manipulation instruction can be transmitted while acquiring the information on the operation state of the loading/unloading apparatus from the display unit.

In addition, since the vehicle D1 is a loadable type where a load is loaded on the vehicle body, the operator cab is installed at one of the front and rear sides of the vehicle body, and the loaded is loaded or unloaded by the loading/unloading apparatus installed on the vehicle body which is a rear surface side of the operator cab, the visibility of the load in the operator cab is bad. Accordingly, since a manipulation instruction may be transmitted from the outside of the operator cab by using the manipulation remote control unit, the visibility of the load can be secured and working efficiency when the load (in particular, a long heavy load) is loaded or unloaded is improved.

In the vehicle D1, a vehicle D2 wherein the controller includes: a load factor acquiring section for acquiring a load factor of the loading/unloading apparatus; a first reference value determining section for determining whether the load factor of the loading/unloading apparatus acquired by the load factor acquiring section reaches a first reference value; and a stopping section for stopping the operation of the loading/unloading apparatus when the first reference value determining section determines that the load factor of the loading/unloading apparatus has reached the first reference value.

According to the vehicle D2, in addition to the effects of the vehicle D1, since a stopping section may stop the operation of the loading/unloading apparatus when the first reference value determining section determines that the load factor of the loading/unloading apparatus acquired by the load factor acquiring section has reached the first reference value, the vehicle may be restrained from being tumbled down or the loading/unloading apparatus may be restrained from being damaged as the load factor is increased by a careless manipulation of the operator.

In the vehicle D2, a vehicle D3 wherein the manipulation remote control unit includes a speaker unit that sounds, and the controller includes a second reference determining section for determining whether the load factor of the loading/unloading apparatus has reached a second reference value that is smaller in load factor than at least the first reference value and a sound instruction section for sounding from the speaker unit of the manipulation remote control unit when the second reference value determining section determines that the load factor of the loading/unloading apparatus has reached the second reference value.

According to the vehicle D3, in addition to the effects of the vehicle D2, when the manipulation remote control unit includes a speaker unit that emits sound, and a second reference determining section determines that the load factor of the loading/unloading apparatus has reached a second reference value that is smaller in load factor than at least the first reference value, a sound instruction section may sound from the speaker unit of the manipulation remote control unit, and thus the operator can be notified by the emission of the sound that the load factor of the loading/unloading apparatus reaches the second reference value before the load factor reaches the first reference value and the loading/unloading apparatus is stopped by the stopping section. Thus, the loading/unloading apparatus can be restrained from being abruptly stopped while vibrations of the load being restrained from being generated.

Further, in this way, as the operator may be notified by emitting sound from the speaker unit of the manipulation remote control unit, the operator manipulating the manipulation remote control unit can recognize information due to the notification without averting his/her eyes from the load. Thus, safety can be secured when the load is loaded and unloaded by the manipulation of the manipulation remote control unit.

In the vehicle D2 or D3, a vehicle D4 further including a display lamp installed at the working beam and emitting light, wherein the controller includes: a third reference value determining section for determining whether the load factor of the loading/unloading apparatus has reached a third reference value that is smaller in load factor than at least the first reference value; and a light emission instruction section at least changing the light emission state of the display lamp when the third reference value determining section determines that the load factor of the loading/unloading apparatus has reached the third reference value.

According to the vehicle D4, in addition to the effects of the vehicle D2 or D3, when the vehicle includes a display lamp installed at the working beam and emitting light, and it is determined by the third reference value determining section that the load factor of the loading/unloading apparatus has reached a third reference value that is smaller in load factor than at least the first reference value, a light emission instruction section may change the light emission state of the display lamp, and thus the operator can be notified through a change in light emitting state of the display lamp that the load factor of the loading/unloading apparatus reaches the third reference value before the load factor reaches the first reference value and the loading/unloading apparatus is stopped by the stopping section. Thus, the loading/unloading apparatus can be restrained from being abruptly stopped while vibrations of the load being restrained from being generated.

Further, in this way, if the display lamp is installed in the working beam suspending and maintaining the load, the operator manipulating the manipulation remote control unit can recognize information due to the notification without averting his/her eyes from the load. Thus, safety can be secured when the load is loaded and unloaded by the manipulation of the manipulation remote control unit.

In addition, examples of a change in the light emitting state of the display lamp include a mode changing from a turned-off state to a turned-on or flickering state, a mode changing from a flickering state to a turned-on state, a mode changing from the turned-on state to the flickering state, a mode where a flickering interval is changed, a mode where a turned-on light amount is changed, a mode where the number of turned-on lights of a plurality of light sources are changed, and a mode where a light emitting color of the light source is changed.

In the vehicle D4, a vehicle D5 wherein the display lamp is installed to protrude upward from the upper surface of the working beam.

According to the vehicle D5, in addition to the effects of the vehicle D4, since the display lamp is installed to protrude upward from the upper surface of the working beam, the display lamp can be located at an uppermost portion of the loading/unloading apparatus. Accordingly, the display lamp can be easily viewed by the operator regardless of a location where the operator stands with respect to the working beam of the loading/unloading apparatus. Thus, safety can be secured when the load is loaded and unloaded by the manipulation of the manipulation remote control unit.

In the vehicle D5, a vehicle D6 wherein the controller further includes a connection section, where the manipulation remote control unit is connected and that is installed at the other side in the forward and rearward direction of the vehicle body further than the loading/unloading apparatus, and controls the operation of the loading/unloading apparatus on the basis of a manipulation instruction from the manipulation remote control unit connected to any one of the connection section, and the position of the display lamp installed to protrude upward from the upper surface of the working beam is the center in the longitudinal direction of the working beam.

According to the vehicle D6, in addition to the effects of the vehicle D5, since the controller further includes a connection section, where the manipulation remote control unit is connected and that is installed at the other side in the forward and rearward direction of the vehicle body further than the loading/unloading apparatus, as the connection location of the manipulation remote control unit changes between both the connection section (that is, the connection section located on one and the other of the front and rear sides of the vehicle body by sandwiching the loading/unloading apparatus), the manipulation remote control unit can be manipulated both at the front side and the rear side of the load. Thus, even when a long heavy load influenced by the situation of the construction field such as a wind direction of the construction field, the amount of sunlight, and a progress direction of the vehicle is loaded or unloaded, the manipulation remote control unit may be manipulated from a location (that is, the front or rear side of the load) suitable for the situation of the construction field, and thus working efficiency can be enhanced when the long heavy load is loaded or unloaded by the manipulation of the manipulation remote control unit.

Further, since and the position of the display lamp installed to protrude upward from the upper surface of the working beam is the center in the longitudinal direction of the working beam, the display lamp can be easily viewed by the operator both when a manipulation is performed at the front side of the load and when a manipulation is performed at the rear side of the load, as described above. Thus, safety can be secured when the load is loaded and unloaded by the manipulation of the manipulation remote control unit.

In the vehicle D6, a vehicle D7 further including: an operator cab having an opening window opened at the rear side opposite the loading/unloading apparatus and installed at the other side in the forward and rearward direction of the vehicle body; and a display unit installed in the operator cab and having a display surface facing the opening window.

According to the vehicle D7, in addition to the effects of the vehicle D6, since the vehicle further includes: an operator cab having an opening window opened at the rear side opposite to the loading/unloading apparatus and installed at the other side in the forward and rearward direction of the vehicle body; and a display unit installed in the operator cab and having a display surface facing the opening window, as described above, even when a manipulation is performed at the front side of the load and when a manipulation is performed at the rear side of the load, the display surface of the display unit can be confirmed via the opening windows of the operator cab installed at one and the other of the front and rear sides of the vehicle body. Thus, the operator can perform a manipulation while acquiring information on an operation state of the loading/unloading apparatus from the display unit, and thus safety can be secured when a long heavy load is loaded or unloaded by the manipulation of the manipulation remote control unit.

A vehicle E1 including: a vehicle body on which a load is loaded, a loading/unloading apparatus for loading and unloading the load on and from the vehicle body, and a controller for controlling the operation of the loading/unloading apparatus on the basis of an manipulation instruction from manipulation remote control unit, wherein the loading/unloading apparatus includes: rotary shafts installed in the vehicle body such that axial directions thereof coincide with a forward and rearward direction of the vehicle body; a pair of booms supported by the vehicle body via the rotary shaft to be rotatable toward a left and right direction of the vehicle body and installed at front and rear sides of the vehicle body at a predetermined interval; and a working beam installed between the pair of booms and suspending and maintaining the load such that as the pair of booms are rotated in the left and right direction of the vehicle body, the load is loaded/unloaded, and, the controller includes: a load factor acquiring section for acquiring a load factor of the loading/unloading apparatus; a first reference value determining section for determining whether the load factor of the loading/unloading apparatus acquired by the load factor acquiring section reaches a first reference value; a stopping section for stopping the operation of the loading/unloading apparatus when the first reference value determining section determines that the load factor of the loading/unloading apparatus has reached the first reference value; a second reference determining section for determining whether the load factor of the loading/unloading apparatus acquired by the load factor acquiring section has reached a second reference value that is smaller in load factor than the first reference value; and an operation speed reducing section for reducing operation speed of the loading/unloading apparatus when the second reference value determines that the load factor of the loading/unloading apparatus has reached the second reference value.

According to the vehicle E1, if the manipulation remote control unit is manipulated by the operator, an operation of the loading/unloading apparatus is controlled by the controller based on a manipulation instruction from the manipulation remote control unit, the load loaded on the vehicle body is unloaded in the construction field by the loading/unloading apparatus, and the load of the construction field is unloaded onto the vehicle body by the loading/unloading apparatus.

That is, when the load loaded on the vehicle body is unloaded in the construction field, the load is suspended and maintained by the working beam installed between the pair of booms, and as the manipulation remote control unit is manipulated by the operator, the pair of booms is rotated toward the left or right direction (the direction of the construction field) of the vehicle body based on the manipulation instruction. Accordingly, the load is moved from the vehicle body onto the construction field, and is unloaded in the construction field. Meanwhile, when the load positioned in the construction field is loaded on the vehicle body, the load is suspended and maintained by the working beam, and the pair of booms is rotated toward the left or right direction (the vehicle body side) of the vehicle body based on the manipulation instruction as the manipulation remote control unit is manipulated by the operator. Accordingly, the load is moved from the construction field onto the vehicle body and is loaded onto the vehicle body.

When the load is loaded or unloaded, the load factor of the loading/unloading apparatus is acquired by the load factor acquiring section, and if the first reference value determining section determines that the load factor of the loading/unloading apparatus acquired by the load factor acquiring section reaches the first reference value, an operation of the loading/unloading apparatus is stopped by the stopping section. Accordingly, the vehicle is restrained from being tumbled down.

In this case, if it is determined by the second reference value determining section that the load factor of the loading/unloading apparatus acquired by the load factor acquiring section reaches the second reference value which is a load factor lower than the first reference value, an operation speed of the loading/unloading apparatus is reduced by the operation speed reducing section, and thus vibrations of a load can be restrained from being generated even when a load of a long heavy load is loaded or unloaded. Further, since the manipulation may be finely performed as an operation speed of the loading/unloading apparatus is reduced, the load factor can be restrained from reaching the first reference value by a careless manipulation of the operator. Further, even when the load factor reaches the first reference value, an operation speed of the loading/unloading apparatus is reduced, and thus vibrations of a load can be restrained from being generated when the loading/unloading apparatus is stopped. As described above, a safety can be secured when a long heavy load is loaded or unloaded.

In the vehicle E1, a vehicle E2 wherein the controller includes: a load factor reduction determining section for determining whether the load factor of the loading/unloading apparatus has become lower than the second reference value after the second reference value determining section determines that the load factor of the loading/unloading apparatus has reached the second reference value; and an operation speed maintaining section for maintaining the operation speed of the loading/unloading apparatus in the state reduced by the operation speed reducing section when the load factor reduction determining section determines that the load factor of the loading/unloading apparatus is below the second reference value.

According to the vehicle E2, in addition to the effects of the vehicle E1, when the load factor reduction determining section determines that after reaching the second reference value, the load factor of the loading/unloading apparatus is below the second reference value, the operation speed of the loading/unloading apparatus is maintained by the operation speed maintaining unit in a speed reduction state where an operation speed of the loading/unloading apparatus is reduced by the operation speed reducing section, vibrations can be restrained from being generated, and consequently, safety can be secured when the long heavy load is loaded and unloaded.

That is, when the load factor of the loading/unloading apparatus reaches the second reference value, and then the loading/unloading apparatus is operated in a direction for reducing a load state and the load factor of the loading/unloading apparatus is below the second reference value, if an operation speed of the loading/unloading apparatus is abruptly recovered from the speed reduction state to a normal speed at the same time when the load factor is switched, manipulation performance is changed and the load is subject to vibrations. In this regard, in the vehicle E2, since an operation speed of the loading/unloading apparatus is maintained in a speed reduction state even when the load factor is below the second reference value, the load can be smoothly moved even when the load factor is switched and vibrations of the load can be restrained.

In the vehicle E2, a vehicle E3 wherein the manipulation remote control unit has a manipulation lever that is manipulated by a manipulator and the controller includes: a manipulation amount acquiring section for acquiring the manipulation amount of the manipulation lever of the manipulation remote control unit; and an operation speed adjusting section for adjusting an operation speed of the loading/unloading apparatus in accordance with the manipulation amount of the manipulation lever of the manipulation remote control unit acquired by the manipulation amount acquiring section, wherein the operation speed adjusting section adjusts the operation speed of the loading/unloading apparatus in accordance with the manipulation amount of the manipulation lever of the manipulation remote control unit even after the operation speed of the loading/unloading apparatus is reduced by the operation speed reducing section.

According to the vehicle E3, in addition the effects of the vehicle E2, if a manipulation amount of the manipulation lever of the manipulation remote control unit is acquired by the manipulation amount acquiring section, an operation speed of the loading/unloading apparatus is adjusted by the operation speed adjusting section according to the manipulation amount of the manipulation lever of the manipulation remote control unit acquired by the manipulation amount acquiring section, and thus the loading/unloading apparatus can be operated at an operation speed according to the situation such as a load state, and working efficiency can be improved.

In this case, since the operation speed adjusting section adjusts an operation speed of the loading/unloading apparatus according to a manipulation amount of the manipulation lever of the manipulation remote control unit even after the operation speed of the loading/unloading apparatus is reduced by the operation speed reducing section, even in a region where the load factor of the loading/unloading apparatus reaches the second reference value such that a cautious manipulation is required, an operation speed of the loading/unloading apparatus can be adjusted according to the manipulation amount of the manipulation lever. Thus, since the load factor can be restrained from reaching the first reference value due to a careless manipulation of the operator by making a fine adjustment of the manipulation easy, safety can be secured when the long heavy load is loaded or unloaded.

In the vehicle E3, a vehicle E4 wherein a variation ratio of the operation speed of the loading/unloading apparatus to the manipulation amount of the manipulation lever of the manipulation remote control apparatus is in a proportional state before and after the operation speed of the loading/unloading apparatus is reduced by the operation speed reducing section, in the adjustment of the operation speed of the loading/unloading apparatus by the operation speed adjusting section.

According to the vehicle E4, in addition to the vehicle E3, since a variation ratio of the operation speed of the loading/unloading apparatus to the manipulation amount of the manipulation lever of the manipulation remote control apparatus is in a proportional state before and after the operation speed of the loading/unloading apparatus is reduced by the operation speed reducing section in the adjustment of the operation speed of the loading/unloading apparatus by the operation speed adjusting section, a manipulation feeling when the manipulation lever is manipulated to change an operation speed of the loading/unloading apparatus in the speed reduction state and a manipulation feeling when the manipulation lever is manipulated at a normal speed (that is, an operation speed before the operation speed is reduced by the operation speed reducing section) to change an operation speed of the loading/unloading apparatus can be approximated. Thus, since the manipulation performance of the manipulation remote control unit can be restrained from changing before and after the operation speed of the loading/unloading apparatus is reduced by the operation speed reducing section, safety can be secured when the long heavy load is loaded and unloaded.

In the vehicle E3 or E4, a vehicle E5 wherein the manipulation remote control unit is configured to be able to be manipulated at one side and the other side with the manipulation lever sandwiching a neutral position, the operation speed adjusting section of the controller adjusts the operation speed in one direction or the other direction of the loading/unloading apparatus in accordance with the manipulation amount of the manipulation lever when the manipulation lever of the manipulation remote control unit is manipulated to one side or the other side, and adjusts the operation speed of the loading/unloading apparatus to 0 when the manipulation lever of the manipulation remote control unit is manipulated to the neutral position, and the controller includes an operation speed returning section for returning the operation speed of the loading/unloading apparatus to the operation speed before being reduced by the operation speed reducing section, when the operation speed of the loading/unloading apparatus has been reduced by the operation speed reducing section and the manipulation lever of the remote control unit is manipulated to the neutral position.

According to the vehicle E5, in addition to the effects of the vehicle E3 or E4, if the manipulation lever of the manipulation remote control unit is manipulated to one side or the other side, according to the manipulation amount of the manipulation lever, an operation speed to one direction or the other direction of the loading/unloading apparatus is adjusted by the operation speed adjusting section and the loading/unloading apparatus is operated at the adjusted operation speed, and if the manipulation lever of the manipulation remote control unit is manipulated to a neutral position, an operation speed of the loading/unloading apparatus can be adjusted to 0 by the operation speed adjusting section and the operation of the loading/unloading apparatus can be stopped.

In this case, when the operation speed of the loading/unloading apparatus is reduced by the operation speed reducing section, if the manipulation lever of the manipulation remote control unit is manipulated to a neutral position, the operation speed returning section returns the operation speed of the loading/unloading apparatus to the operation speed before the operation speed is reduced by the operation speed reducing section. That is, as a condition where the manipulation lever of the manipulation remote control unit is returned to the neutral position and the operation of the loading/unloading apparatus is stopped, the operation speed of the loading/unloading apparatus returns to a normal speed (that is, an operation speed before the operation speed is reduced by the operation speed reducing section), vibrations can be restrained from being generated in the load by avoiding an abrupt recovery of the operation speed from a speed reduction state to a normal speed during the operation of the loading/unloading apparatus. As a result, a safety can be secured when a long heavy load is loaded or unloaded.

In the flowchart (overload warning processing) illustrated in FIG. 11, the load factor acquiring section in the description of the vehicle D2 corresponds to the processing of S11 and S12, the first reference value determining section corresponds to the processing of S14, the stopping section corresponds to the processing of S15, the second reference value determining section in the description of the vehicle D3 corresponds to the processing of S14, the sound emission instructing section corresponds to the processing of S15, the third reference value determining section in the description of the vehicle D4 corresponds to the processing of S14, the light emission instructing section corresponds to the processing of S15, the load factor acquiring section in the description of the vehicle E1 corresponds to the processing of S11 and S12, the first reference value determining section corresponds to the processing of S14, and the stopping section corresponds to the processing of S15.

In the flowchart (remote control recognizing processing) illustrated in FIG. 12, the connection state determining section in the description of the vehicle C2 corresponds to the processing of S22 and S26, and the separation determining section in the description of the vehicle C5 corresponds to the processing of S22, S23, and S26.

In the flowchart (operation control unit) illustrated in FIG. 13A and FIG. 13B, the operation direction reversing section in the description of the vehicle C1 corresponds to the processing of S37 to S40 and S44 to S47, the operation preventing section in the descriptions of the vehicle C2 and C4 corresponds to the processing of S32, the releasing section in the description of C5 corresponds to the processing of S32, the second reference value determining section in the description the vehicle E 1 corresponds to the processing of S35, the operation speed reducing section corresponds to the processing of S38 to S40, the load factor decrease determining section in the description of the vehicle E2 corresponds to the processing of S35 and S41, the operation speed maintaining section corresponds to the processing of S42, the manipulation amount acquiring section in the description of the vehicle E3 corresponds to the processing of S33, the operation speed adjusting section corresponds to the processing of S38 to S40 and S45 to S47, and the operation speed returning section in the description of the vehicle E5 corresponds to the processing of S42 and S43.

REFERENCE SIGNS LIST

1 . . . vehicle
20 . . . vehicle body
30 . . . operator cab
31 . . . opening window
40 . . . loading/unloading apparatus
410 . . . boom
411 . . . body 411a ... rotation pin (rotary shaft)
412 ... protruding/retracting portion
430 ... working beam
440 ... working beam elevating unit
441 ... chain (elevation line)
442,443 ... fixing sheave
444 ... reversal sheave
445 ... elevation actuator
700 ... extraction/retraction driving unit
450 ... lifting jig
500 ... rotation driving unit
420 ... rotation actuator
501 ... hydraulic pump
502 ... switching valve
503 ... counterbalance valve
811 ... LCD (display unit)
821 ... display lamp
70 ... controller
840 ... first connection terminal (first connection section, connection section)
850 ... second connection terminal (second connection section, connection section)
50 ... manipulation remote control unit
52 ... first manipulation lever (manipulation lever)
53 ... second manipulation lever (manipulation lever)
55 ... speaker
W, W1, W2 ... load

What is claimed is:

1. A vehicle comprising: a vehicle body on which a load can be loaded; and a loading / unloading apparatus configured to load and unload the load onto and from the vehicle body, wherein the loading / unloading apparatus includes:
rotary shafts installed in the vehicle body such that axial directions thereof coincide with forward and rearward directions of the vehicle body;
a pair of booms supported by the vehicle body via the rotary shafts to be rotatable toward left and right directions of the vehicle body and installed at front and rear sides of the vehicle body at a predetermined interval;
a rotation driving unit configured to provide the pair of booms with driving forces to rotate the pair of booms toward the left and right directions of the vehicle body;
a working beam installed between the pair of booms by way of end portions of the working beam that are suspended from the booms, a central portion of the working beam oriented between the portions and configured such that an uppermost surface of the central portion of the working beam is lower than the end portions, and stepped portions inclined downward toward the central portion and formed between the central portion and the end portions;
working beam elevating units configured to elevate the working beam with respect to the booms; and
a plurality of lifting jigs attached to the working beam along the forward and rearward directions of the vehicle body, installed at both of the end portions of the working beam, and configured to suspend and maintain the load.

2. The vehicle according to claim 1,
wherein each of the booms includes:
a body having a rear side that is rotatably supported by the vehicle body; and
a protruding / retracting portion accommodated within the body, configured to protrude and retract from a tip end side of the body, and to which an end of the working beam is connected, and
wherein the boom is extended or contracted in an axial direction of the boom as the protruding / retracting portion protrudes or retracts from the tip end side of the body.

3. The vehicle according to claim 2,
wherein the rotation driving unit includes a pair of extendable / contractible rotation actuators installed on left and right sides of the vehicle body with respect to at least one of the booms and configured to connect the vehicle body and the body of the at least one boom, and as one of the pair of rotation actuators is extended and the other one is contracted, the at least one boom is rotated toward the left or right direction of the vehicle body.

4. The vehicle according to claim 3,
wherein each of the rotation actuators includes a hydraulic cylinder, and
wherein the rotation driving unit includes a hydraulic pump configured to supply a hydraulic pressure to the rotation actuator, a switching valve installed between the hydraulic pump and the rotation actuator and configured to convert a supply direction of the hydraulic pressure to the rotation actuator, and a counterbalance valve installed between the switching valve and the rotation actuator and configured to apply a back pressure to a flow from the rotation actuator to the switching valve.

5. The vehicle according to claim 1,
wherein a guide rail, to which at least one of the lifting jigs is installed, is installed at each of the end portions of the working beam,
wherein two rod cylinders are installed at the central portion of the working beam with ends extending towards each end of the working beam, and
wherein the lifting jigs are connected to both ends of both of the two rod cylinders, respectively.

6. The vehicle according to claim 1, wherein both upper and lower surfaces of the stepped portions are inclined downward.

7. The vehicle according to claim 1, wherein the uppermost surface of the central portion of the working beam is lower than uppermost surfaces of the end portions.

* * * * *